United States Patent
Schaf et al.

(10) Patent No.: US 7,409,357 B2
(45) Date of Patent: Aug. 5, 2008

(54) QUANTIFICATION OF OPERATIONAL RISKS

(75) Inventors: Irina Schaf, Zug (CH); Michael Buttler, München (DE); Rüdiger Stern, Frankfurt (DE); Patrick Wegmann, Oberegstringen (CH)

(73) Assignee: Accenture Global Services, GmbH, Schffhausen (CH)

( * ) Notice: Subject to any disclaimer, the term of this patent is extended or adjusted under 35 U.S.C. 154(b) by 675 days.

(21) Appl. No.: 10/893,746

(22) Filed: Jul. 16, 2004

(65) Prior Publication Data

US 2005/0065754 A1    Mar. 24, 2005

Related U.S. Application Data

(63) Continuation of application No. 10/670,987, filed on Sep. 24, 2003, now abandoned.

(60) Provisional application No. 60/435,892, filed on Dec. 20, 2002.

(51) Int. Cl.
*G06F 9/44* (2006.01)
(52) U.S. Cl. .......................................................... 705/7
(58) Field of Classification Search ........................ None
See application file for complete search history.

(56) References Cited

U.S. PATENT DOCUMENTS

| | | | |
|---|---|---|---|
| 6,223,143 B1 * | 4/2001 | Weinstock et al. | 703/17 |
| 6,301,563 B1 | 10/2001 | Brown et al. | 705/4 |
| 6,360,210 B1 | 3/2002 | Wallman | 705/36 |
| 6,430,584 B1 | 8/2002 | Comer et al. | 707/503 |
| 6,453,303 B1 | 9/2002 | Li | 705/36 |
| 6,560,541 B1 | 5/2003 | Singh | 702/19 |
| 2003/0149657 A1 * | 8/2003 | Reynolds et al. | 705/38 |
| 2004/0054563 A1 * | 3/2004 | Douglas | 705/7 |
| 2004/0068431 A1 * | 4/2004 | Smith et al. | 705/10 |

FOREIGN PATENT DOCUMENTS

EP    1276061 A1    1/2003

OTHER PUBLICATIONS

Bigun, Elizabeth Saers, Risk analysis of catastrophes using exper's judgements European Journal of Operational Research, 1995, pp. 599-612.*

OpRisk 2000, Risk's third annual operational risk conference London, Dec. 5-6, 2000.*

Frachot A. et al., Loss Distribution Approach for operational risk Groupe de Recherche Operationnelle, Credit Lyonnais, France, Apr. 25, 2001.*

Operational Risk Consultative Document Basel Committee on Banking Supervision, Jan. 2001.*

(Continued)

*Primary Examiner*—Scott L Jarrett
(74) *Attorney, Agent, or Firm*—Brinks Hofer Gilson & Lione

(57) ABSTRACT

A system is provided for measuring operational risks. Advanced measurement approaches are used to calculate a value at risk based on loss data that is entered. The advanced measurement approaches that may be used include an internal measurement approach, loss distribution approach and scorecard approaches. The calculated value at risk may also be analyzed using different advanced measurement approaches under a variety of scenarios.

21 Claims, 44 Drawing Sheets

OTHER PUBLICATIONS

Working Paper on the Regulatory Treatment of Operational Risk Basel Committee on Banking Supervision, Sep. 2001.*

Alexandar, Carol, Bayesian Methods for Measuring and Managing Operational Risks ISDA/GARP Seminar, London, Sep. 2001.*

Insurance of Operational Risk Under the New Basel Capital Accord A working Paper Submitted by Insuracne Companies, Nov. 7, 2001.*

Fenton, Norman, Incorporating Expert Judgement in Operational Risk Quantification Critical Systems Conference, Oct. 15, 2002.*

Alexander, Carol, Bayesian Methods for Measuring Operational Risk Discussion Papers in Finance 2000-02, ISMA Centre.*

King, Jack L., Operational risk: Measurement and Modeling John Wiley & Sons, ISBN: 0-471-85209-0, 2001.*

Loss Distribution Approach OpRisk, Capital Allocation for Operational Risk Conference, Nov. 14-16, 2001.*

International Measurement Approach (Foundation Model) Date Unknown, pp. 1-12.*

Internal Measurement Approach <Foundation Model> Sumitomo Mitsui Banking Corporation, Date Unknown.*

Agena.co.uk Web Pages Agena, Feb. 2001, Jun. 2002, Retrieved from Archive.org Sep. 19, 2007.*

Paul Embrechts et al., "Modelling Extremel Events for Insurance and Finance", vol. 33, Springer, Corrected Fourth Printing 2003.

St. James Press "Bayesian Statistics: Principles, Models, and Applications", John Wiley & Sons, 1989.

Carol Alexander, "Advanced Risk Management", *IFF*, Jan. 2002, pp. 1-40.

Thomas L. Barton et al. "Managing Risk: An Enterprise-wide Approach", pp. 1-4, reprinted with permission from *Financial Executive*, Mar./Apr. 2002.

Roger Cole, "Basel Committee Proposals for Operational Risk" *Sep. 2001 Working Paper*, pp. 1-13.

G. Courage, "Loss Distribution Approach" *Capital Allocation for Operational Risk Conference*, Nov. 14-16, 2001, pp. 1-27.

Antoine Frachot et al., "Mixing internal and external data for managing operational risk", *Groupe de Recherche Operationnelle, Credit Lyonnais*, France, pp. 1-7, Jan. 29, 2002.

Antoine Frachot et al., "Mixing internal and external data for managing operational risk", www.gloriamundi.org, pp. 1-2, printed Sep. 3, 2003.

Charlotte James et al. "Implementing Basel II: The Practical Implications", www.bettermanagement.com, pp. 1-2, printed Apr. 28, 2003.

Jack L. King, Ph.D., "Operational Risk: EVT Models", *Presentation by FRB Boston*, Nov. 14-16, 2001, 28 pages.

Susan Osterfelt, "Operational Risk: As the Worm Turns", www.bettermanagement.com, pp. 1-2, printed Apr. 28, 2003.

Michael Schroeck et al. "Insight into the Future of Retail Financial Services Organizations", www.bettermanagement.com, pp. 1-6, printed Apr. 28, 2003.

Robert J. Thomas et al., "Fast, Flexible and Under Control: Meeting the Organizational Challenge of Turbulence in the Financial Services Marketplace", *Accenture Institute for Strategic Change*, May 2002, pp. 1-12.

R. Tyrrell Rockafellar et al., "Optimization of conditional value-at-risk", pp. 21-41, vol. 2 No. 3, Spring 2000.

R. Tyrrell Rockafellar et al. "Optimization of Conditional Value-at-Risk", paper, pp. 1-26, Sep. 5, 1999.

Stanislav Uryasev, Ph.D., "Conditional Value-at-Risk: Optimization Algorithms and Applications", www.fenews.com/fen14/valueatrisk.html, pp. 1-10, printed Sep. 3, 2003.

"Quantitative Impact Study (QIS): Overview of QIS documents", www.bis.org/cgo-bin/print.cgi, pp. 1-2, Mar. 2003, printed Apr. 28, 2003.

"Operational Risk Data Collection Exercise—2002", www.bis.org/cgi-bin/print.cgi, pp. 1-3, Jun. 4, 2002, printed Apr. 28, 2003.

"Progress towards completion of the new Basel Capital Accord", www.bis.org/cgi-bin/print.cgi, pp. 1-2, Dec. 13, 2001, printed Apr. 28, 2003.

"Basel Committee reaches agreement on New Capital Accord issues", www.bis.org/cgi-bin/print.cgi, pp. 1-4, Jul. 10, 2002, printed Apr. 28, 2003.

"The Basel Committee on Banking Supervision", www.bis.org/bcbs/aboutbcbs.htm, pp. 1-3, printed Apr. 28, 2003.

"Internal Measurement Approach <Foundation Model>", pp. 1-12.

"Principles for the Management and Supervision of Interest Rate Risk", *Basel Committee on Banking Supervision*, Jan. 2001, pp. 1-30.

"Asset Securitisation", *Basel Committee on Banking Supervision*, Jan. 2001, pp. 1-28.

"The New Basel Capital Accord", *Basel Committee on Banking Supervision*, Jan. 2001, pp. 1-133.

"Principles for the Management and Supervision of Interest Rate Risk" *Basel Committee on Banking Supervision*, Jan. 2001, pp. 1-39.

"Pillar 2 (Supervisory Review Process)", *Basel Committee on Banking Supervision*, Jan. 2001, pp. 1-14.

"Pillar 3 (Market Discipline)", *Basel Committee on Banking Supervision*, Jan. 2001, pp. 1-59.

"The Standardised Approach to Credit Risk", *Basel Committee on Banking Supervision*, Jan. 2001, pp. 1-52.

"The Internal Ratings-Based Approach", *Basel Committee on Banking Supervision*, pp. 1-102, Jan. 2001.

"Operational Risk", *Basel Committee on Banking Supervision*, pp. 1-26, Jan. 2001.

"Overview of the New Basel Capital Accord" *Basel Committee on Banking Supervision*, pp. 1-37, Jan. 2001.

"The New Basel Capital Accord: an explanatory note", *Secretariat of the Basel Committee on Banking Supervision*, pp. 1-14, Jan. 2001.

"Operational Risk Management", *Basel Committee on Banking Supervision*, Basel, pp. 1-18, Sep. 1998.

"Internal Measurement Approach <Foundation Model>", *Sumitomo Mitsui Banking Corporation*, pp. 1-51.

"Operational Risk Management—The Next Frontier", www.bettermanagement.com, pp. 1-6, printed Apr. 28, 2003.

"Operational Risk Management: A Practical Approach and its Regulatory Implications" *Presentation by Federal Reserve Bank of Boston*, Nov. 2001, 32 pages.

Working Paper on the Regulatory Treatment of Operational Risk, *Basel Committee on Banking Supervision*, pp. 1-35, Sep. 2001.

"Taking Control of Operational Risk", *Internal Measurement Approach*, Carol Alexander, 2001, pp. 1-7.

Prior Art cited in U.S. App. No. 10/670,987, filed Sep. 24, 2003, which is relied on for an earlier effective filing date under 35 U.S.C. § 120.

* cited by examiner

*Fig. 4*

| | Advantages | Disadvantages |
|---|---|---|
| IMA | • Relatively easy to implement<br>• Moderate loss data collection would suffice<br>• Good maintenance properties | • Linear map from expected to unexpected loss required<br>• Tendency of overstating the unexpected loss, thus leading to higher operational capital charge |
| LDA | • Genuine statistical model to determine the unexpected loss<br>• Good basis for accurate calculation of operational capital charge<br>• High flexibility ensures future validity | • Quite high implementation effort necessary as extensive loss data required (especially delicate for low frequency / high severity events)<br>• Thorough understanding of methodology required to ensure maintenance |

| Reduction of mean monthly frequency by | 5% | 10% | 15% | 20% | 25% | 30% |
|---|---|---|---|---|---|---|
| Total number of avoided losses during the 16 months | 33.1 | 66.3 | 99.45 | 132.6 | 165.8 | 198.9 |
| Mean monthly event frequency | 39.37 | 37.30 | 35.22 | 33.15 | 31.08 | 29.01 |
| VaR with 99% confidence in EUR | 15.3 Mio | 15.0 Mio | 13.0 Mio | 12.4 Mio | 10.0 Mio | 9.1 Mio |

Fig. 5

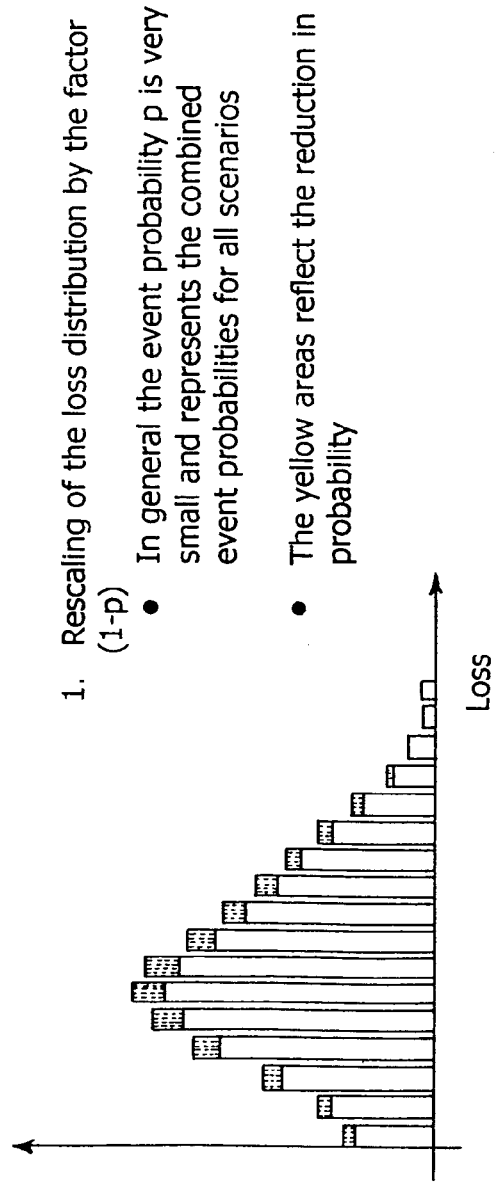
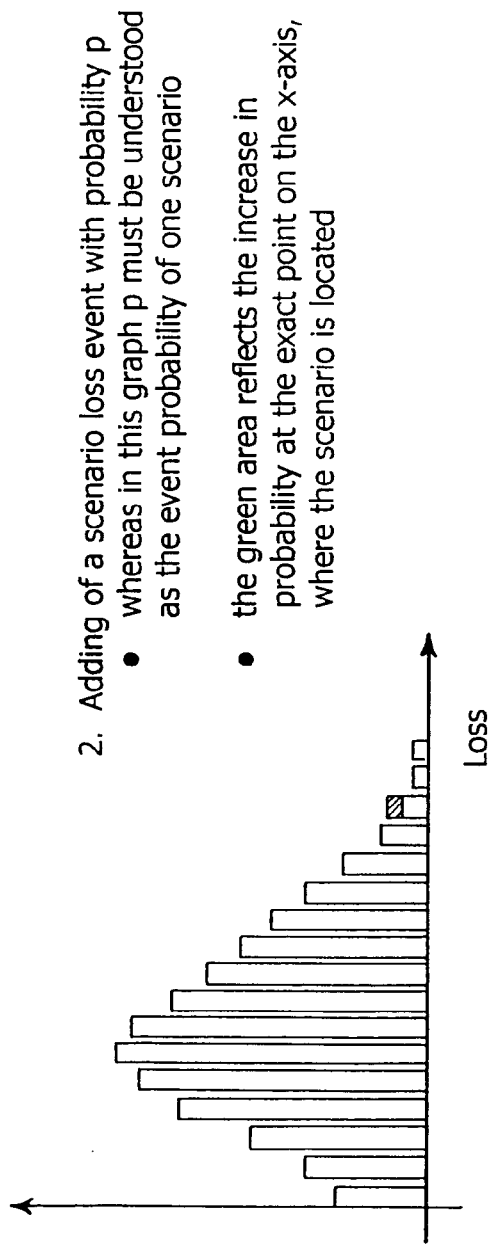

Fig. 9
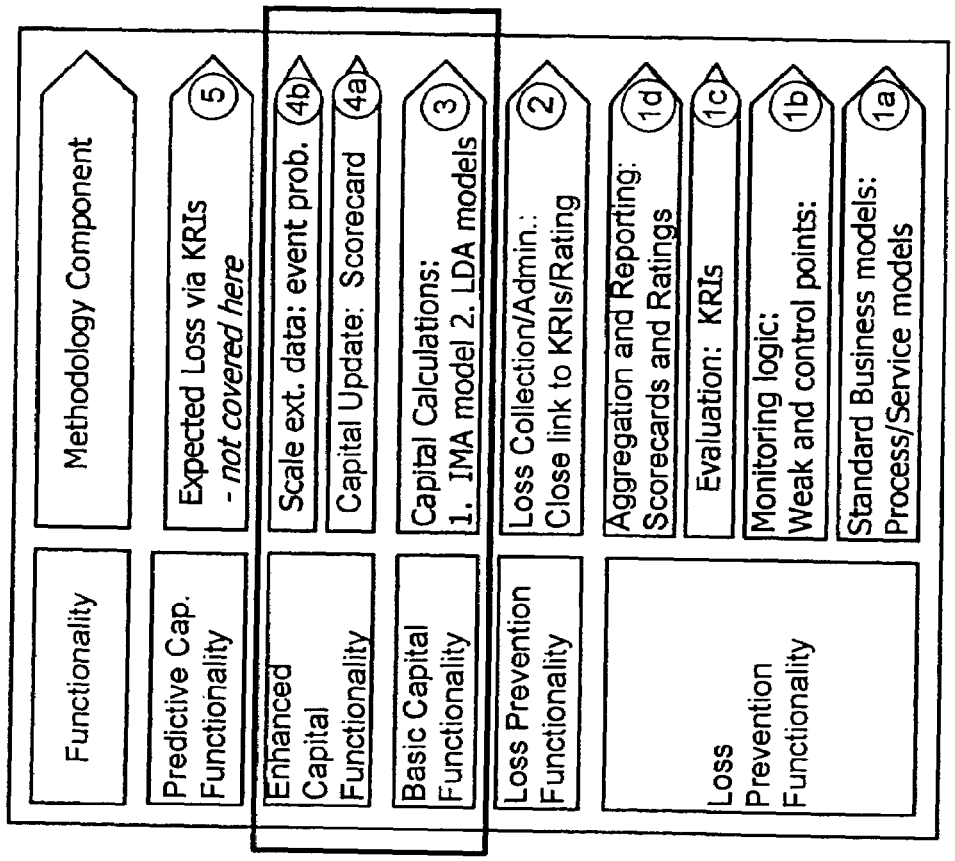
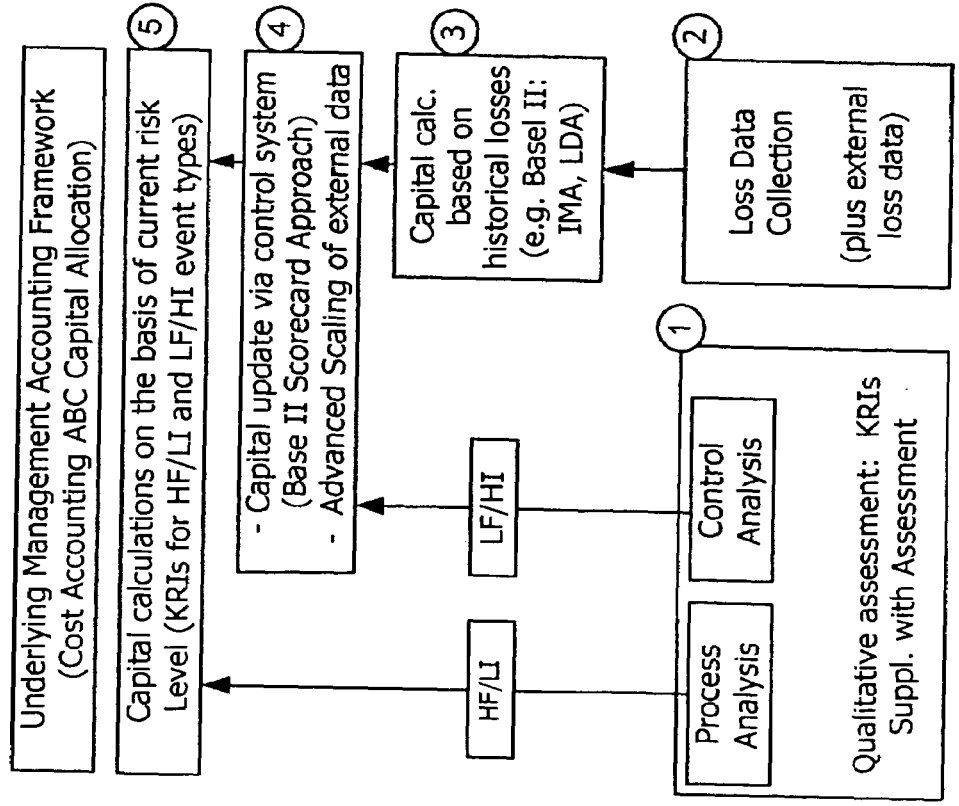

Basic Capital Calculations (e.g. IMA und LDA)

The basic calculation functionality works with historical data only

- IMA: linear map of expected and unexpected loss: $K_{ijk} = \gamma_{ijk} \times EI_i \times PE_{ijk} \times LGE_{ijk} = \gamma_{ijk} \times EL_{ijk}$
- LDA Loss Frequency
    - Poisson or
    - In the case of Overdispersion: negative binomial

- LDA Loss Severity
    - Lognormal for the body of the distribution
    - Extreme Value Theory for the tail For the tail: Generalized Pareto
    $$G_{\xi,\beta}(t) = \begin{cases} 1 - \left(1 + \frac{\xi(t-u)}{\beta}\right)^{-1/\xi}, & \xi \neq 0 \\ 1 - \exp\left(-\frac{t-u}{\beta}\right), & \xi = 0 \end{cases}$$

- Use of (pre-scaled) external data
- Inclusion of Insurance (mathematical representation!)
- Convolution into overall loss distribution: Calculation of VaR, Expected Shortfall, unexpected loss
- Flexible bottom-up Aggregation of Analysis units into capital for the overall bank
    - Regulatory: Basel II-Matrix of 56 nodes
    - Internal MUST: Aggregation according to internal business lines and organizational units

- Sensitivity analysis and Scenarios (Stress Testing)

*Note:* many banks use qualitative assessments or scalar data for capital allocation purposes of a top-down overall capital. This method is not covered by the prototype as the necessary mathematics and approach as the necessary mathematics and approach are straight-forward but may differ substantially from bank to bank..

Fig. 13

| AUName | BusinessLine | EventName | OrgStructureName | Process |
|---|---|---|---|---|
| Basel-10-TS-EPW | Trading & Sales | Employment Practices and Workplace Safety | Sud | Backoffice |
| Basel-10-TS-EPW | Trading & Sales | Employment Practices and Workplace Safety | West | Callcenter |
| Basel-10-TS-EPW | Trading & Sales | Employment Practices and Workplace Safety | Ost | Callcenter |
| Basel-10-TS-EPW | Trading & Sales | Employment Practices and Workplace Safety | Ost | Online |
| Basel-10-TS-EPW | Trading & Sales | Employment Practices and Workplace Safety | Ost | Backoffice |
| Basel-10-TS-EPW | Trading & Sales | Employment Practices and Workplace Safety | Ost | Frontoffice |
| Basel-10-TS-EPW | Trading & Sales | Employment Practices and Workplace Safety | West | Frontoffice |
| Basel-10-TS-EPW | Trading & Sales | Employment Practices and Workplace Safety | Sud | Online |
| Basel-10-TS-EPW | Trading & Sales | Employment Practices and Workplace Safety | West | Backoffice |
| Basel-10-TS-EPW | Trading & Sales | Employment Practices and Workplace Safety | Nord | Frontoffice |
| Basel-10-TS-EPW | Trading & Sales | Employment Practices and Workplace Safety | Nord | Callcenter |
| Basel-10-TS-EPW | Trading & Sales | Employment Practices and Workplace Safety | Nord | Online |
| Basel-10-TS-EPW | Trading & Sales | Employment Practices and Workplace Safety | Nord | Backoffice |
| Basel-10-TS-EPW | Trading & Sales | Employment Practices and Workplace Safety | West | Frontoffice |
| Basel-10-TS-EPW | Trading & Sales | Employment Practices and Workplace Safety | Sud | Online |
| Basel-11-TS-CPBP | Trading & Sales | Clients, Products & Business Practices | West | Callcenter Frontoffice |

OR-TOOL-|frmToSelectCalc: Form

| Main Form | Basel-16-RB-EF | | | | Type of Insurance Contract | 1 |

Analysis Data between  01.01.98  and  10.09.02    Time-Horizon of Forecast  Yearly    Expert Estimation Included  No    Expert Weight  100

| Audit Data | Expert Estimation | Insurance Settings | IMA | LDA Frequency | LDA Severity Prep. | LDA results | SCA Regression settings | SCA-IMA Regression | SCA Regression results | SCA |

Calculated Parameters of Internal Measurement Approach

Expected Number of Events per Yearly    21,68

Loss given event    27,497,05

Expected Total Loss per Yearly    596,251.79

Exposure Indicator *    0.00

Gamma *    0.00

Regulatory Capital    0.00

[Run]

Upper Bound on the 99.9% Quantile (over 1 year)

Assuming Finite Variance and applying Chebychev's Inequality    9,827,134.89

Assuming Finite Variance and Unmodality (Visochansky-Piturin Inequality)    6,750,173,66

Fig. 17

| OR-TOOL-[frmToSelectCalc: Form] |
|---|

| Main Form | Basel-16-RB-EF | | | | Type of Insurance Contract | 1 |

Analysis Data between  01.01.98  and  10.09.02    Time-Horizon of Forecast  Yearly    Expert Estimation Included  No    Expert Weight  100

| Audit Data | Expert Estimation | Insurance Settings | IMA | LDA Frequency | LDA Severity Prep. | LDA results | SCA Regression settings | SCA-IMA Regression | SCA Regression results | SCA |

Type of Insurance contract used for Analysis Unit

Type of Insurance Contract*   [1 ▷]        Type 1: individual insurance cover of severe loss events Type 2: collective insurance cover for frequent loss events Range of Losses Covered by Insurance From*                         1,000.00

To*                          40,000.00

Proportion of Analysis Unit covered*   1

Proportion of Loss covered*            1

Fig. 18

OR-TOOL-[frmToSelectCalc: Form]

| Main Form | Basel-16-RB-EF | | | Type of Insurance Contract | 1 |

Analysis Data between  01.01.98  and  10.09.02   Time-Horizon of Forecast  Yearly   Expert Estimation Included  No   Expert Weight  100

| Audit Data | Expert Estimation | Insurance Settings | IMA | LDA Frequency | LDA Severity Prep. | LDA results | SCA Regression settings | SCA-IMA Regression | SCA Regression results | SCA |

Frequency

Poisson Parameter (Lambda)     1.81

Poisson LM Test for Overdispersion     11.91

Probability for corrections of Poisson Distribution     0.00000

2. second Parameter for Negative Binominal Distribution     1.24 ▷

Recommended Distribution     Negative Binomial

Choice of Distribution*     Negative Binomial ▷     If choice of distribution is changed by user, the updated information is used for the following LDA calculations Poisson parameter Lambda Ind.
Expert Estimation     1.81

[ Run ]

| | | | | |
|---|---|---|---|---|
| OR-TOOL-[fmToSelectCalc:Form] | | | | |
| Main Form | Basel-16-RB-EF | | | |
| Analysis Data Between | 01.01.98 and 22.05.02 | Time-Horizon of Forecast Yearly | Type of Insurance Contract | 1 |
| | | Expert Estimation Included | No | Expert Weight 100 |

| Audit Data | Expert Estimation | Insurance settings | IMA | LDA Frequency | LDA Severity Prep. | LDA results | SCA Regression settings | SCA Regression results | SCA Bayes settings | SCA |

Number of Monte Carlo Runs*  10000

Simulation and Insurance Period  Yearly

Histogram Type*  Norm

[Run]

Severity Distribution Parameter  0.26

(Does not include Expert Estimation)

Mean of convoluted Loss Distribution  694,127.57

Fair Insurance premium per Period  343,800.64

| Quantile | w/o Insurance | Incl. Insurance |
|---|---|---|
| 90% | 1,100,713.90 | 1,010,074.84 |
| 95% | 1,246,46.60 | 1,140,264.98 |
| 97.5% | 1,392,510.95 | 1,260,780.45 |
| 99% | 1,587,613.14 | 1,415,801.40 |
| 99.5% | 1,722,578.70 | 1,544,302.10 |
| 99.9% | 2,018,734.55 | 1,912,084.89 |
| Unexpected loss | 1,324,606.98 | 1,226,957.12 |
| Expected shortfall | 2,150,038.22 | 2,091,014.22 |

SCA Regression w/o Insurance

Total Loss over Forecast Horizon

SCA Regression with Insurance

Total Loss over Forecast Horizon

Fig. 23

| OR-TOOL-[frmToSelectCalc:Form] | | | | | | | | | | | |
|---|---|---|---|---|---|---|---|---|---|---|---|
| Main Form | Basel-16-RB-EF | | | | | | | | | | |
| Analysis Data between | 01.01.98 | and | 10.09.02 | | Time-Horizon of Forecast | Yearly | | Type of Insurance Contract | 1 | | |
| | | | | | | | | Expert Estimation included | No | Expert Weight | 100 |

| Insurance settings | IMA | LDA Frequency | LDA Severity Prep. | LDA results | SCA Regression settings | SCA-IMA Regression | SCA Regression results | SCA Bayes settings | SCA-IMA Bayes |
|---|---|---|---|---|---|---|---|---|---|

Poisson Case                                    Negative binomial Case

Prior gamma density parameter Gamma    0.55        Prior beta density parameter a                               1.81

Prior gamma density parameter Beta     3.29        Prior beta density parameter b                               4.14

Prior Mean for Event Frequency mu      1.81        Prior Mean of Event Probability p                            0.30
(calculated for a monthly horizon)                 (estimated as the quotient of mu and sigma^2 -
                                                   calculated for a monthly horizon)

Prior Variance of Mean sigma ^ 2       5.94        Prior Variance of Event Probability p                        0.03

Variance (Fixed)                                             5.94

Posterior gamma density parameter Gamma 2.35       Posterior beta density parameter a                           2.59

Posterior gamma density parameter Beta  0.77       Posterior beta density parameter b                           5.94

Posterior Mean for Event Frequency      1.80       Posterior Mean of Event Probability                          0.30
(calculated for a monthly horizon)                 (calculated a monthly horizon)

Posterior Variance of Mean              1.38       Posterior Variance of Probability                            0.02

[ Run ]

Updating Mean Information    1.80       Choice of Distribution    Negative Binomial ▽

Fig. 25

OR-TOOL - [frmToSelectCalc:Form]

| Main Form | | | | | Type of Insurance Contract | 1 |

Basel-16-RB-EF

Analysis Data between  01.01.98  and  10.09.02   Time-Horizon of Forecast  Yearly   Expert Estimation Included  No   Expert Weight  100

| LDA Severity | LDA results | SCA Regression settings | SCA-IMA Regression | SCA Regression results | SCA Bayes settings | SCA-IMA Bayes | SCA Bayes results | Sensitivity Analysis | Se | current frequency mean  1.81                      current severity parameter xi  0.26                          0.3

Frequency Mean Lamda*  1.80   1.90                xi*  0.2

| Quantile | Total Loss | | | Quantile | Total Loss | |
|---|---|---|---|---|---|---|
| 90% | 1,093,325.46 | 1,200,276.24 | | 90% | 1,023,232.32 | 1,097,015.32 |
| 95% | 1,320,490.34 | 1,486,755.00 | | 95% | 1,186,605.20 | 1,285,863.37 |
| 97.5% | 1,570,578.04 | 1,925,030.23 | | 97.5% | 1,347,501.51 | 1,492,552.52 |
| 99% | 2,078,825.23 | 2,834,531.81 | | 99% | 1,541,691.29 | 1,244,278.92 |
| 99.5% | 2,666,684.15 | 3,170,445.17 | | 99.5% | 1,872,429.53 | 1,945,330.70 |
| 99.9% | 3,628,766.89 | 3,848,798.51 | | 99.9% | 1,980,739.86 | 2,435,697.55 |

Simulation Approach*  Latin Hypercube ▷

No. of Simulation Areas*  5          Run

Fig. 26

| OR-TOOL-[frmToSelectCalc:Form] | | | | | | | | |
|---|---|---|---|---|---|---|---|---|
| Main Form | Basel-16-RB-EF | | | | | Type of Insurance Contract | 1 | |
| Analysis Data between | 01.01.98 | and | 10.09.02 | Time-Horizon of Forecast | Yearly | Expert Estimation Included | No | Expert Weight | 100 |

| LDA results | SCA Regression settings | SCA-IMA Regression | SCA Regression results | Sca Bayes settings | SCA-IMA Bayes | SCA Bayes results | Sensitivity Analysis | Select Distribution |
|---|---|---|---|---|---|---|---|---|

| Loss Distribution Approach | 99.9% | 4,003,951.89 | | |
|---|---|---|---|---|
| Loss Distribution Approach (with Insurance) | 99.9% | 2,765,668.25 | Fair Insurance Premuim per Period | 347,172.82 |
| Score Card Regression Approach | 99.9% | 4,194,012.29 | | |
| Score Card Regression Approach (with Insurance) | 99.9% | 2,768,399.90 | Fair Insurance Premium per Period | 119,019.71 |
| Score Card Bayes Approach | 99.9% | 3,364,456.24 | | |
| Score Card Bayes Approach (with Insurance) | 99.9% | 2,503,668.11 | Fair Insurance Premium per Period | 321,055.57 |

Fig. 27

OR-TOOL-[frmToSelectCalc: Form]

Aggregation Tree Definition

Aggregation level:
[ Level 7 ▽ ]

Available sources:
- Basel-10-TS-EPW
- Basel-11-TS-CPBP
- Basel-12-TS-DPA
- Basel-13-TS-BDSF
- Basel-14-TS-EDPM
- Basel-15-RB-IF
- Basel-17-RB-EDW
- Basel-18-RB-CPBP
- Basel-19-RB-DPA
- Basel-1-CF-IF
- Basel-20-RB-BDSF
- Basel-21-RB-EDPM
- Basel-22-CB-IF
- Basel-24-CB-EPW
- Basel-25-CB-CPBP
- Basel-26-CB-DPA
- Basel-27-CB-BDSF
- Basel-28-CB-EDPM
- Basel-29-PS-IF
- Basel-31-PS-EPW

[ Add => ]
[ <=Delete ]
[ Shift source => ]
[ Shift all = = = > ]

Aggregations:
- External Fraud – Investment Banking
- External Fraud – Banking
- External Fraud - Others

[ Delete Aggregation Tree ]   [ ? ]

Members of selected aggregation:
- Basel-16-RB-EF
- Basel-23-CB-EF
- Basel-30-PS-EF
- Basel-37-ASC-EF Aggregation name:
[                    ]

[ ^ Create ^ ]

Fig. 30

Snapshot Viewer-[rptALLAUCalcResults.snp]

Report – Operational Risk Measures of Analysis Units

Analysis Unit Name: Basel-10TS-EPW

| | | | Calculation method | Loss Distribution Approach with Insurance | | |
|---|---|---|---|---|---|---|
| Mean | Expected Shortfall | 90% Quantile | 95% Quantile | 97.5% Quantile | 99% Quantile | 99.5% Quantile | 99.9% Quantile |
| 781,304.70 | 2,224,999.29 | 1,164,202.92 | 1,322,841.47 | 2,885,108.25 | 1,605,402.38 | 1,713,347.04 | 2,045,842.87 |

Analysis Unit Name: Basel-11-TS_CPBP

| | | | Calculation method Loss Distribution Approach | | | |
|---|---|---|---|---|---|---|
| Mean | Expected Shortfall | 90% Quantile | 95% Quantile | 97.5% Quantile | 99% Quantile | 99.5% Quantile | 99.9% Quantile |
| 276,355.81 | 20,509,219.61 | 516,554.02 | 768,161.43 | 1,121,425.01 | 1,868,481.97 | 3,408,897.88 | 11,909,960.07 |

Analysis Unit Name: Basel-16-RB-EF

| | | | Calculation method Loss Distribution Approach | | | |
|---|---|---|---|---|---|---|
| Mean | Expected Shortfall | 90% Quantile | 95% Quantile | 97.5% Quantile | 99% Quantile | 99.5% Quantile | 99.9% Quantile |
| 720,719.52 | 2,494,012.69 | 1,129,488.72 | 1,285,430.09 | 1,434,298.20 | 1,658,770.58 | 1,764,172.23 | 2,087,923.91 |

Analysis Unit Name: Basel-23-CB-EF

| | | | Calculation method Loss Distribution Approach | | | |
|---|---|---|---|---|---|---|
| Mean | Expected Shortfall | 90% Quantile | 95% Quantile | 97.5% Quantile | 99% Quantile | 99.5% Quantile | 99.9% Quantile |
| 700,880.08 | 107,657,739.36 | 1,210,981.45 | 1,766,947.04 | 2,746,474.73 | 4,991,636.24 | 7,222,335.46 | 30,896,604.89 |

Fig. 36

OR-TOOL-[frmExternLossesConfigured]

Defined Properties on Basel-Node Level

Relevant Check-Points

| | Description | mju | sigma |
|---|---|---|---|
| P1: | Vieraugenprinzip | 0.49 | 0.6 |
| P2: | Technischer Pkt | 0.95 | 0.03 |
| P3: | test3 | 0.95 | 0.03 |
| P4: | test4 | 0.4 | 0.3 |
| P5: | test5 | 0.5 | 0.55 |

Cut-off value: 100540

Business Line: Corporate Finance
Event Type: Internal Fraud

Calculate — Recalculate Internal Probability and Loss Value For Selected BusinessLine/Event Type Apply Defined Check-Points
- ☑ Point 1
- ☑ Point 2
- ☐ Point 3
- ☐ Point 4
- ☐ Point 5

Internal Probability: 0.633221417219
Internal Loss Value: 66700
Loss Value: 66700

☑ Use Data

BusinessLine: Corporate Finance
EventName: Internal Fraud
OrgStructureName: Nord
Process: Backoffice
LossOccurrenceDate: 20-Miz-00

LossDescription:
In June 1998, the Personal Investment Authority (PIA) levied a 400,00 GBP line agent Financial Options for practices related to pensions mis-selling. Financial Options was also cited for 'grave' faults in the firm's recruitment, training, and supervision

Fig. 37

Already Defined Analysis Units

Basel-10-TS-EPW
Basel-11-TS-CPBP
Basel-12-TS-DPA
Basel-13-TS-BDSF
Basel-14-TS-EDPM
Basel-15-RB-IF
Basel-16-RB-EF
Basel-17-RB-EPW
Basel-18-RB-CPBP
Basel-19-RB-DPA
Basel-1-CF-IF
Basel-20-RB-BDSF
Basel-21-RB-EDPM
Basel-22-CB-IF
Basel-23-CB-EF
Basel-24-CB-EPW
Basel-25-CB-CPBP
Basel-26-CB-DPA
Basel-27-CB-BDSF
Basel-28-CB-EDPM
Basel-29-PS-IF
Basel-30-PS-EPW
Basel-31-PS-EPW
Basel-32-PS-CPBP
Basel-33-PS-DPA
Basel-34-PS-BDSF
Basel-35-PS-EDPM
Basel-36ASC-IF
Basel-37-ASCEF Choose Name for new Unit Please choose a Business Line Corporate Finance
Trading & Sales
Retail Banking
Commercial Banking
Payment and Settlement
Agency Services and Custody
Asset Management
Retail Brokerage Please choose an Event Internal Fraud
External Fraud
Employment Practices and Workplace
Clerks, Products & Business Practices
Damage to Physical Assets
Business Disruption and System
Failure
Execution, Delivery & Process Manage Please choose an Organization Nord
Sud
Ost
West Please choose a Process Frontoffice
Backoffice
Online
Callcenter

Fig. 38

| OR-TOOL-[frmToSelectCalc:Form] |
|---|

Main Form: Basel-16-RB-EF

Analysis Data between  01.01.98  and  10.09.02   Time-Horizon of Forecast  Yearly   Type of Insurance Contract  1

| Audit Data | Expert Estimation | Insurance settings | IMA | LDA Frequency | LDA Severity Prep. | LDA results | SCA Regression settings | SCA-IMA Regression | SCA Regression results | SCA |

Calculated Parameters of Internal Measurement Approach – for time horizon Yearly Expected Number of Events in time horizon  14.80
(as calculated from Regression settings)

Loss given event  27,497.05

Expected Total Loss per time horizon  407,018.19

Expert Estimation Included  No   Expert Weight  100

Run

QUANTIFICATION OF OPERATIONAL RISKS

This application is a continuation of application Ser. No. 10/670,987, by Schaf et al. and entitled Quantification of Operational Risks, filed Sep. 24, 2003 now abandoned, hereby incorporated by reference herein, which claims the benefit of provisional application No. 60/435,892 by Schaf et al. and entitled Quantification of Operational Risks Method And System, filed Dec. 20, 2002, which is hereby incorporated by reference herein.

BACKGROUND

Concept for the Quantification of Operational Risks

1. Operational Risk Measurement—Introduction and Summary

Just recently operational risks gained considerable attention as huge losses occurred in the banking industry due to such risks. There is no natural definition of operational risks, and so different definitions are used in practice. The Basel Committee on banking supervision defines in its recent publication operational risks as the risk of loss from inadequate or failed internal processes, people and systems or from external events. It is also the definition used herein. See Basel Committee on Banking Supervision, Working Paper on the Regulatory Treatment of Operational Risk (September 2001).

For the purpose of this section, operational risk measurement is referred to as the quantification of the risk in terms of economic or regulatory capital. For operational risks, other forms of quantification (like rating systems or scorings) are appropriate as well. These are not discussed here. The quantification of the operational risks are further referred to herein in terms of the Basel II AMAs, i.e. the Internal Measurement Approach, the Loss Distribution Approach and the Scorecard Approach. One should not expect substantial measurement efforts (in the definition of this section) for the Basic and Standardised Approach and thus these are not discussed here.

At the heart of operational risk measurement is the collection of loss data—the collected data should in a minimum consist of the loss or potential loss amount, the corresponding business activity, i.e. the reference to the process/service model and the loss event date. The loss data collection must be supplemented with rating, indicator, or scoring data in order to model the Basel II Scorecard Approach.

To enable usage of the risk measurement result in the business management processes and thus well-founded management decisions, it is necessary to allow separate analysis for internal business lines and—ideally—processes, business units and possibly other organizational units (all per loss type). As a regulatory minimal AMA requirement, a bank has to model regulatory capital per business line and loss type (a matrix of 56 nodes). A more-dimensional matrix that combines internal and regulatory views, would be optimal for a bank. But, such a matrix (the matrix may also be referred to as the aggregation tree, which results when mapping the more-dimensional matrix to an aggregation tree) would be of extreme granularity and would contain several hundred nodes to model. All modeling must take place on the lowest node level and then be aggregated. The ideal modeling process would thus be 1. model up to a thousand modeling nodes, 2. aggregate for internal purposes and report and 3. aggregate for Basel purposes using a different aggregation dimension. One cannot expect to have sufficient loss data for such an ideal process. So, the first and most important modeling requirement is the definition of pre-aggregations of data to be modeled, i.e. determine the node structure of the more-dimensional matrix. In doing so, the user must be aware of the fact that by doing so, one might have to give up expectations that internal and regulatory capital results will be the same.

The measurement methodologies for operational risk include statistical/actuarial methods as well as econometrical techniques. The difficulty in measuring operational loss is the large variety of possible loss amounts—ranging from high frequency/low severity losses to low frequency/high severity losses. The latter type of events is rarely observed but of extreme importance for the modeling process.

A bank can distinguish between expected losses (covered by net profit), unexpected losses (covered by risk capital) and stress losses (requires core capital and hedging). The fact that the extreme stress losses are the really dangerous loss events for a financial institution emphasizes once more the necessity for a high-quality loss data collection to ensure valid risk modeling, and thus appropriate operational risk charges.

In the following, modeling methods for all AMAs are introduced, methods to include insurance coverage and use of external data in each AMA model as well as a method to optimize the bank-wide insurance portfolio are introduced, and how model validation, back-testing, stress testing, and scenario analysis is included in the modeling process is described.

Although the models described for an exemplary aggregation and node structure of loss data may be implemented using either an Excel-Sheet, an Access database or other software, and Access database with adequate input and reporting functionality is preferred. When referring to these technical solutions, the solutions are referred to herein as 'the tool'.

Note on the Advanced Measurement Approaches (AMA) of the Basel II-Accord:

The Basel Committee has adopted the concept of Advanced Measurement Approaches (AMA) for internal assessment of operational risk capital. All approaches are rooted in loss data collection and verification of applied methodologies. Otherwise banks are relatively free in developing their own approaches as long as these comply with the fairly general requirements set out by the Committee.

At the moment a number of different approaches has been developed which are now in discussion. Despite the flexibility until now, three broad types of AMA have emerged:

The internal measurement approaches (IMA)
The loss distribution approaches (LDA)
The scorecard approaches.

Banks may also choose to combine these different approaches. The committee explicitly stresses the point that there might be further types of AMA.

This description discusses the three AMA in detail. This provides a systematic comparison of the methodologies and can thus support banks in the decision making process for the most suitable approach. It also covers explanations of the explicit or implicit assumptions of the models in order to serve as a handbook for a modeling user in a bank. The description covers important issues like consideration of insurance and inclusion of external data for all three approaches.

The methods described below implicitly answer the requirements set forth above.

BRIEF SUMMARY

In one aspect of the invention, a computer-readable medium for storing a program is provided for measuring an operational risk of an institution. Accordingly, the program directs the computer to execute the steps of inputting multi-dimensional loss data, selecting an advanced measurement approach, calculating the advanced measurement approach, defining aggregations, calculating a value at risk, and outputting the calculated value at risk. The inputting step inputs multi-dimensional loss data in which a plurality of analysis nodes are formed by the multi-dimensional loss data and a plurality of node inputs are thus provided to correspond to the analysis nodes. The selecting step selects one of a plurality of advanced measurement approaches, including a loss distribution approach, a scorecard approach or an internal measurement approach, to model the loss data at the analysis nodes so that different of the advanced measurement approaches are selectable for different of the analysis nodes. The calculating step calculates the advanced measurement approaches so that multiple models of loss data can be calculated for each of the analysis nodes. The defining aggregations step defines aggregations in which the aggregations are defined by structures that aggregate the analysis nodes. The calculating step calculates a value at risk of the aggregations in which the calculated value at risk is calculated in response to the advanced measurement approaches that are selected for the analysis nodes. The outputting step outputs the value of risk. The computer-readable medium may also comprise a defining analysis units step. The defining analysis units step defines analysis units so that the analysis nodes are aggregated into the analysis units and the node inputs are thus provided by analysis unit inputs. The selecting step then selects one of the plurality of advanced measurement approaches to model the loss data at the analysis units so that different of the advanced measurement approaches are selectable for different of the analysis units. The aggregations of the aggregating step are then defined by structures that aggregate the analysis units. The calculated value at risk of the calculating step is then calculated in response to the advanced measurement approaches that are selected for the analysis units.

In another aspect of the invention, a computer system is provided for measuring an operational risk of an institution. The computer application comprises a first means, a second means, a third means, a fourth means, a fifth means and a sixth means. The first means loads multi-dimensional loss data in which a plurality of analysis nodes are formed by the multi-dimensional loss data and a plurality of node inputs are thus provided to correspond to the analysis nodes. The second means calculates a plurality of advanced measurement approaches that comprise at least a loss distribution approach and a scorecard approach to calculate multiple models of the loss data. The third means selects one of the plurality of advanced measurement approaches to model the loss data at the analysis nodes so that different of the advanced measurement approaches are selectable for different of the analysis nodes. The fourth means defines aggregations in which the aggregations are defined by structures that aggregate the analysis nodes. The fifth means calculates a value at risk of the aggregations in which the calculated value at risk is calculated in response to the advanced measurement approaches selected for the analysis nodes. The sixth means defines analysis units so that the analysis nodes are aggregated into the analysis units. The third means selects one of the plurality of advanced measurement approaches to model the loss data at the analysis units so that different of the advanced measurement approaches are selectable for different of the analysis units. The aggregations of the fourth means are defined by structures that aggregate the analysis units. The calculated value at risk of the fifth means is calculated in response to the advanced measurement approaches that are selected for the analysis units.

In another aspect of the invention, a method that is implemented on a microprocessor is provided for quantifying operational risks. The method comprises loading loss data, determining an expected event probability, calculating a capital charge, calculating the impact of insurance coverage and analyzing the loss data. The loss data is loaded for an event type in which the event type is internal fraud, external fraud, employment practice, workplace safety, clients, products, business practices, physical damage, business disruption and system failure, or execution, delivery, and process management. The expected event probability is determined for the event type. The capital charge is calculated in response to the expected event probability using an advanced measurement approach in which the advanced measurement approach includes at least an internal measurement approach, a loss distribution approach, or a scorecard approach. The impact of insurance coverage is calculated on the capital charge. The loss data is analyzed under at least one scenario.

Additional aspects of the invention not summarized here are also described and claimed.

BRIEF DESCRIPTION OF SEVERAL VIEWS OF THE DRAWINGS

The invention is illustrated in the drawings, in which:

FIG. 4 is a table of advantages and disadvantages;

FIG. 5 is a table of values at risk;

FIG. 7 is a graph of resealing of the loss distribution;

FIG. 8 is a graph of adding of a scenario loss event;

FIG. 9 is an illustration of requirements and methodology;

FIG. 10 is an illustration of basic capital calculations;

FIG. 13 is a screen display of the quantification tool;
FIG. 14 is a screen display of the quantification tool;
FIG. 15 is a screen display of the quantification tool;
FIG. 16 is a screen display of the quantification tool;
FIG. 17 is a screen display of the quantification tool;
FIG. 18 is a screen display of the quantification tool;
FIG. 19 is a screen display of the quantification tool;
FIG. 20 is a screen display of the quantification tool;
FIG. 21 is a screen display of the quantification tool;
FIG. 22 is a screen display of the quantification tool;
FIG. 23 is a screen display of the quantification tool;
FIG. 25 is a screen display of the quantification tool;
FIG. 26 is a screen display of the quantification tool;
FIG. 27 is a screen display of the quantification tool;
FIG. 30 is a screen display of the quantification tool;
FIG. 36 is a screen display of the quantification tool;

FIG. 37 is a screen display of the quantification tool;
FIG. 38 is a screen display of the quantification tool;
FIG. 39 is a screen display of the quantification tool;
FIG. 40 is a screen display of the quantification tool.

DETAILED DESCRIPTION

Figure 1:
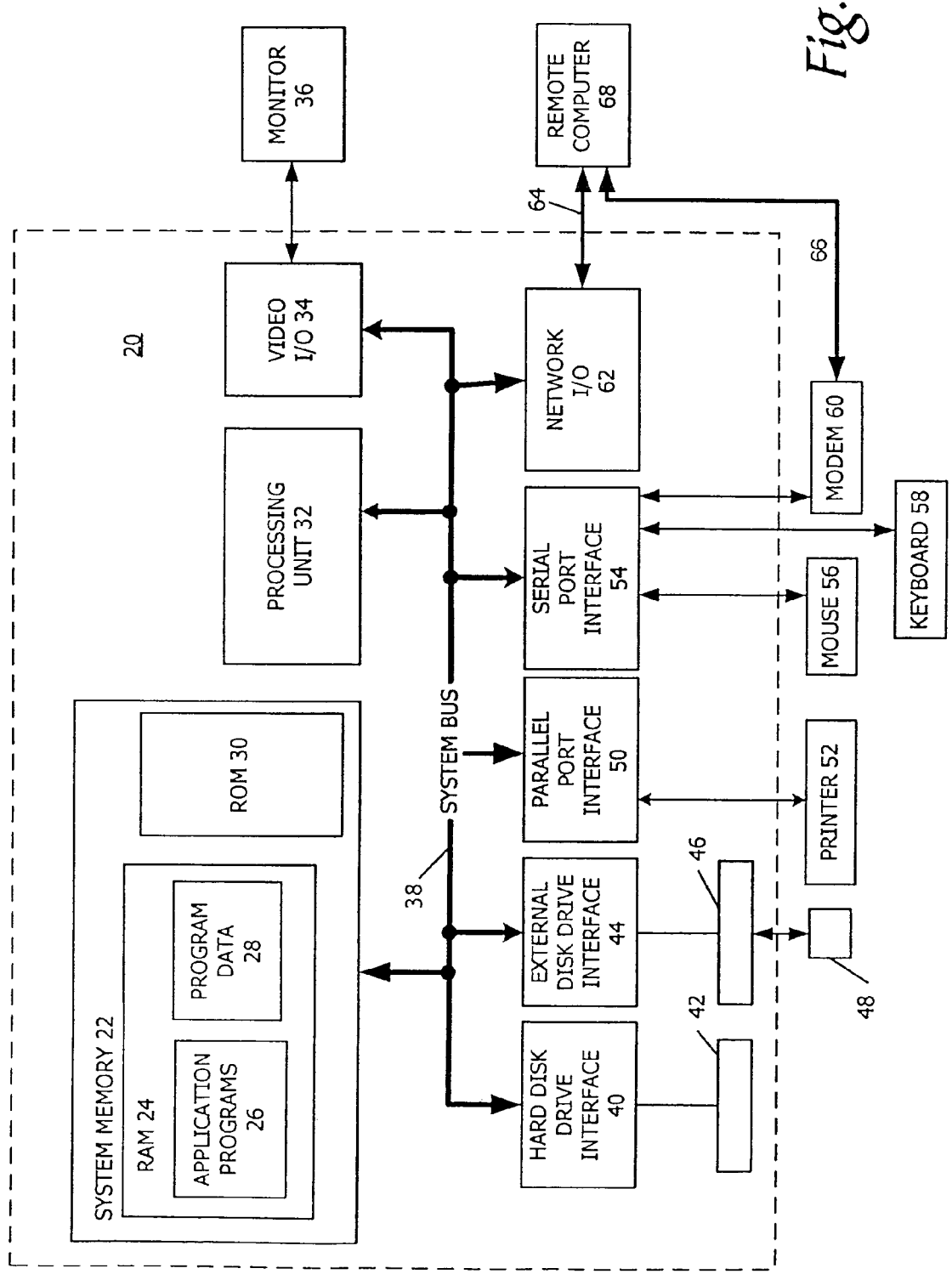
FIG. 1 is a schematic of a computer system.

With reference to FIG. 1, an exemplary system for implementing the invention includes a general purpose computing device in the form of a conventional computing environment 20, including a processing unit 32, a system memory 22, and a system bus 38, that couples various system components including the system memory 22 to the processing unit 32. The processing unit 32 may perform arithmetic, logic and/or control operations by accessing system memory 22. The system memory 22 may store information and/or instructions for use in combination with processing unit 32. The system memory 22 may include volatile and non-volatile memory, such as random access memory (RAM) 24 and read only memory (ROM) 30. A basic input/output system (BIOS) containing the basic routines that helps to transfer information between elements within the personal computer 20, such as during start-up, may be stored in ROM 30. The system bus 38 may be any of several types of bus structures including a memory bus or memory controller, a peripheral bus, and a local bus using any of a variety of bus architectures.

The personal computer 20 may further include a hard disk drive 42 for reading from and writing to a hard disk (not shown), and an external disk drive 46 for reading from or writing to a removable disk 48. The removable disk may be a magnetic disk for a magnetic disk driver or an optical disk such as a CD ROM for an optical disk drive. The hard disk drive 42 and external disk drive 46 are connected to the system bus 38 by a hard disk drive interface 40 and an external disk drive interface 44, respectively. The drives and their associated computer-readable media provide nonvolatile storage of computer readable instructions, data structures, program modules and other data for the personal computer 20. Although the exemplary environment described herein employs a hard disk and an external disk 48, it should be appreciated by those skilled in the art that other types of computer readable media which can store data that is accessible by a computer, such as magnetic cassettes, flash memory cards, digital video disks, random access memories, read only memories, and the like, may also be used in the exemplary operating environment.

A number of program modules may be stored on the hard disk, external disk 48, ROM 30 or RAM 22, including an operating system (not shown), one or more application programs 26, other program modules (not shown), and program data 28. The application programs may include the functionality as detailed in FIGS. 2-3.

A user may enter commands and information, as discussed below, into the personal computer 20 through input devices such as keyboard 58 and mouse 56. Other input devices (not shown) may include a microphone (or other sensors), joystick, game pad, scanner, or the like. These and other input devices may be connected to the processing unit 32 through a serial port interface 54 that is coupled to the system bus, or may be collected by other interfaces, such as a parallel port interface 50, game port or a universal serial bus (USB). Further, information may be printed using printer 52. The printer 52, and other parallel input/output devices may be connected to the processing unit 32 through parallel port interface 50. A monitor 36 or other type of display device is also connected to the system bus 38 via an interface, such as a video input/output 34. In addition to the monitor, computing environment 20 may include other peripheral output devices (not shown), such as speakers or other audible output.

The computing environment 20 may communicate with other electronic devices such as a computer, telephone (wired or wireless), personal digital assistant, television, or the like. To communicate, the computer environment 20 may operate in a networked environment using connections to one or more electronic devices. FIG. 1 depicts the computer environment networked with remote computer 68. The remote computer 48 may be another computing environment such as a server, a router, a network PC, a peer device or other common network node, and may include many or all of the elements described above relative to the computing environment 20. The logical connections depicted in FIG. 1 include a local area network (LAN) 64 and a wide area network (WAN) 66. Such networking environments are commonplace in offices, enterprise-wide computer networks, intranets and the Internet.

When used in a LAN networking environment, the computing environment 20 may be connected to the LAN 64 through a network I/O 62. When used in a WAN networking environment, the computing environment 20 may include a modem 60 or other means for establishing communications over the WAN 66. The modem 60, which may be internal or external to computing environment 20, is connected to the system bus 38 via the serial port interface 54. In a networked environment, program modules depicted relative to the computing environment 20, or portions thereof, may be stored in a remote memory storage device resident on or accessible to remote computer 68. It will be appreciated that the network connections shown are exemplary and other means of establishing a communications link between the electronic devices may be used.

Figure 2:
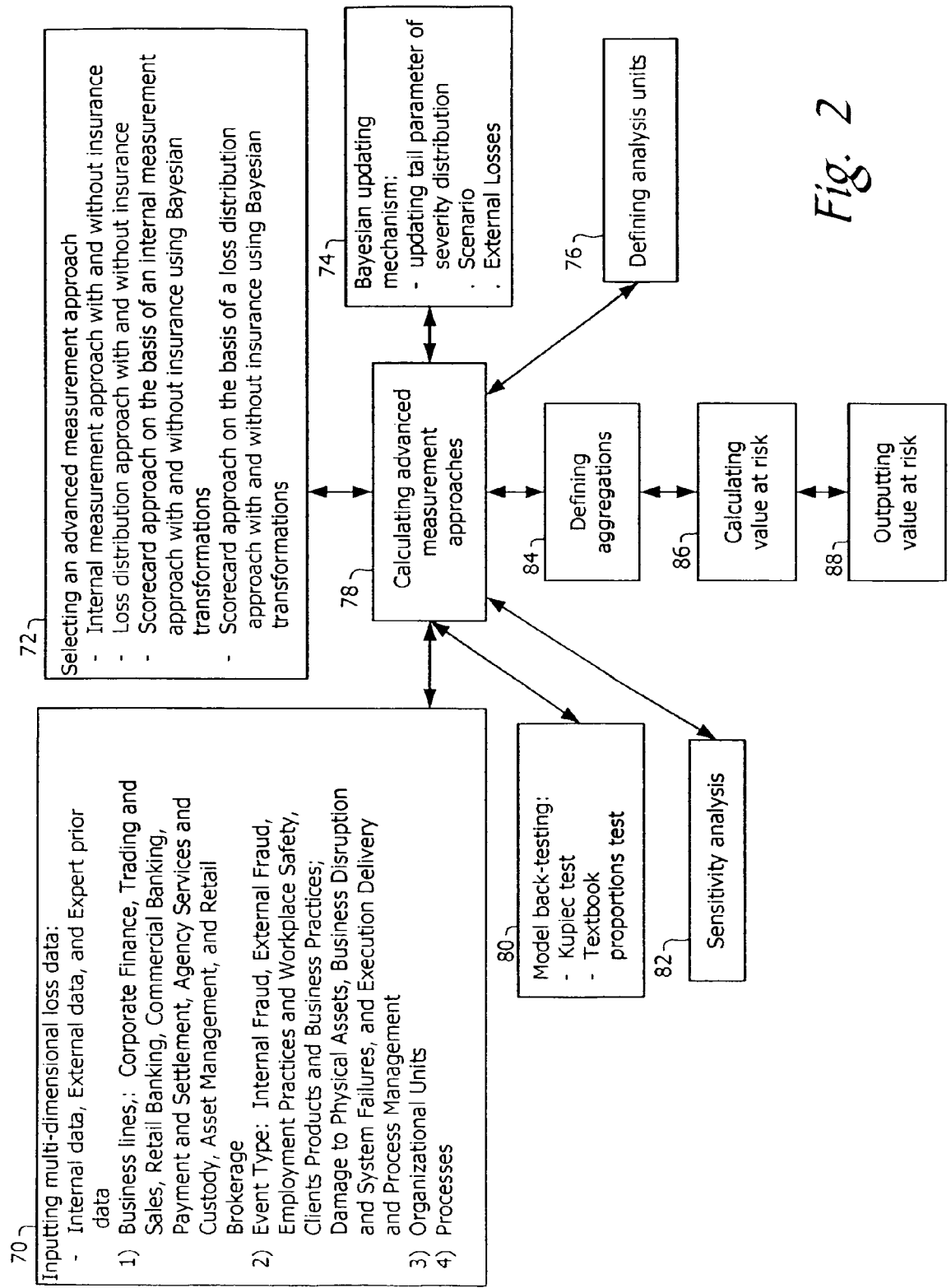
FIG. 2 is a flow chart of one embodiment for measuring operational risks.

Turning to FIG. 2, a flow chart of one embodiment for measuring operational risks is provided. Accordingly, multi-dimensional loss data is input into a computer system as seen in block 70. The loss data may be in the form of either internal data, external data or expert prior data. The data may also have as many as four dimensions, including business lines, event type, organizational units and processes. The business lines may be corporate finance, trading and sales, retail banking, commercial banking, payment and settlement, agency services and custody, asset management, and retail brokerage. In addition, the event type may be internal fraud, external fraud, employment practices and workplace safety, clients products and business practices; damage to physical assets, business disruption and system failures, and execution delivery and process management. Next, a plurality of advanced measurement approaches is provided, and one of the advanced measurement approach is selected as seen in block 72. Examples of the advanced measurement approaches that may be used include the internal measurement approach with and without insurance, the loss distribution approach with and without insurance, the scorecard approach on the basis of an internal measurement approach with and without insurance using Bayesian transformations, and the scorecard approach on the basis of a loss distribution approach with and without insurance using Bayesian transformations. Analysis units may also be defined as seen in block 76. The computer calculates the advanced measurement approaches as seen in block 78. In calculating the advanced measurement approaches, a Bayesian updating mechanism may be used as seen in block 74. In addition, model back-testing and sensitivity analysis are provided as seen in blocks 80 and 82. Next, aggregations are defined as seen in block 84. The computer then calculates a value at risk in response to the selected advanced measurement approaches as seen in block 86. Finally, the value at risk is output for evaluation as seen in block 88. Further details of each step are also described below.

Figure 3:
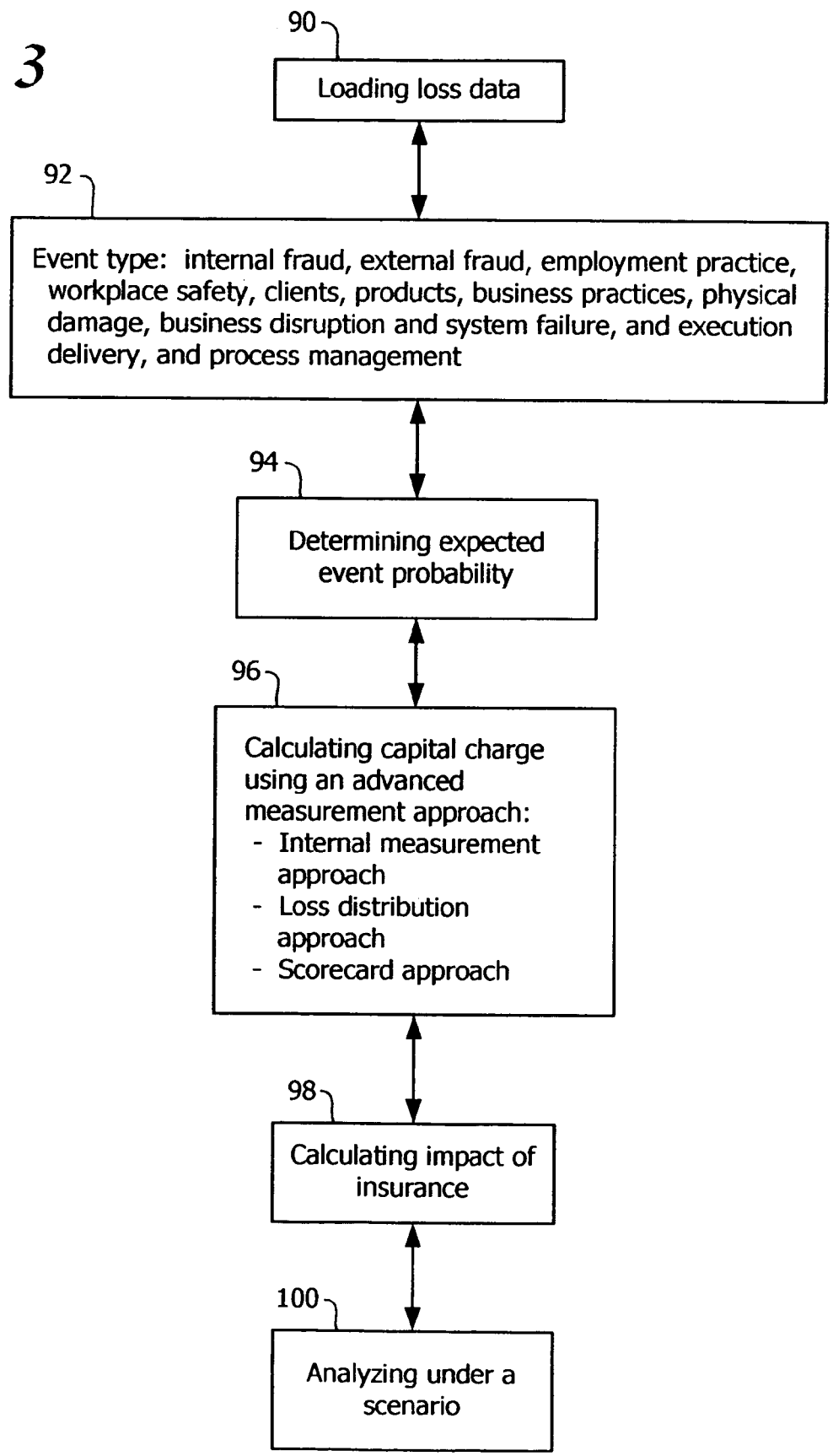
FIG. 3 is a flow chart of another embodiment for measuring operational risks.

Turning to FIG. 3, a flow chart of another embodiment for measuring operational risks is provided. Accordingly, loss data is loaded into a computer system as seen in block 90. The loss data is loaded for event types as seen in block 92. The event types may be internal fraud, external fraud, employment practice, workplace safety, clients, products, business practices, physical damage, business disruption and system failure, and execution, delivery, and process management. Next, an expected event probability is determined as seen in block 94. The computer system then calculates a capital charge in response to the expected event probability using an advanced measurement approach as seen in block 96. The advance measurement approach may include an internal measurement approach, a loss distribution approach, or a scorecard approach. The computer system then calculates the impact of insurance coverage on the capital charge as seen in block 98. Finally, the loss data is analyzed under different scenarios as seen in block 100. Additional steps may also be included as described herein, such as incorporating a modeling process using external or scenario lass data. Further details of each step are also described below.

2. The Modeling Process and Data Requirements

When a bank has decided to use an AMA it still has to decide which of the following approaches to implement:
1. the IMA;
2. the LDA;
3. the scorecard approach on the basis of the IMA;
4. the scorecard approach on the basis on the LDA.

For a well-founded decision the bank will need to consider:
the business case, i.e. capital charge savings;
loss data availability;
availability of consistent qualitative data (scorecards).

In practice banks will use several if not all possible models in order to identify the most appropriate one.

In this section models and techniques for all four approaches will be described. This includes tests and decision rules to automate the modeling process as far as possible.

2.1. Summary of the Modeling Process

1. Design of Input Data and Aggregation Structure (One-time Effort).

The granularity of the model aimed at determines the aggregation structure. The aggregation structure is influenced by the modeling dimensions of a bank: internal business lines and Basel business lines, organizational structures that are independent from business lines and the Basel loss event types.

The appropriate structure is achieved by defining the granularity that will allow aggregation for all dimensions needed. A trade-off needs to be made because the amount of loss data will be insufficient with growing granularity of the aggregation structure. It is therefore recommended to design two aggregation trees: one for Basel purposes and one for internal capital allocation purposes. The trade-off here is that at the highest level of the two trees (the overall bank level) the results will most likely differ, which should not be the case in reality.

For each elementary node of the aggregation tree (or the two trees) a separate sheet will be available for actual modeling. The tool will require internal loss data to be imported and assembled in a way that corresponds to the nodes on the most elementary level of the aggregation structure(s).

2. External Data to Supplement the Internal Data (Regular Effort)

For each node a decision has to be reached whether or not to include external loss data. The tool provides tests to support this decision. If external data is necessary it will then be included into the tool the same way as the imported internal loss data.

3. The Actual Modeling Process (Regular Effort)

All four AMA are possible models for each node. For efficiency reasons the bank should find a good way of combining different models.

The IMA

If the bank decides to use the IMA it has to fulfill moderate data requirements. According to the data structure (see next section) the expected event probabilities and the expected losses in the case of an event have to be determined. The basis here are past loss data. Moreover all relevant insurances have to be included into the consideration. The capital charge then results by scaling the expected loss by a factor—defined by the regulator—that will then render the necessary unexpected loss.

The LDA

When applying the loss distribution approach (LDA) the level of data requirements is significantly higher. Here the bank has to have an extensive collection of internal loss data for modeling the frequency and severity distributions. Especially for seldom events one will need to augment the loss data by including relevant external data (see step 2 above). Having this data, one should perform an overdispersion test for the frequency distribution to get a rough idea of the type of distribution (Poisson of negative binomial). Moreover for the severity distribution one needs to find a threshold u separating low and high severity events. Possible insurance cover will affect the loss distributions. These are then used to determine the values at risk which in turn form the basis for the operational capital charges. An upper bound for the value at risk is obtained using Chebychev's inequality. To obtain a better understanding of the tail and to have a sub-additive measure (valuable for the aggregation), it is sensible to compute as well the expected shortfall.

The Scorecard Approaches

In the scorecard approach one first needs to decide whether an IMA or an LDA should be the basis for the scorecard. The next decision—which cannot be supported by technical testing means and needs to be made probably only once—is on whether a standard statistical regression model shall be applied to model the relationship between the qualitative scores and the loss experience of the bank or a Bayesian transformation. Both models are described here. Depending on whether an IMA or an LDA is to be used, the Bayesian transformation will be for the expected loss probability or the loss frequency (and here again for the Poisson and the negative binomial cases) respectively.

Model Testing and Sensitivity Analysis/Scenarios

The important issue of model back-testing (Kupiec test, proportions test) as well as stress testing/sensitivity analysis must be performed on a node level as well as on the level of the highest aggregation. This is done at the end of the modeling process.

Section 3 covers the mathematics on the first analysis of incoming data, section 4 discusses the use of external data and section 5 covers the mathematics for all AMA models and technical tests/rules.

2.2. The Data Structure for the AMA and Aggregation in the Tool

The details of block 70 of FIG. 2 and blocks 90, 92 and 94 of FIG. 3 are described here in the following text along with additional descriptions in other parts of the text.

For the AMA the data has to be collected systematically in order to comply with the Basel II requirements and to allow specific allocation of operational risks.

The Basel Committee Prescribes the Following Coarse Structure

Business Lines:
  Investment Banking (Corporate Finance, Trading and Sales)
  Banking (Retail Banking, Commercial Banking, Payment and Settlement, Agency Services and Custody)
  Others (Asset Management, Retail Brokerage)

Event Type Classification
  Internal Fraud
  External Fraud
  Employment Practices and Workplace Safety
  Clients, Products and Business Practices
  Damage to Physical Assets
  Business Disruption and System Failures
  Execution, Delivery and Process Management In addition it is sensible to add a further dimension reflecting the internal organizational structure. Here a distribution of activities (e.g. IT Services, Back Office) in to the various cells will be necessary.

Internal risk reporting can differ from Basel reporting. The tool must be able to calculate risk measures for any granularity and to aggregate them to higher levels—up to a firm-wide measure. This will add at least one other dimension to the aggregation: the organizational dimension. All considered, a three-dimensional grid structuring business lines, risk-types and organizational units is thus obtained. In addition, a fourth dimension structuring internal processes may be included.

It is assumed that the user provides disaggregated data (e.g. for organizational units) from a data collection tool. The user has to specify an aggregation hierarchy for the quantification in the quantification tool. The quantification tool therefore starts with loss series for individual units and respects the aggregation hierarchy in the simulation and reporting of losses, either by adding individual risk measures (implicitly assuming full correlation) or by individual simulating assuming independence. The tool does not build aggregates of individual losses. If the user wishes to calculate a risk measure for losses of different units taken together as one series, he has to perform a pre-aggregation of the data in the loss collection tool.

3. Data Analysis

Before starting the modeling process one must ensure that there is an appropriate data basis. In this section a few tests are described for the analysis of loss data. The next section describes what to do, when the amount of data is insufficient for modeling purposes.

3.1. The Q-Q Plot

Let $X_1, \ldots, X_n$ be a set of iid random variables with ordered statistics $X_{n,n} \leq \ldots \leq X_{1,n}$. Moreover let $F_n$ denote the empirical distribution $$F_n(X_{k,n}) := \frac{n-k+1}{n}.$$

For a particular estimated parametric distribution F the Quantile-Quantile plot (Q-Q plot) is defined as $$\left\{ \left( X_{k,n}, F^{-1}\left(\frac{n-k+1}{n}\right) \right) : k \in \{1, \ldots, n\} \right\}.$$

When this plot is linear, the estimated distribution F fits the sample distribution well. This is one way of comparing different estimated distributions and selecting the best one.

Practically the test for linearity could be performed as follows:

Define form $$m < n, Q_m := \left\{ \left( X_{k,n}, F^{-1}\left(\frac{n-k+1}{n}\right) \right) : k \in \{m, \ldots, n\} \right\},$$

a partial Q-Q plot. For increasing m determine for each $Q_m$ a linear regression and determine the distance of the data points from the regression line. As long as this distance is small the fit of the parametric distribution is good enough. Growth of the distance shows clearly that a linear fit is no longer appropriate, and thus the fit is not good. As a threshold, one could take the smallest $X_{k,n}$ where this effect can be observed.

3.1.1. Q-Q Plot for the Frequency Distribution

To find the best fit for the frequency distribution, one may compare the Q-Q plots for the Poisson and the negative binomial distributions. Preferably, the distribution which shows the best linear behavior is chosen.

3.1.2. Q-Q Plot for the Severity Distribution

Especially for high severity events one will not expect to have ample data available. This can again be seen from the Q-Q plot: one would expect such losses to have a heavy tail. Thus, if a good fit with only one distribution (in the case of severity this would be a log normal distribution) is seen, one can conclude that there is not enough high severity loss data in the collection. For the tail data one should see a clear deviation of the linear plot. The threshold can be determined using the partial Q-Q plots $Q_m$ defined above.

3.2. The Mean Excess Function

For the estimated frequency and severity distributions, the mean excess function is an indicator for the degree of heaviness of the distribution.

Let X be a random variable and let $u_0 > 0$ be a threshold. The mean excess function may now be defined as $e(u) = E(X - u : X > u_0)$, for $0 \leq u < u_0$.

The value e(u) is called the mean excess over the threshold u. In order to get an idea about the tail behavior of a distribution, one may compare its mean excess function with the mean excess function of the log normal distribution.

When the mean excess function of a distribution lies above the log normal mean excess, it is heavy-tailed, thus obtaining a test for the tail distribution. The threshold $u_0$ should be large enough so that one can be certain that it lies in the tail. It can be externally defined, and if necessary internally adjusted. One valid idea for the threshold is to derive from external industry data or from the results of the Basel findings on loss behavior for the various loss event types and business lines.

4. Including External Data

When it becomes clear from the data analysis that there is not enough loss data for good statistical modeling, one would need to include external loss data. This would be of particular importance for seldom events with high severities as those are rarely observed. In this case the integration of external loss data will be essential to ensure an appropriate data basis for operational risk modeling.

For the body of the distribution (the 99.9%-quantile) the exact fit of the parametric distribution is of lesser importance as the really dangerous operational risks lie in the tail of the loss distribution. But, if there is not enough data for the estimation of the body, one would need to include external loss data for this as well.

The problem with using external loss data is the question of whether these data are meaningful for the specific bank. Moreover it is not at all clear from the beginning which data to select for analysis as external data collections have intrinsically a certain selection bias. The main challenge here is to collect good data as no standardized source exists.

In addition the external data can be classified either by reasons or by consequences. The first classification criterion is the appropriate one as only such data allows one to decide whether the specific loss data is relevant or not. This way one also captures "near losses".

The suggested procedure for the integration of external loss data is the following:
Thorough qualitative analysis of external data
  Can this loss event occur in the particular bank?
  How likely is this loss event to occur within the particular bank?
  Include data only if the probability for the loss event is sufficiently high.
Scaling of external loss data
  Which is the best scaling method? Here one needs to consider the size of the bank as well as other external conditions (e.g. the legal environment).
When including external loss data, always assume that the frequencies of high severity losses at all banks are the same.

The inclusion of external data is a manual process, which requires a certain degree of expertise. In addition, the process of including external losses in the database is an effort that will not have to be repeated for every internal reporting period. Very likely, the external data will change incrementally over time by the user removing external losses and adding new ones. For external (regulatory) reporting though, it will be inevitable to use—and explain, why one uses—the external events chosen for modeling.

4.1. Expert Prior

When there is no internal or external data available, one might need to rely on an expert prior to start with. Such a prior loss distribution can be obtained as follows:
  Divide the loss amount scale into significant loss buckets.
  Interview experts about the number of losses in the respective buckets.
  Use the obtained loss distribution as a prior distribution in the further analysis.

This expert prior needs to be assigned a weighting in order to be able to include genuine, i.e. measured, loss data. Let w∈N be the weight for the expert prior. Using a uniform distribution on the value range of losses, one can generate w points modeling the prior distribution. Any additional data is subsequently just included in the loss data set.

5. The Basic Structure of the AMA

The details of blocks 78, 84 and 86 of FIG. 2 and blocks 96 and 98 of FIG. 3 are described here in the following text along with additional descriptions in other parts of the text.

Figure 42:
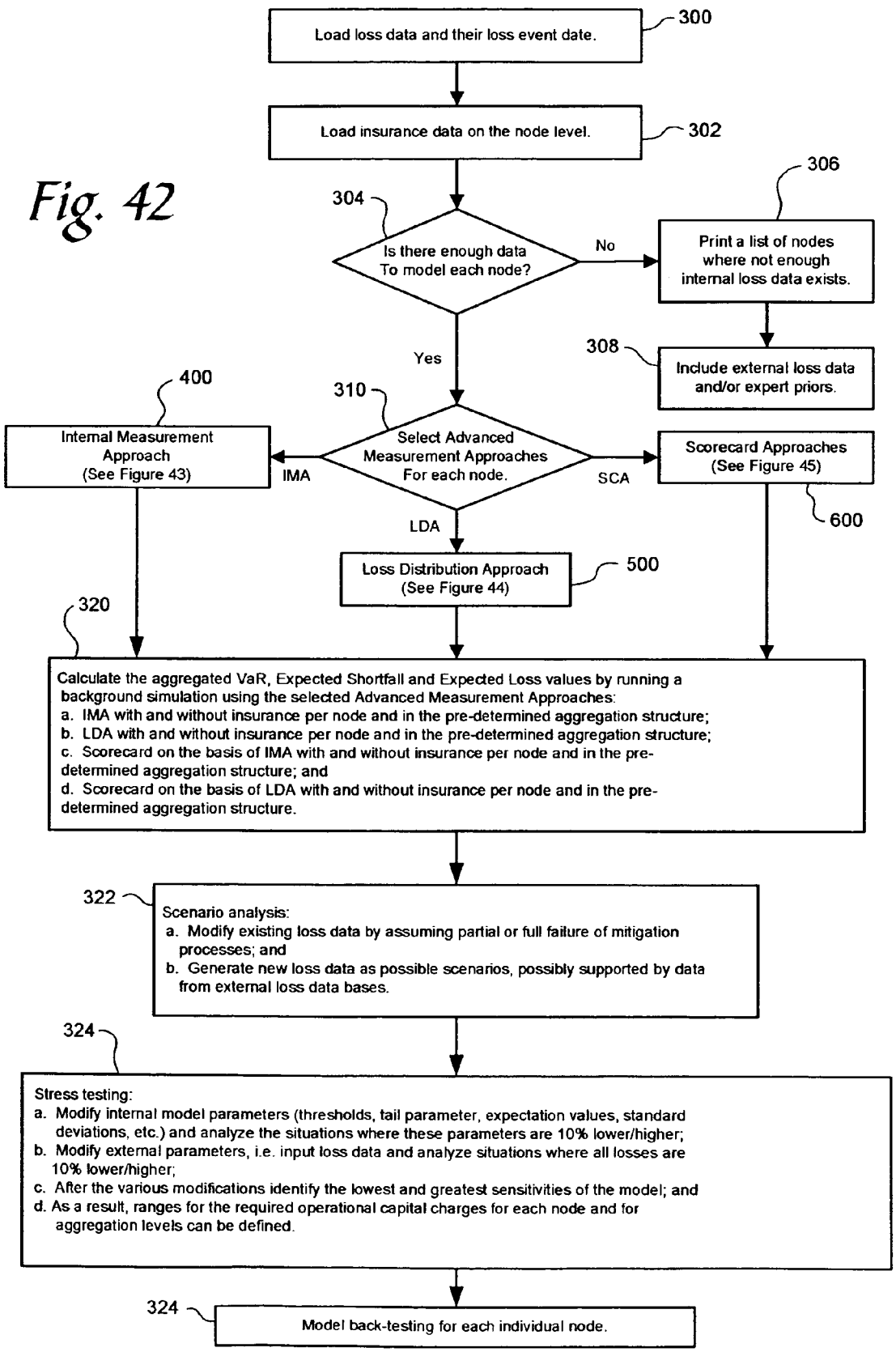
FIG. 42 is a flow chart of another embodiment for measuring operational risks.

For each node in the aggregation structure, it is necessary to have a separate loss description, quantification and capital allocation. See, e.g., block 310 of FIG. 42. The key elements are the frequency and the severity of losses for the respective node. There must be also a way to aggregate the capital charges at the node-level to various higher levels.

5.1. The Internal Measurement Approach (IMA)

In the IMA the operational risk capital is estimated on the basis of expected operational losses. This means that there is assumed a fixed relationship between the expected and the unexpected losses (the tail of the density function for the distribution). This relationship might be very subtle and highly complex.

The key ingredients for the IMA are:
PE: the probability of an operational risk event;
LGE: the loss given the occurrence of an operational risk event;
EI: the exposure indicator capturing the scale of the bank's activities within a particular business line.

Assuming a linear relationship between expected and unexpected losses, one obtains for the required capital charges of a Basel node $$K_{ij} = \gamma_{ij} \times EI_i \times PE_{ij} \times LGE_{ij} = \gamma_{ij} \times EL_{ij},$$

where the indexes parameterize the three-grid (the index i stands for the business lines, j runs over loss event types). As the expectation values are linear the overall capital charge is obtained by summing over all nodes $$K_{total} = \sum_{i,j} K_{ij}.$$

The aggregation to other levels is in this case similarly straight forward. In the IMA it is important to have a reliable and valid estimation of the probabilities and loss amounts, and to determine the transformation mapping ($\gamma_{ij}$) correctly. One certainly will need to verify that such a mapping exists as this is not at all clear from the beginning. For example, for the normal distribution there is no straight forward relationship between expected and unexpected losses. But one can find good approximations via a binomial distribution with small probabilities p. For a detailed discussion see the last section of this section.

The factors $\gamma_{ij}$ are fixed by the regulators though there might be adjustments if the bank demonstrates that it has a loss distribution far from the industry norm.

5.1.1. Consideration of Insurance

Insurances are a tool for mitigating negative consequences from loss events. They will not influence the frequency of events, but the severity, i.e. the loss amount, only.

5.1.1.1. Applying the Binomial Distribution Model to Insurance

Let L be the loss amount and R the recovery amount in the case of a loss event. Moreover let C be the premium for the insurance policy. Assuming that the occurrence of a loss event is binomially distributed with probability p the expected loss over one year would be $$E_{1\_Year}(L) = p(L-R) + C.$$

Thus a fair premium would be C=pR.

A fairly priced insurance will not change the expected loss but it will reduce the volatility (standard deviation) and thus the $\gamma_{ijk}$-factors. So the bank will have the chance to reduce its operational capital charge.

5.1.1.2. Extending to the Normal Distribution Model

In general one cannot expect to have a good relation between the expected and the unexpected losses. But when one uses the special properties of a distribution it might be possible to find such a map, a good example will be discussed here.

The normal distribution can be seen as the limit case of the binomial distribution just discussed in the previous section. Hence, one can use features of both distributions and in this way obtain further insight into the impact of an insurance cover on the operational capital charge.

In the case of normal distribution there is still no straightforward relationship between the expected and unexpected losses, but the unexpected loss is a multiple of the standard deviation: For a 99.9%-confidence level the unexpected loss is approximately $3\sigma$.

The normal distribution $N(\mu, \sigma^2)$ can be approximated with a binomial distribution $B(N, p)$ with LGE=L for large N. For the standard deviation, one then has $$\sigma = L\sqrt{Np(1-p)} \approx L\sqrt{Np}, \text{ when } p \text{ is small}.$$

Thus, one obtains approximately $$\frac{\text{Unexpected.Loss}_{99.9\%}}{\text{Expected.Loss}_{99.9\%}} = \frac{3L\sqrt{Np}}{LNp} = \frac{3}{\sqrt{Np}}.$$

This shows that the corresponding $\gamma_{ijk}$ are proportional to $$\frac{1}{\sqrt{Np}}.$$

With the consideration of insurance this means that the standard deviation becomes $$\sigma_{Insurance} = (L-R)\sqrt{Np}.$$

Hence the $\gamma_{ijk}$ in this case are now proportional to $$\frac{(L-R)\sqrt{Np}}{LNp} = \left(1 - \frac{R}{L}\right)\frac{1}{\sqrt{Np}}.$$

Here the quotient $$\frac{R}{L}$$

is also called the recovery rate. Here one sees again that the standard deviation decreases leading to a reduced operational capital charge.

This is rather an example where one can explicitly find a map from the expected to the unexpected loss and how an insurance influences the operational capital charge. In real life one would not expect to find normally distributed processes.

5.2. The Loss Distribution Approach (LDA)

In the LDA, banks estimate for each node of the three-grid the distribution of operational losses over a certain future horizon (for example one year). The capital charge is then determined based on a high percentile of the loss distribution (in discussion is a 99.9%-level).

Typically the loss distribution is derived from individual frequency and severity distributions, which are assumed to be independent, i.e. a specific loss event is a random draw from the frequency and severity distributions. This way one obtains an operational value at risk for each node of the grid. The individual values at risk can then be aggregated using different methods.

One way of doing so could be by considering correlations. For the sake of simplicity one could restrict oneself to pairwise correlations only. Even in this situation it will not be trivial to determine the necessary factors. Simply summing the operational values at risk figures over the respective nodes would overstate the operational risk of the bank and would consequently lead to an unnecessary high capital charge.

Another way for aggregation is to perform a Monte-Carlo-Simulation. This method requires more computational effort (which is by no means an issue) but is conceptually significantly easier than the previous method.

In the latter, the description of the frequency and severity distributions follows.

In the LDA it is essential to have enough high-quality loss data. Two distributions have to be estimated: the frequency distribution and the severity distribution.

To estimate the frequency distribution for each node the number of loss events is counted over a certain period of time (typically one month).

For the estimation of the severity distribution node-wise the corresponding loss amounts are collected.

5.2.1. Testing for Overdispersion in the Frequency Distribution

The Poisson model is a restriction of the negative binomial model. Thus, one can test for overdispersion using the likelihood ratio test or the Lagrange multiplier test.

The LR test statistic is $$LR = -2(\ln \hat{L}_{Poisson} - \ln \hat{L}_{negbin}),$$

where $\hat{L}_{poisson}$ and $\hat{L}_{negbin}$ are the values of the likelihood functions for the Poisson and the negative binomial model, respectively. Under the null hypothesis of no overdispersion the test statistic is distributed chi-squared with one degree of freedom. The Lagrange mulipliers test statistic is $$LM = \frac{\sum_{t=1}^{T}\left[(y_t - \hat{\lambda}_t)^2 - y_t\right]}{\sqrt{2\sum_{t=1}^{T}\hat{\lambda}_t^2}},$$

which is standard normal under the null hypothesis of no overdispersion. The LM test statistic has the advantage that one only needs to estimate the Poisson model to compute it.

5.2.2. The Frequency Distribution

It is quite common to assume that the frequency of loss events follows a Poisson distribution. The probability that the value X of the random variable equals x is in this case given by $$P(x) = \frac{e^{-\mu}\mu^x}{x!}.$$

For the Poisson distribution the expectation value $\mu$ equals the variance. This is obviously very special and although widely used in practice one would not expect such frequency functions in real life. Thus it seems to be necessary to relax these strong assumptions and to consider alternative distributions.

A way for more realistic modeling of frequency distributions would be to use two parameters. In this context one often uses the negative binomial distribution, a two-parameter distribution. This distribution is somehow a generalization of the Poisson distribution as the conditional negative binomial distribution is Poisson. The probability for X=x in the negative binomial case is given by $$P(x) = \frac{\Gamma(x-r)}{x!\Gamma(x)} p^r (1-p)^x,$$

where $x \in \mathbb{N}$, $r \in \mathbb{R}$ and $p \in (0,1)$.

This implies for the expectation value and the variance $$E(X) = \frac{r(1-p)}{p} \text{ respectively } Var(X) = \frac{r(1-p)}{p^2}.$$

Setting $$r = \frac{1}{K} \text{ and } p = \frac{1}{1+K\mu}$$

for parameters $$K \neq 0 \text{ and } \mu \neq -\frac{1}{K},$$

one obtains now $$E(X) = \mu \text{ and } Var(X) = \mu + K\mu^2.$$

The negative binomial distribution allows modeling the expectation value and the variance independently, and thus more realistically to the actual situation. The parameters are chosen to fulfill a maximum likelihood condition.

One certainly can consider other two-parameter distributions or distributions with more parameters, but one always needs to keep in mind that the model should be kept as simple as possible in order to make it easy to work with.

5.2.3. The Severity Distribution

The second component on the way of modeling a loss distribution is to understand the severity distribution for a given event. It is of crucial importance to find a good fit of the tail with the actual distribution as these are the events that put the bank at risk. A prerequisite for reliable modeling are sufficiently much, good data. And this is a particular problem for high severity events as these are quite rare.

To overcome the scarcity of high severity events, internal loss data needs to be augmented. Here one could follow these procedures:

Generate scenario data by assuming that all mitigation processes would have failed, thus obtaining the worst case loss for the particular events;

Incorporating suitable external loss data.

Classically for the severity distribution often a log normal distribution is assumed. The corresponding density is then given as $$f(t) = \begin{cases} \frac{1}{t\sigma\sqrt{2\pi}} \exp\left(-\frac{(\log t - \mu)^2}{2\sigma^2}\right) & t > 0 \\ 0 & \text{otherwise} \end{cases}.$$

For the corresponding expectation value and the variance, one obtains $$E = \exp\left(\mu + \frac{\sigma^2}{2}\right) \text{ and } Var = \exp(2\mu + \sigma^2)(\exp(\sigma^2) - 1).$$

In practice the tail of the log normal distribution is often not fat enough, i.e. the density function decays too fast. But understanding the distributional behaviour of large severities is of particular importance to the business as these are the most dangerous risks for a business.

So one could try to look at another possible distribution for the severity: the two-parameter Weibull distribution, with density function $$f(t) = \frac{\beta}{\eta} \left(\frac{t}{\eta}\right)^{\beta-1} \exp(-(t/\eta)^\beta), t \geq 0,$$

where $\beta$ and $\eta$ are positive parameters.

In order to increase the accuracy, it might be worthwhile to introduce a threshold and to model the low severities separately from the high severities for which one could apply Extreme Value Theory (EVT).

Let u>0 be the threshold separating the low severity from the high severity events. Then one may use the Hill estimator to determine the parameters for the generalized Pareto distribution (GPD) for the tail t>u. Its distribution function reads $$G_{\xi,\beta}(t) = \begin{cases} 1 - \left(1 + \frac{\xi(t-u)}{\beta}\right)^{-1/\xi}, & \xi \neq 0 \\ 1 - \exp\left(-\frac{t-u}{\beta}\right), & \xi = 0 \end{cases},$$

with the positive scale parameter $\beta$.

Let the random variables $X_1, \ldots, X_n$ be independent and identically distributed (iid). The assumption is that there are k observations larger than u.

For the order statistics $X_{k,n} \leq X_{k-1,n} \leq \ldots \leq X_{1,n}$ one may define $$\hat{\xi} = \frac{1}{k} \sum_{i=1}^{k} (\ln X_{i,n} - \ln X_{k,n}) =: H_{k,n},$$

the average of differences of the k observations in the tail. This defines for the tail the distribution function $$\hat{F}(t) = 1 - \frac{k}{n}\left(1 + \frac{\hat{\xi}(t-u)}{X_{k,n}}\right)^{-1/\hat{\xi}}, \text{ for } t > u.$$

One would then be interested in describing the tail of the loss distribution greater than a predefined threshold. Let now c be the confidence level for the required analysis (e.g. c=99.9%). Then, the following estimate for the corresponding severity quantile is $$SQ_c = u + \frac{X_{k,n}}{\hat{\xi}}\left(\left(\frac{n(1-c)}{k}\right)^{\hat{\xi}} - 1\right).$$

Thus summarizing, a complete description of the severity distribution is as follows:

$$F(t) = \begin{cases} \left(\frac{\hat{F}(u)}{F_{log\,normal}(u)}\right) F_{log\,normal}(t), & t \le u \\ \hat{F}(t), & t > u \end{cases}.$$

In general this function will not be differentiable at u, but this is no problem at all.

In the composed severity distribution, the body, i.e. the distribution of events with low severities, has been slightly distorted. As the example uses an extremely high confidence level, this scaling does not have much impact. Nonetheless, one could compare this part of the severity distribution with the empirical distribution obtained solely on the basis of observed loss data.

5.2.4. The Selection of the Threshold Between HF/LI-Events and LF/HI-Events

A description of how to determine the threshold u is now provided. Let $X_1, \ldots, X_n$ be iid, and let $X_{n,n} \le \ldots \le X_{1,n}$ be the corresponding order statistics.

For the $H_{k,n}$ s consider now the corresponding Hill graph $$\{(k, H_{k,n}^{-1}): 1 \le k \le n-1\}.$$

Hence, this is a graph with the tail parameters belonging to the generalized Pareto distribution for the k largest observations.

The threshold u can be chosen for the stable area of the Hill graph. In order to have many values, u should be as small as possible. In practice this can be done by considering a band $$[H_{1,n}^{-1} - \varepsilon, H_{1,n}^{-1} + \varepsilon]$$

about the tail parameter for the two largest observations. The threshold u will be then chosen as follows $$u := X_{k_0,n}, \text{ where } k_0 := \max(k:H_{k,n}^{-1} \in [H_{1,n}^{-1} - \varepsilon, H_{1,n}^{-1} + \varepsilon]).$$

Properties of the Hill Estimator

Assuming individual losses are iid and under some additional conditions the Hill estimator is consistent and asymptotically normally distributed with $$\sqrt{k}(\hat{\alpha} - \alpha) \xrightarrow{d} N(0, \alpha^2), \text{ where } \hat{\alpha} = \frac{1}{\hat{\xi}} \text{ and } \alpha = \frac{1}{\xi}.$$

This allows the construction of an asymptotic confidence interval for the Hill estimator in the Hill plot.

5.2.5. Determining the Aggregated Loss Distribution

Having discussed how to estimate the distributions for the frequency and for the severity it remains to be determined now the distribution for the operational losses. It is best obtained by using Monte Carlo simulation: first draw a result from the frequency distribution, then draw as many results from the severity distribution as there are losses. Finally by summing all the losses one obtains a draw from the corresponding loss distribution. In order to generate a loss distribution one needs to perform this drawing procedure sufficiently often. This procedure results in the loss distribution for a node.

The aggregation of the individual distributions can be performed by computing the overall distribution via Monte Carlo simulation and reading off the aggregated VaR. For two loss distributions with densities $f_1$ and $f_2$ the aggregated loss distribution has the density function $$(f_1 * f_2)(t) = \int_0^t f_1(t-x)f_2(x)\,dx.$$

One major problem with the value at risk is that it does not have satisfactory sub-additivity properties. Under the dependency assumption of total positive correlation one can explicitly derive the value at risk for the aggregated loss distribution. Let $L_1(t)$ and $L_2(t)$ be two distribution functions. Note here that $x_2 = L_2^{-1}(L_1(t_1))$. Considering the function $\mu(t) := t + L_2^{-1}(L_1(t))$, the quantile $\alpha$ is now $$\alpha = P(t_1 + t_2 \le VaR(\alpha)) = E(\chi_{N(t_1) \le VaR(\alpha)}) = L_1(\mu^{-1}(VaR(\alpha)))$$

So one has $VaR(\alpha) = \mu(L_1^{-1}(\alpha))$ and can obtain thus $$VaR(\alpha) = L_1^{-1}(\alpha) + L_2^{-1}(L_1(L_1^{-1}(\alpha))) = L_1^{-1}(\alpha) + L_2^{-1}(\alpha) = VaR_1(\alpha) + VaR_2(\alpha).$$

For an arbitrary collection of nodes with corresponding values at risk $VaR_1, \ldots, VaR_k$, one has under the assumption of total positive dependence $$VaR_{agg} = \sum_i VaR_i.$$

5.2.6. Consideration of Insurance in the LDA

In case of an insurance that applies for a certain loss type only, the severity of that event is affected—not the event frequency. Let s be the density function for a severity distribution of a particular loss event. Moreover, one may assume that individual losses up to an amount of b are covered by an insurance (each separately). All the other severity values are not affected. This leads to a modified severity distribution with density function $$\tilde{s}(t) = \frac{s(t)(1 - \chi_{(0,b)})}{\int s(t)(1 - \chi_{(0,b)})},$$

where $\chi_{(0,b)}$ is the indicator function.

Using this modified severity distribution in the Monte Carlo simulation instead of the original gives the loss distribution F'(L) with insurance consideration, but still without the deduction of the paid insurance premium. By f', one may denote the corresponding density. The premium C has to be paid by the bank in any case, it is hence a certain event. The density function for the corresponding distribution (a step function) is $\delta_C$, a delta-distribution.

So one has for the loss density with premium consideration $$f(x) = (\delta_C * f')(x) = \int \delta_C(t) f'(x-t) dt.$$

The loss distribution is then $$F(L) = \int_0^L f(x) dx.$$

Alternatively, one can derive a modified loss distribution directly from the original loss distribution. Let $L \geq 0$ be the loss amount, and let $F: R_{>0} \to [0,1]$ be the loss distribution with the corresponding density function $$f: R \to R_{>0}, \text{ i.e. } F(L) = \int_0^L f(t) dt.$$

Usually an insurance covers loss events up to a certain maximum amount $L_0$. A fair premium would be then $$C = E(L \leq L_0) = \frac{\int_0^{L_0} t \cdot f(t) dt}{F(L_0)}.$$

This premium has to be paid in any case to obtain in return an insurance cover up to maximum amount of $L_0$ in the case of a loss event. The modified loss distribution is now $$\tilde{F}(L) = \begin{cases} 0 & , L < C \\ F(L + L_0 - C) & , L \geq C \end{cases}.$$

This distribution function applies to the node level. Aggregated loss distribution functions are then obtained by simulation.

5.2.7. Optimizing the Insurance Portfolio

In the previous section the impact of insurance cover on the loss distribution of a particular node of a bank's operational risk grid was described. What is needed at this point is to introduce a procedure for optimizing the portfolio of the different insurance policies on the bank-wide level.

Let L denote the gross loss, i.e. aggregated loss of a bank with corresponding density function $\tilde{f}_{agg}: X \times R_{\geq 0} \to R$ for the loss distribution with insurance consideration, where $I = (I_1, \ldots, I_m)$ is a vector of insurance policies and $x = (x_1, \ldots, x_m) \in X \subset R_{\geq 0}^m$ the corresponding insurance portfolio structure vector. Here the $x_i$ represent the amount of insurance coverage. The space X is here the parameter space of feasible portfolio structures. Define $$\Psi(x, u) = \int_{L \leq u} \tilde{f}_{agg}(x, L) dL,$$

the probability for losses not exceeding the threshold u. For $\beta \in (0,1)$ let moreover be $\alpha(x, \beta) := \min\{u \in R: \Psi(x,u) \geq \beta\}$, the value at risk for the $\beta$-quantile.

One may introduce now $$\Phi(x) := \int_{L \geq \alpha(x,\beta)} L \cdot \tilde{f}_{agg}(x, L) dL$$

and the $\beta$-conditional value at risk $$(\beta\text{-}CVaR), \quad \frac{1}{1-\beta} \Phi(x).$$

It can be shown that minimization of the function $$\frac{1}{1-\beta} \Phi(x)$$

can be achieved by minimizing the function $$F(x, u) = (1 - \beta)u + \int_{L \geq u} (L - u) \tilde{f}_{agg}(x, L) dL \text{ over the set } X \times R_{\geq 0}.$$

Thus, one obtains $$\min_{x \in X, u \in R_{\geq 0}} F(x, u) = \min_{x \in X} F(x, \alpha(x, \beta)) = \min_{x \in X} \Phi(x).$$

Solving the minimization problem one finds an optimal portfolio vector $\tilde{x}$ and the corresponding $\beta$-value at risk $\tilde{\alpha} := \alpha(\tilde{x}, \beta)$, and hence the optimal CVaR is then $$\frac{1}{1-\beta} F(\tilde{x}, \tilde{\alpha}).$$

As CVaR>VaR holds one has simultaneously minimized the VaR.

In this description one always assumes that the density functions for the distributions exist. In cases where the distributions are not differentiable one could apply approximations with differentiable functions.

The computation of the function F(x, u) could be done using nonlinear programming techniques.

5.2.8. An Upper Bound on Loss Quantiles using Chebychev's Inequality

If one is willing to assume that the loss distribution has a finite expected value and a finite variance, one can derive an upper bound on the quantiles of individual losses or losses over a certain time period.

Chebychev's inequality for random variables says that $$P(|X - E(X)| \geq k\sigma(X)) \leq \frac{1}{k^2}$$

or analogously for lists that (fraction of elements in the list that are k or more standard deviations away from the mean)

$$\leq \frac{1}{k^2}.$$

As an example, one may estimate the monthly average of losses as 1,000,000 with a standard deviation of 350,000. If one assumes that the losses between the months are independent from each other the expected loss amount over one year is

12·1,000,000=12,000,000 with a standard deviation $\sqrt{12}$·350,000=1,212,436.

Since $$P(|X - 12,000,000| \geq 31.62 \cdot 1,212,436) \leq \frac{1}{31.62^2} = 0.001$$

the probability that the absolute value of the difference between the sample sum of losses over one year and 12,000,000 exceeds 31,62*1,212,436=38,340,579 is at most 0.1%. A total loss amount of 50,340,579 can thus be considered as an upper bound for the 99.9%-quantile over one year.

5.2.9. Limitations of VaR: the Expected Shortfall

Let VaR(99.9%) be the 99.9%-quantile of the loss distribution. The expected shortfall is now defined as $ES(VaR_{99.9\%}):=E(L:L>VaR_{99.9\%})$.

The expected shortfall can be also re-written as $ES(VaR_{99.9\%})=VaR_{99.9}+E(L-VaR_{99.9\%}:L>VaR_{99.9\%})$.

The tail of the loss distribution can be modeled using EVT as described for high severity events over a threshold u. The most appropriate distribution in this case is the generalized Pareto distribution $G_{\xi,\beta}$. For the loss distribution one has then $F_u(L)=G_{\xi,\beta}(L)$, with $L>u$.

When taking a higher threshold u', the tail parameter $\xi$ stays the same, but one has a different scaling $F_{u'}(L)=G_{\xi,\beta+\xi(u'-u)}(L)$, where $L>u'$.

Taking u' to be the value at risk VaR, one has a nice explicit description of the excess distribution if $\xi<1$. The mean of the distribution $G_{\xi,\beta+\xi(VaR-u)}$ is $$\frac{\beta + \xi(VaR - u)}{1 - \xi},$$

and hence the value of the expected shortfall corresponding to the VaR is $$ES(VaR) = VaR + \frac{\beta + \xi \cdot (VaR - u)}{1 - \xi} = \frac{VaR}{1 - \xi} + \frac{\beta - \xi \cdot u}{1 - \xi}.$$

Considering the quotient $$\frac{ES(VaR)}{VaR} = \frac{1}{1-\xi} + \frac{\beta - \xi \cdot u}{(1-\xi)VaR},$$

one can see that when pushing the VaR to infinity the quotient converges to $$\frac{1}{1-\xi}.$$

Here one sees clearly how the tail parameter $\xi$ determines asymptotically the ratio between the value at risk and the expected shortfall. A nice property of the expected shortfall is the subadditivity.

At this point the Lopez estimator is now introduced $$C_i := \begin{cases} 1 + (X_i - VaR)^2, & X_i > VaR \\ 0, & \text{otherwise} \end{cases}.$$

The $C_i$s are realizations of a non-negative random variable with $C:=\Sigma C_i$. The quality of the model can be assessed by comparing the value C with the corresponding value for a random realization according to the model. If the model is accurate the values should lie close together.

5.2.10. A comparison IMA-LDA

Having described two advanced measurement approaches, the IMA and the LDA, one wonders which of these approaches is most suitable for the purposes of a particular bank. At this stage the advantages and disadvantages of the respective models are discussed. FIG. 4 shows a table of the advantages and disadvantages.

As a conclusion one can see that there is no best approach: there is always a trade-off between complexity/accuracy of the model and the necessary implementation/maintenance effort. Which approach to choose is essentially a matter of the bank's preference.

5.3. The Scorecard Approaches

In this section the third type of an AMA is introduced: the scorecard approach. In this approach historical loss data is evaluated as well as additional internal ratings which might reflect qualitative information. The scorecard can be based upon the IMA or the LDA.

5.3.1. Conditional Loss Frequency: the Regression Approach

Given an internal operational rating with values $x_t$, where t is a time parameter, one may assume that the loss frequencies are related with the internal ratings as regressors. The procedure is then as follows:

1. Develop a hypothesis about the frequency distribution of loss events, and derive the respective distribution parameters.
2. Model the relation between the distribution parameters and the rating classes.
3. Use a maximum likelihood estimation to extract the common distribution parameters for the sample data.

For the calculation of the number of losses per period in a unit conditional on the value of one or several risk ratings for that unit, one can use a regression approach for count data. A widely used choice to study count data is the Poisson regression model.

5.3.1.1. The Poisson Regression Model

The Poisson regression model specifies that the number of losses per period in a unit $y_t$ is drawn from a Poisson distribution with parameter $\lambda_t$, which is related to one or several ratings as regressors $x_t$. The primary equation of the model is $$P(Y_t = y_t) = \frac{e^{-\lambda_t}\lambda_t^{y_t}}{y_t!}, \quad y_t = 0, 1, 2, \ldots$$

The most common formulation for $\lambda_t$ is the log-linear model, $\ln \lambda_t = \beta' x_t$.

The expected number of losses per period in the unit is thus given by $$E[y_t|x_t] = Var[y_t|x_t] = \lambda_t = e^{\beta' x_t}.$$

The parameters of the model can be estimated by maximum likelihood using the log-likelihood function $$\ln L = \sum_{t=1}^{T} [-\lambda_t + y_t \beta' x_t - \ln y_t!].$$

5.3.1.2. Testing for Overdispersion in the Regression

The Poisson regression model implicitly assumes that the variance of $y_t$ equals its mean by supposing a Poisson distribution for the frequencies. This assumption can be tested against the alternative of a negative binomial distribution by a Lagrange multiplier test. The LM statistic for this case is $$LM = \frac{\sum_{t=1}^{T}[(y_t - \hat{\lambda}_t)^2 - y_t]}{\sqrt{2\sum_{t=1}^{T}\hat{\lambda}_t^2}}.$$

Under the null hypothesis of no overdispersion this test statistic is distributed standard normal. If the null is rejected, a negative binomial model should be estimated.

5.3.1.3. The Negative Binomial Regression Model

One can generalize the Poisson model by introducing an individual, unobserved effect into the conditional mean, $$\log \mu_t = \beta' x_t + \epsilon_t$$

where $u_t = \exp(\epsilon_t)$ is assumed to be gamma distributed. Note that conditional on $x_t$ and $\epsilon_t$ the distribution of $y_t$ remains Poisson. The density of $y_t$ conditioned on $x_t$ only is given as $$f(y_t|x_t) = \frac{\Gamma(\theta + y_t)}{\Gamma(y_t+1)\Gamma(\theta)} r_t^{y_t}(1-r_t)^\theta, \text{ where } r_t = \frac{\lambda_t}{\lambda_t + \theta}$$

which is one form of the negative binomial distribution. The model parameters can here as well be estimated by maximum likelihood.

5.3.2. Application of Bayesian Transformations

In the scorecard approach, banks start with a valid initial allocation of capital charges to the individual nodes of the three-grid. Then the amounts are modified over time using scorecards. The initial allocation might have been obtained by one of the previously discussed approaches.

The scorecards may be based on the evaluation of Key Risk Indicators (KRI) which serve as proxies for the underlying operational risks for the individual nodes. The scorecards must have a sound quantitative basis in order to qualify as AMA. The main difference to the IMA and the LDA is that the scorecards do not exclusively rely on historical loss data but also reflects the current business situation.

A systematic approach to modify scorecard data is to use Bayes transformations which incorporates new loss data into existing loss estimations. Starting with a prior density, internal data might form a sample likelihood. These two components of information are used to determine a posterior density for the relevant random variable. The central part in this methodology is Bayes' rule $$P(X|Y) = \frac{P(Y|X)P(X)}{P(Y)}.$$

This relation shows how the probability distribution of the random variable X can be revised using prior information about the variable Y. This strategy can be also followed for statistical models where the estimation of model parameters is central. The problem is to determine the probability of the parameters given certain data. Bayes' rule for distributions reads now $$P(\text{Parameters}|\text{Data}) = \frac{P(\text{Data}|\text{Parameters})P(\text{Parameters})}{P(\text{Data})}.$$

Noting that P(Data) is just a scaling factor one reformulates the rule to

P(Parameters|Data)∝P(Data|Parameters)P(Parameters).

A corresponding result holds for the density functions of continuous random variables h(Parameters|Data)∝g(Data|Parameters)·h₀(Parameters).

The second factor on the right hand side reflects the prior beliefs about the model parameters (prior density), and the first factor reflects the likelihood of the observed model data (sample likelihood). The product is then the density (posterior density) incorporating prior beliefs and sample data information.

In general the posterior density has a smaller variance as the prior one and as the sample likelihood. Bayes' method combines subjective information (prior density) and objective information (sample likelihood) to a new more accurate information about the model parameters.

In the scorecard approach loss data is used to determine the prior densities. Internal loss ratings incorporate qualitative data, and these are subsequently applied to transform the prior density into a posterior one. A detailed description of this process will be given in the after part of this section.

This section consists of two major parts: the first one is concerned with the application of Bayesian transformations for the IMA, the second part is then concerned with the LDA. But first the procedure of the Bayesian transformation process is described.

5.3.2.1. The Bayesian Process

Again one may assume that there exists an internal operational rating with values $X=\{x_1, \ldots, x_n\}$.

1. Develop a hypothesis for the type of the frequency distribution, and determine the respective distribution parameters. This is done on the basis of collected loss data (internal or external). If not enough loss data is available, one could also start with an expert prior.
2. For a set of internal operational ratings $X=\{x_1, \ldots, x_n\}$ apply a regression model to find the distribution parameters for the likelihood function. This is a favorable approach, if the user wants to automate the process as far as possible. If that is not the case, all parameters can be based on expert estimates and as such the automatically generated parameters can be overwritten.
3. Use the likelihood function to transform the prior density into a posterior density which has more favourable properties. The corresponding distribution thus is derived from historical loss data as well as qualitative information obtained from internal ratings.

5.3.2.2. IMA: The Normal Distribution

In the IMA, banks are required to estimate the loss probability (PE) for each individual node of the grid. One can assume that this probability follows a normal distribution. Let $N(\mu, \sigma^2)$(PE) be the prior, a normal distribution with mean $\mu$ and standard deviation $\sigma$.

Prior Density

A prior density for the loss probability distribution is easily obtained by computing the mean respectively the standard deviation of a sample set of data. Alternatively one could start with an expert prior to be obtained as described above.

The Bayes Transformation

Let $X=\{x_1, \ldots, x_n\}$ be a set of internal operational ratings. One determines the expected loss frequency $\eta$ on the basis of this rating data, while assuming the variance $\tau^2$ is known. This way one obtains a distribution $N(\eta, \tau^2)$ of the sample. The posterior is then also normally distributed with density function $$h(PE|\eta) = \frac{d}{dPE} N\left(\mu\left(\frac{\tau^2}{n\sigma^2 + \tau^2}\right) + \eta\left(\frac{n\sigma^2}{n\sigma^2 + \tau^2}\right), \frac{\tau^2}{n}\left(1 + \frac{\tau^2}{n\sigma^2}\right)\right)(PE).$$

In practice, risk management activities will mainly influence the frequency of loss events, not their severity. Thus it suffices to describe a Bayesian process for the optimization of the frequency function only.

5.3.2.3. LDA: The Poisson Case

First, one may assume that the frequency distribution is Poisson, i.e. it is governed by the mean $\mu$ with corresponding density $$P(x) = \frac{e^{-\mu}\mu^x}{x!}.$$

The task is now to find good estimates for the parameter $\mu$ which one may assume to be $\Gamma$-distributed. The general density for the $\Gamma$-distribution is $$f(\mu) = \frac{\left(\frac{\mu-\lambda}{\beta}\right)^{\gamma-1} \exp\left(-\frac{\mu-\lambda}{\beta}\right)}{\beta \cdot \Gamma(\gamma)}, \text{ where } \mu \geq \lambda \text{ and } \beta, \gamma > 0.$$

In this case one has $\lambda=0$, and thus $$f(\mu) = \frac{(\mu/\beta)^{\gamma-1} \exp(-(\mu/\beta))}{\beta \cdot \Gamma(\gamma)}.$$

It is interesting to note that the parameter $\beta$ is here a scaling factor since using the substitution $$y := \frac{\mu}{\beta}$$

one has $$\Gamma_{\beta,\gamma}(L) = \int_0^L \frac{(\mu/\beta)^{\gamma-1}\exp(-(\mu/\beta))}{\beta \cdot \Gamma(\gamma)} d\mu$$
$$= \int_0^{\frac{L}{\beta}} \frac{y^{\gamma-1}\exp(-y)}{\Gamma(\gamma)} dy = \Gamma_{1,\gamma}\left(\frac{L}{\beta}\right).$$

But as one may want to include information of genuine data one has to take the distribution $\Gamma_{\beta,\gamma}$. Of course one could alternatively work with the standardized Gamma-distribution, but then the additional information would need to be standardized as well, and finally one would need to perform a back-transformation.

The Prior Density

The only parameter which needs to be estimated initially is $\gamma$, and this can be done by the method of moments estimator $$\left(\frac{\bar{\mu}}{\sigma}\right)^2$$

and the corresponding scaling parameter is $$\beta = \frac{\sigma^2}{\bar{\mu}},$$

where $\bar{\mu}$ and $\sigma$ are the mean respectively the standard deviation of the sample data.

If this estimation process seems to be not favourable one could simply start with the improper density, i.e. a constant function as a prior, or with an expert prior.

The Bayes Transformation

In addition to the loss data the Basel II accord requires banks to include qualitative data as well. A central role plays here an internal operational risk rating obtained via a bottom-up approach.

Taking now a set of rating classes $X=\{x_1, \ldots, x_n\}$, one can estimate the parameter $\tilde{\mu}$ of the corresponding density function $$g(x) = \frac{\tilde{\mu}^x \exp(-\tilde{\mu})}{x!},$$

for example using expert insight. The expected frequency of this distribution is $\bar{x} := \tilde{\mu}$. Now one fixes the mean frequency $\bar{x}$ and regard g as a function of the Poisson parameter $\mu$ (here $\tilde{\mu}$ is a particular value of the Poisson parameter). The function $g(\mu)$ will be used as the likelihood function in the Bayesian transformation process.

For the posterior density one obtains again a $\Gamma$-density $$h(\mu|\bar{x}) \propto ((\mu/\beta)^{\gamma-1} e^{-\mu/\beta})(\mu^{\bar{x}} e^{-\mu}) = \beta^{1-\gamma} \mu^{\gamma+\bar{x}-1} e^{-\mu\frac{1+\beta}{\beta}} \propto \mu^{\gamma+\bar{x}-1} e^{-\mu\frac{1+\beta}{\beta}}.$$

The parameters for this transformed density are $$\hat{\gamma} = \gamma + \bar{x} \text{ and } \hat{\beta} = \frac{\beta}{1+\beta}.$$

Thus one has $$h(\mu|\bar{x}) = \frac{d}{d\mu}\Gamma_{\hat{\beta},\hat{\gamma}}(\mu) = \frac{(\mu/\hat{\beta})^{\hat{\gamma}-1} \exp(-(\mu/\hat{\beta}))}{\hat{\beta} \cdot \Gamma(\hat{\gamma})}.$$

This is now a new estimate for the density function of the Poisson parameter distribution. The loss distribution is then obtained by a two-stage Monte Carlo simulation where first a Poisson parameter value is drawn to determine the frequency distribution. In the second stage, vectors from the frequency and severity distributions are drawn to give the loss distribution. Alternatively one could take the expectation value of the parameter distribution as the Poisson parameter and perform then the usual Monte Carlo simulation.

Instead of performing a two-stage Monte Carlo simulation, one can first write down a closed expression for the density function of the frequency distribution, a negative binomial distribution, and then perform the simulation $$f(x) = \frac{\Gamma(x+\hat{\gamma})}{x!\Gamma(\hat{\gamma})}\left(\frac{\hat{\beta}}{\hat{\beta}+1}\right)^{\hat{\gamma}}\left(\frac{1}{\hat{\beta}+1}\right)^x.$$

5.3.2.4. LDA: The Negative Binomial Case

Now the more general case where the frequencies of loss events follow a negative binomial distribution is described $$P(x) = \frac{\Gamma(x+r)}{x!\Gamma(r)} p^r (1-p)^x.$$

In this case one may keep the variance fixed and use the likelihood function of a sample to improve the estimate of the event probability p. One may assume that the mean of the event probability is beta distributed with density function $$f(p) \propto p^a(1-p)^b, \text{ where } 0<p<1 \text{ and } a,b \geq 0.$$

The Prior Density

The probability p needs to be estimated initially. If a sample set of size n the number of event observations is m the maximum likelihood estimator for p is the quotient $$\frac{m}{n}.$$

The corresponding prior density is then $$f(p) \propto p^{n-m}(1-p)^m.$$

Alternatively, one can here as well start with a constant density over the interval (0,1) as prior, or with an expert prior.

The Bayes Transformation

For the transformation one may include again internal rating data $X=\{x_1, \ldots, x_n\}$. One can estimate the expected loss frequency $\mu$, and thus the respective model parameter for the negative binomial distribution:

$$\tilde{p} = \frac{\mu}{\sigma^2} \text{ and } \tilde{r} = \frac{\mu^2}{\sigma^2 - \mu},$$

where the variance $\sigma^2$ is assumed to be fixed. Now one may set $\bar{x} := \mu$ and regard the density function as a function of p while keeping $\bar{x}$ fixed. The parameter $\tilde{p}$ is a particular value of the distribution parameter p. The function g(p) will now be used to transform the prior beta-density $f$. For the posterior density one obtains $$h(p|\bar{x}) \propto [p^a(1-p)^b] \cdot \left[\frac{\Gamma(\bar{x}-\tilde{r})}{\bar{x}!\Gamma(\tilde{r})} p^{\tilde{r}} (1-p)^{\bar{x}}\right] \propto p^{a+\tilde{r}}(1-p)^{b+\bar{x}},$$

again the density function of a beta-distribution with parameters $\hat{a}=a+\tilde{r}$ and $\hat{b}=b+\bar{x}$. Thus one has $$h(p|\bar{x}) = \frac{\Gamma(\hat{a}+\hat{b}+2)}{\Gamma(\hat{a}+1)\Gamma(\hat{b}+1)} p^{\hat{a}} (1-p)^{\hat{b}} = \frac{1}{B(\hat{a}+1, \hat{b}+1)} p^{\hat{a}} (1-p)^{\hat{b}}.$$

This gives now a new estimate for the density function of distribution parameters. The corresponding loss distribution is obtained by a two-stage Monte Carlo simulation where first a value of the event probability p is drawn to determine the frequency distribution (recall here that for the negative binomial distribution $$r = \frac{(p\sigma)^2}{1-p}).$$

In the second stage, vectors from the frequency and severity distributions are drawn to give the loss distribution.

Alternatively, one could take the expectation value of the parameter distribution as the value of the event probability and perform then the Monte Carlo simulation.

Instead of performing a two-stage Monte Carlo simulation, one can first write down a closed expression for the density function of the frequency distribution, a Beta-Pascal distribution, and then perform the simulation $$f(x) = \frac{\Gamma(x+r)}{x!\Gamma(r)B(\hat{a}+1, \hat{b}+1)} \int_0^1 p^{r+\hat{a}}(1-p)^{x+\hat{b}} dp$$

$$= \frac{\Gamma(x+r)B(r+\hat{a}+1, x+\hat{b}+1)}{x!\Gamma(r)B(\hat{a}+1, \hat{b}+1)}.$$

5.3.2.5. Bayesian Networks in Operational Risk Measurement

In this section the application of Bayesian networks for finding the operational loss distribution is described. Here one needs to apply the following steps:

Identify the factors relevant for operational losses;
Perform back-testing with historical loss event data to optimize internal model parameters;
Determine operational value at risk using scenario analysis.

Let b be an estimate for a model parameter $\beta$. It is viewed to be an optimal choice when the loss function is minimal. Two prominent types of loss functions are The absolute function $L(\beta,b)=|\beta-b|$;

The quadratic function $L(\beta,b)=(\beta-b)^2$.

The estimators for these loss functions are the expectation value respectively the median of the posterior distribution.

In the case of operational risks one is for example interested in estimating the expected loss EL. For the sake of simplicity, one may start with a prior density of the expected loss. This distribution can be assumed to be normal.

When additional data becomes available, a sample distribution can be produced. The assumption of a normal distribution would here be valid, thus computing of the mean and the variance determines the distribution. The resulting sample likelihood is then multiplied with the prior density giving the posterior density. So one obtains a new estimation EL' for the expected loss being the basis for the computation of an operational risk charge. As described above, this is an ongoing process with increasing estimation quality.

5.3.2.6. Consideration of Insurance for Scorecard Approaches

Depending on whether one applies the scorecard approach on the basis of the IMA or the LDA, the insurance considerations will be accordingly as outlined in the previous sections. The insurance will be as far as possible included on the elementary node level to allow a specific risk allocation.

5.4. Model Back-Testing

The details of block 80 of FIG. 2 are described here in the following text along with additional descriptions in other parts of the text.

All quantitative results are of course subject to back-testing for the validation of the models. One constantly needs to verify that the frequency and severity distributions are correct in order to ensure an adequate level of operational capital charge. The most prominent back-testing procedures include statistical tests including:

The Kupiec test;
The textbook proportions test.

5.4.1. The Kupiec Test

The most important first check for a model is whether the 99.9%-quantile holds or not. This can be done using the Kupiec-Test: exceptional observations (i.e. observations lying in the quantile) are modeled as independent draws from a binomial distribution.

For the confidence level c (e.g. 99.9%) the probability for k observations out of n to lie in the quantile, i.e. exceeding the value at risk, is $$P(N=k) = \binom{n}{k}(1-c)^k c^{n-k},$$

where N is the number of extreme observations.
Introducing $$\alpha := \frac{n-k}{n},$$

one may want to test the null hypothesis $$H_0: c = \alpha$$

The test $LR = 2(\ln(\alpha^{n-k}(1-\alpha)^k) - \ln(c^{n-k}(1-c)^k))$ is asymptotically $\chi^2(1)$ distributed under the hypothesis $H_0$. With a likelihood ratio test statistic, one has a tool to reject bad models. The power of the test increases with the sample size n.

The Kupiec test is not particularly powerful as it requires many data points. Nonetheless it is an important test for the model validation.

5.4.2. The Textbook Proportions Test

This test is for checking whether the frequency of failures differs significantly from the predicted one.

Let the null hypothesis be $H_0$: The probability for frequency k is p.

And the hypothesis $H_1: P(k) \neq p$.

For sufficiently large sample size n one might assume a binomial distribution with $$\mu = np \text{ and } \sigma = \sqrt{np(1-p)}.$$

Transforming this binomial distribution to a distribution with expectation value 0 and standard deviation 1, one uses the standard normal distribution with a prescribed confidence level for the test.

5.4.3. Stress Testing and Sensitivity Analysis

The details of block 82 of FIG. 2 are described here in the following text along with additional descriptions in other parts of the text.

Here two different approaches to understand the local behaviour of a particular density function (e.g. for the frequency/severity) is described.

As the interesting part is the high severity losses, one may concentrate on the tail only. Here the relevant parameters are the threshold u and the tail parameter ξ. One sensible sensitivity analysis is to study the behaviour of the distribution when one decreases or increases these parameters by say 10%. This can now be used to define a band of values at risk depending on the scenario.

Another sensitivity test is when one increases/decreases all loss data by 10% in the first place and then perform the analysis. Here one can also define a range for the value at risk.

On may assume that by risk management activities only the frequency of loss events can be decreased—while the severity stays unchanged. As an example case, the loss distribution of a certain business line on the basis of 16 months of data is described. During this period of time 663 loss events were observed leading to a mean monthly frequency of 41.44 events. Now the impact of a reduction of the monthly mean on the value at risk is described. The analysis shows that a reduction of loss events of up to 30% is well possible.

For the calculation one can assume that the frequency follows a negative binomial distribution and that the severity can be modeled as a composition of the log normal and the generalized Pareto distribution. When looking at the corresponding values at risk, one clearly sees the importance of operational risk management in order to reduce operational risk capital. FIG. 5 shows a table of values at risk along with other risk values.

6. Tool Description/design

For each node in the aggregation structure, the following must be done by the quantification tool:

1. Load loss data and their loss (event) date. The time frame for data collection should be as long as possible to have the chance to collect as much data as possible. On the other hand it should not be too long as the collected data should reflect the actual risk situation. So it is suggested to have monthly loss data collections. It is important to be able to allocate the individual loss event to a certain point in time, i.e. all data needs to be collected with a loss date. See block 300 of FIG. 42.

2. Load insurance data on the node level. Depending on whether the IMA or the LDA has been used on this level, the corresponding insurance inclusion procedure will be applied. See block 302 of FIG. 42.

3. On the upper section of the sheet for each node: check if there is enough data to (see blocks 304, 306, 308 of FIG. 42):
   a. Model the frequency distribution and the body of the severity distribution: print a list of nodes where not enough internal loss data exists. For these nodes expert priors need to be created (this should be done only infrequently: once, at the very beginning of the modeling exercise and then again if the older loss experience has become irrelevant for the present risk profile). When an expert prior is used, the weight of the prior (equal the number of drawings from the prior distribution) has to be determined. Moreover one has to describe how the weight needs to be adjusted in the following months. As next month's modeling is best done by copying the current month's modeling Excel sheet, write a note with the updated weights. Determining an expert prior and the corresponding weight is a manual process.
   b. Model the tail of the severity distribution: print a list of nodes where not enough data exists. Then include external loss data when needed. Scaling and adding external data to the data set of the node is a manual process.

Figure 43:
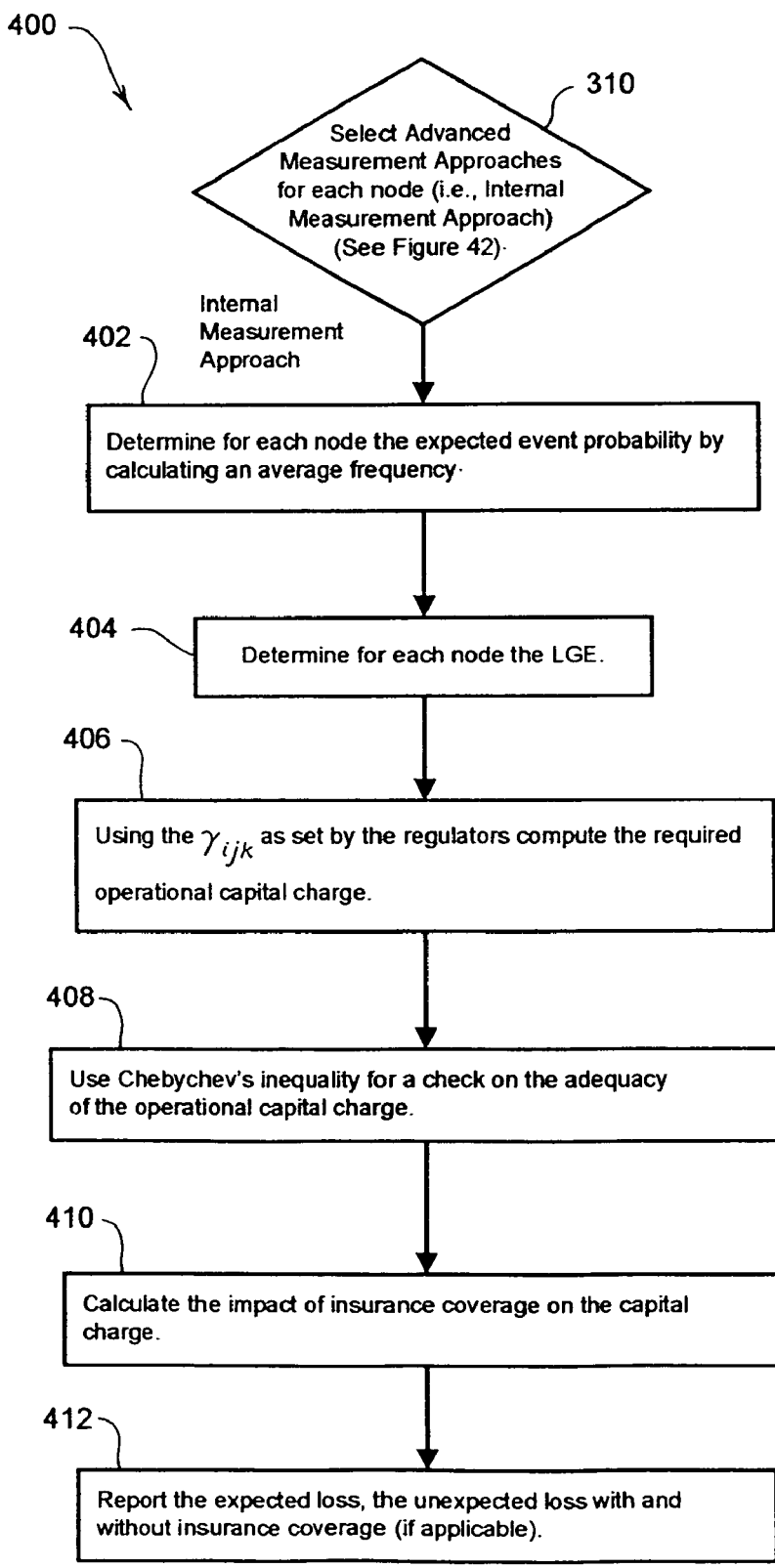
FIG. 43 is a flow chart of an internal measurement approach.

4. The next section of the sheet covers the calculation of the IMA for a node (see block 400 of FIGS. 42 and 43):
   a. Determine for each node the expected event probability by calculating an average frequency. See block 402 of FIG. 43.
   b. Determine for each node the LGE. This is the medium loss amount. See block 404 of FIG. 43.
   c. Using the $\gamma_{ijk}$ as set by the regulators, compute the required operational capital charge. See block 406 of FIG. 43.
   d. Use Chebychev's inequality for a very rough check on the adequacy of the operational capital charge. See block 408 of FIG. 43.
   e. Calculate the impact of insurance coverage on the capital charge. See block 410 of FIG. 43.
   f. Report the expected loss and the unexpected loss with and without insurance coverage (if applicable). See block 412 of FIG. 43.

Figure 44:
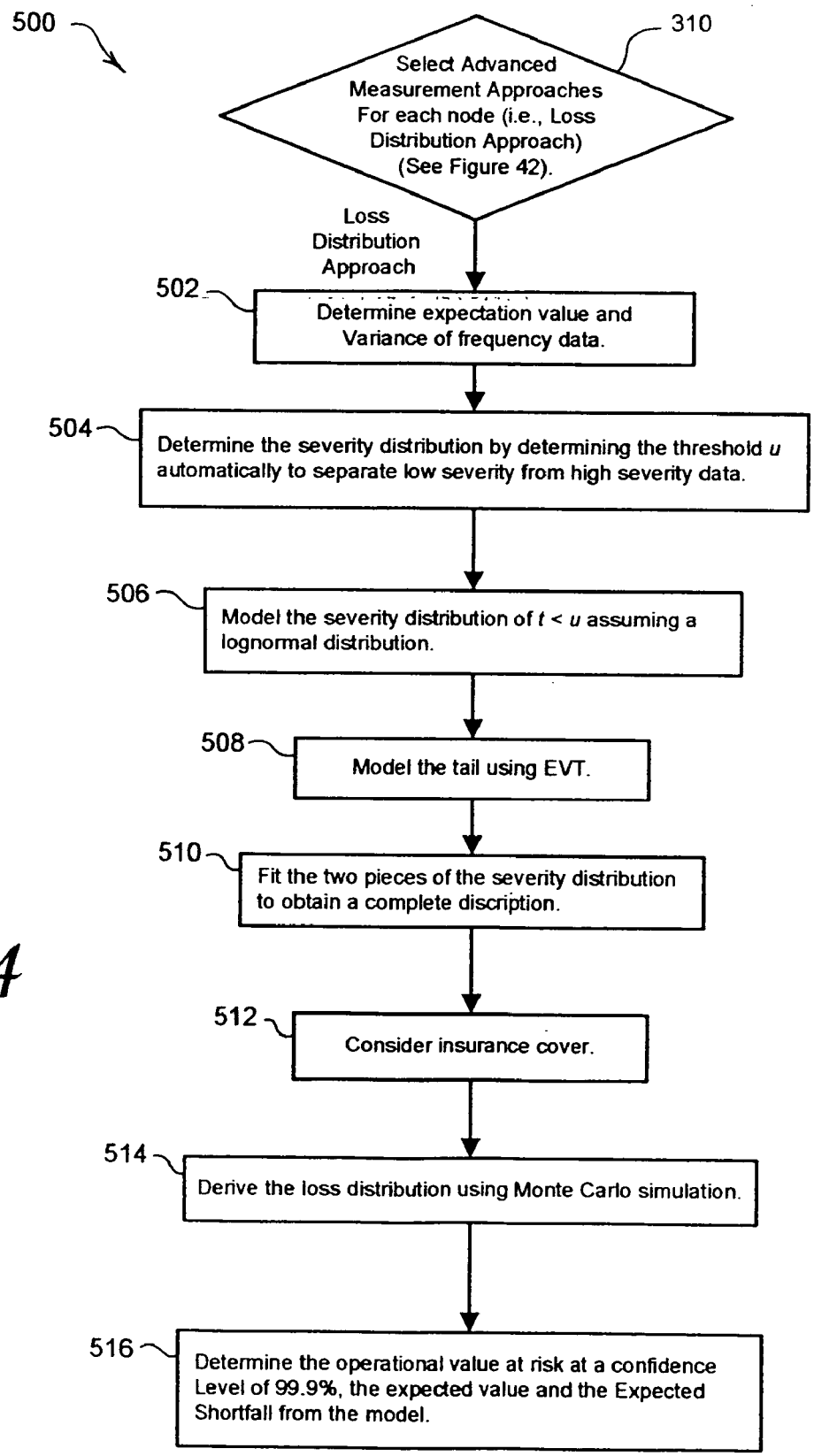
FIG. 44 is a flow chart of a loss distribution approach.

5. The next section covers the LDA for a node (see block 500 of FIGS. 42 and 44):
   a. Determine expectation value and variance of frequency data. If they agree assume a Poisson distribution model for the frequency, otherwise assume a negative binomial distribution. Alternatively compare the frequency Q-Q plots for the Poisson and for the negative binomial distributions and choose the best fit. See block 502 of FIG. 44.
   b. To determine the severity distribution, determine the threshold u automatically to separate low severity from high severity data. To find u draw the Hill graph and identify the stable area. Of course, the threshold u can also be modified manually. See block 504 of FIG. 44.
   c. Model the severity distribution for t<u assuming a log normal distribution. See block 506 of FIG. 44.
   d. Model the tail using EVT. See block 508 of FIG. 44.
   e. Fit the two pieces of the severity distribution to obtain a complete description. See block 510 of FIG. 44.
   f. Consider insurance cover. See block 512 of FIG. 44.
   g. Derive the loss distribution using Monte Carlo simulation. See block 514 of FIG. 44.
   h. Determine the operational value at risk at a confidence level of 99.9%, the expected value and the Expected Shortfall from the model. See block 516 of FIG. 44.

Figure 45:
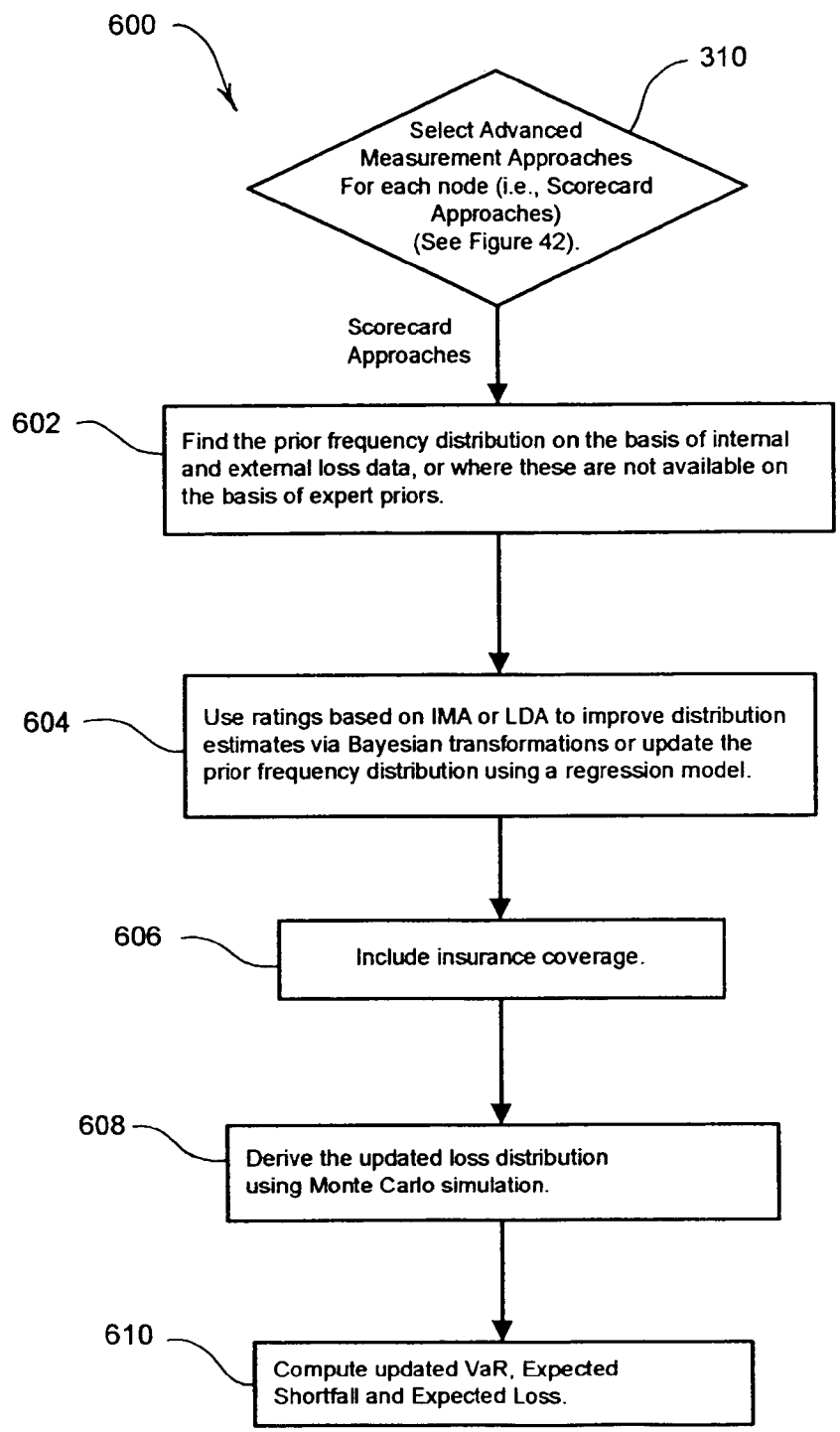
FIG. 45 is a flow chart of a scorecard approach.

6. For the scorecard approach one has two sections—one for scorecard on the basis of IMA and one on the basis of LDA. The respective procedures do not vary significantly (see block 600 of FIGS. 42 and 45):
   a. Find the prior frequency distribution on the basis of internal and external loss data, or where these are not available on the basis of expert priors. See block 602 of FIG. 45.
   b. Use ratings to improve distribution estimates via Bayesian transformations, or update the prior frequency distribution using a regression model. The model choice is a manual one, to be made prior to the modeling. Instead of applying a regression model one could as well translate a rating into a frequency density via expert insight. The Bayesian transformation procedure is otherwise the same. See block 604 of FIG. 45.
   c. Include insurance coverage. See block 606 of FIG. 45.
   d. Derive the updated loss distribution using Monte Carlo simulation. See block 608 of FIG. 45.
   e. Compute updated VaR, Expected Shortfall and Expected Loss. See block 610 of FIG. 45.

7. Calculate the aggregated VaR, Expected Shortfall and Expected Loss values by running a background simulation—report aggregated (see block 320 of FIG. 42):
   a. IMA with and without insurance per node and in the pre-determined aggregation structure.

b. LDA with and without insurance per node and in the pre-determined aggregation structure.

c. Scorecard on the basis of IMA with and without insurance per node and in the pre-determined aggregation structure.

d. Scorecard on the basis of LDA with and without insurance per node and in the pre-determined aggregation structure.

8. Scenario analysis. In order to derive risk management activities out of the measured risk potential one needs to understand the dynamical behaviour of the system. This is best done by analyzing and studying various scenarios. These are obtained by systematically changing the input loss data (see block 322 of FIG. 42):

a. Modify existing loss data by assuming partial or full failure of mitigation processes.

b. Generate new loss data as possible scenarios, possibly supported by data from external loss data bases.

9. Stress testing is used to show stabilities or sensitivities of the model. It can be applied to the real model as well as to scenario models. By stress testing one modifies systematically internal and external model parameters (see block 324 of FIG. 42):

a. Modify internal model parameters (thresholds, tail parameters, expectation values, standard deviations, etc.) and analyze the situations where these parameters are 10% lower/higher.

b. Modify external parameters, i.e. input loss data and analyze situations where all losses are 10% lower/higher.

c. After the various modifications identify the lowest and greatest sensitivities of the model. These give hints towards the impact of possible risk management activities.

d. As a result, ranges for the required operational capital charges for each node and for aggregation levels could be defined.

10. Model back-testing is essential for the validation of the models and has to be performed as close to the modeling process as possible, i.e. for each individual node. Moreover it is sensible to have a rough test on aggregated levels as well to ensure the validity of the aggregated information as well. Relevant tests are described above. See block 326 of FIG. 42.

A Mathematical Procedure to Include Scenario and External Losses Control-based into the Operational Risk Capital Calculations 1. Purpose of this Section The details of block 74 of FIG. 2 are described here in the following text along with additional descriptions in other parts of the text.

The purpose of this section is to outline some mathematical concepts for:

calculating event probabilities for scenarios and external loss data using internal control information (adaptation of losses to the internal business and control environment);

the updating mechanism needed to incorporate these probabilities adequately into the LDA frequency and severity distribution modeling.

The information provided in this section is additional information that may support risk managers to assess the applicability of the techniques outlined for an operational risk framework.

The following procedures are suggestions, and reasonable experimentation may be needed to verify that all of these procedures are necessary (or sufficient) to create capital adequacy. For example, time may be needed not only to create an appropriate model in the quantification tool, but also to test them with real data and plausible scenarios and external loss data.

2. Introduction to the Modeling Process

Augmenting the data basis of internal losses with scenarios and external losses is a common concern for banks as it is generally observed that there is not enough internal loss data to estimate the tail of the loss distribution correctly.

The following modeling steps are necessary, when incorporating scenario losses or external losses. Please note that not all steps are described in detail in the following sections, but the focus is on those steps that require new/adapted mathematical procedures:

Analysis Part 1 (See Section 3):

1. Identify all controls $P_k$ that serve to prevent a specific set of losses (loss event types). Equally, identify as many uncontrollable influences to the event type as possible (for simplicity reasons left out of the following descriptions, but to be treated in the same way). This step is an analysis to be undertaken as part of the service/control architecture analysis and scenario analysis—it is not further described in this section.

2. Determine the corresponding failure densities $f_k$: $(0,1) \rightarrow R_{>0}$. This density function belongs to the failure distribution, which describes the probability that a particular control point does not discover the loss event. The failure probability is looked at as the event probability (equal the event frequency).

3. Determine the loss amount to be included: for external losses, adapt the external loss amount to the maximal possible amount A of the bank by applying a cut-off function when necessary (e.g. the amount of the highest ever transaction). For scenario losses, loss amount is part of the analysis. Not further described in this section.

Analysis Part 2 (See Section 4)

4. For the severity distribution, one may make the assumption that Extreme Value Theory (EVT) is to be used to model the tail of the severity distribution. Determining the position of the threshold between body and tail of the distribution is the challenge when incorporating scenario and external losses. There are models to calculate the threshold of external data and mixing mechanisms. These models should be taken into account, evaluated, and tested for plausibility. For the time being though, there is little functional reasons to adjust the threshold as:

one will want to use the scenarios and external losses for calculating a better fit for the tail of the distribution only;

one will not want to change the information contained in the internal data, but instead make the best use of the internal information.

Thus, it is suggested to estimate the threshold from the internal data and to keep it there, when incorporating scenario and external losses.

5. Use the scenario and external loss amounts for updating the tail parameter of the Generalized Pareto Distribution used to model the tail of the severity distribution. One will expect the form of the tail of the distribution to change, when scenarios are incorporated and one will want the Monte Carlo simulation to draw from that new tail. A Bayesian updating mechanism is described below to do that. Please note that incorporating more losses in the tail of the severity distribution will change the probability weight between the tail and the body of the distribution (not to be confused with the frequency: the probability weight refers to the changes to the form of the overall severity distribution that will be the result of the estimation process, when the proportion of number of losses in the tail and number of losses in the body changes).

As one will not want to make any significant changes to the body of the distribution, a procedure is described below to maintain the probability weights between the body and the tail of the severity distribution.

6. Incorporate loss event probability and loss amount in the overall loss distribution to make sure that scenario and external losses that are estimated to fall under a certain quantile can be traced back in the resulting capital amount. This must be implemented in the Monte Carlo simulations for the convolution of frequency and severity distribution. The mathematical concepts of doing so are described below.

In the following sections, more detailed mathematical descriptions of steps 2, 5, and 6 are provided.

3. Calculating Internal Event Probabilities for a Scenario or External Loss

There are two main objectives for using an assessment of the loss prevention quality of the internal control environment to assess an event probability for external losses and scenario losses:

1. To assess the degree of applicability of a scenario or external loss to the bank, it is a major concern with all external data collections and also scenarios that the applicability—or probability of occurrence—to the internal processes. In the case of external losses, there is no saying which controls failed for the other bank. In the case of scenarios, one must clearly be aware of the fact that just about anything can happen. The question is, how likely it is that it will happen. The procedures to assess the quality of controls must come up with the part of the event probability that can be controlled. Uncontrollable factors (like the probability for an earthquake or a terrorist attack) must be singled out and assessed.

2. Using internal control information to assess the event probability gives an incentive to business managers to invest in controls. If the procedures are such that the scenario with its event probability and loss amount is closely related to the resulting capital figure, understandable business cases can be created for control investments.

In the following, a mathematical procedure is described to calculate such event probabilities that is based on control information. Please note that the uncontrollable part of the event probability can be incorporated without difficulty, although the description focuses on the controllable part of the event probability.

3.1. Failure Densities for Sequences of Controls

Figure 6:
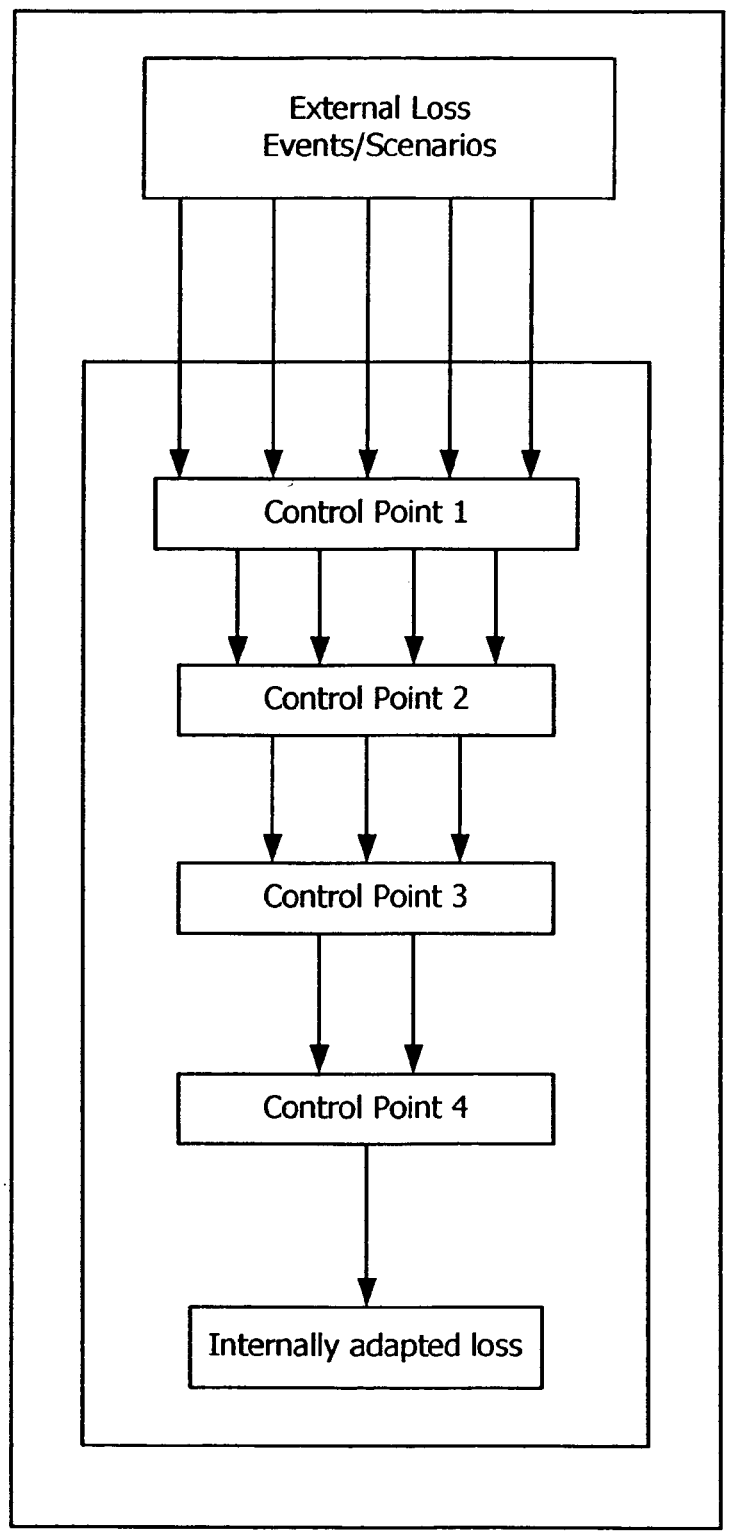
FIG. 6 is a diagram of an approach to the adaptation of scenario and external loss data.

Crucial for the inclusion of external loss data is the thorough understanding of the internal loss prevention system. This system consists of what one may call control points, whose function it is to prevent loss events. Control points must be evaluated by KRIs to be able to derive enough data to base a statistical experiment upon. The KRIs shall be measurable and—whenever possible—directly linked to loss events. FIG. 6 shows a diagram of an approach to the adaptation of scenario and external loss data.

Controls can fail, thus their probability of failure will be captured by the KRIs. For specified time intervals the failure rate as captured by the KRIs is measured. This rate serves as a proxy for the failure probability.

The corresponding failure distribution is what one is interested in and what one needs to calculate from the KRI proxy for the adaptation of scenario and external loss data (normal statistical fitting).

Assumptions. One assumes that all control points are arranged sequentially and that they are independent of one another.

These assumptions are justified as:

1. The sequential order is supported by the sequential activities in any process.

2. Independence of control points is one crucial criterion for their implementation: if two control points would be highly correlated, one of them could be omitted without loosing control quality.

3.2. Mathematical Representation of the Event Probability

For the time being and having not observed any contradicting information, one may assume for the sake of simplicity that the failure probability is normally distributed, i.e. it suffices to find the mean and the variance for a complete description of the distribution.

With time, back-testing results might suggest using other models for the failure probability. The mathematical principles described below remain the same.

For a particular external loss event let $P_1, \ldots, P_k$ be the set of relevant control points, and let $f_1, \ldots, f_k$, where $f_i$, $(0,1) \to R_{>0}$, be the corresponding failure densities.

The common failure density for that event is then obtained as $$F(t) = \frac{f_1 \tilde{*} \ldots \tilde{*} f_k(t)}{\int_0^1 f_1 \tilde{*} \ldots \tilde{*} f_k(x) dx}, \text{ with } 0 < t < 1.$$

Here one uses the $\tilde{*}$-operation defined by $$f_i \tilde{*} f_j(t) := \int_t^1 f_i(x) f_j(t/x) dx.$$

The expected failure probability for the specific loss event is then $$P = \int_0^1 t \cdot F(t) dt.$$

In practice one assumes that the failure probability is normally distributed over the interval [0,1]. The expected failure probability will be regarded as the internal frequency of the scenario or external loss event and as such included in the loss distribution modeling process.

4. Incorporating Event Probability and Loss Amount in the Overall Loss Distribution Obviously, there is more than one way to update the loss distribution with the scenario and external loss event information.

A summary of the objectives to be applied to a procedure are as follows:

1. Get a better fit for the tail of the severity distribution:

In theory, the optimal severity distribution outcome would be a validation of the results obtained using internal data only (as, again in theory, a statistical model has the ability to 'extrapolate' a 99.9%-quantile to have data available in all parts of the distribution is not necessarily required for the estimation process).

Practically, though, one uses scenario and external losses, because there is not enough basis for estimating the parameters of the distribution in the tail correctly. It is assumed that the distribution that can be calculated from the internal data will 'peter out' too quickly. So, given the imperfect state of any statistical modeling process, the expectation towards the severity distribution is that it will get a 'fatter' tail, i.e. the 99.9%-quantile will move to the right.

This objective is addressed in section 4.1., where a Bayesian updating mechanism that takes the new scenario and external loss data information into account to update the internal loss data information contained in the tail parameter ξ is introduced.

2. Keep the body of the distribution to rely on internal data only:

The assumption is that the internal data points suffice to estimate the body of the distribution: when e.g. calculating the expected loss for the next period, one (at least in the LDA) relies on the loss experience of the previous period, which one expects to represent the appropriate weights between frequency and severity distribution.

When inserting loss data points in the tail of the distribution, all fitting procedures for the severity distribution will recognize the additional data points as additional weight given to the tail, thus making the tail even fatter. This additional weight is not appropriate though, as one will want to rely on the internal data to give the proportion of data in the body and data in the tail (see also discussion about threshold above). As much of the original internal data information should be kept.

In 4.2., the appropriate mathematical adjustment of the information in the tail according to the amount of scenario and external loss data that are added to it is described.

3. To create pragmatic and plausible capital updates, one will want to make sure that a scenario or external loss, whose event probability was calculated to lie within the range of the 99.9%-quantile to either justify the event probability given to the scenario loss amount in the original Monte Carlo simulation or to move the amount of the 99.9%-quantile to the right by at most the scenario loss amount (range of possible outcomes). Scenario and external losses that are calculated to lie outside of the 99.9%-quantile, one expects to be taken into account only minimally by the overall loss distribution (they shall be subject to better estimation of the tail parameter only, see point 1). This creates problems for the accepted way of modeling of the frequency and severity distribution independently:

the frequency distribution will hardly change at all by adding a very small event probability to it—thus making the efforts of calculating the event probability not worthwhile;

the common estimation procedures for the severity distribution will most likely overstate the severity as no connection can be created between the high loss amount and the small event probability associated with it;

an updating mechanism to the already convoluted loss distribution to meet this objective is therefore suggested as described in 4.3.

Some experimentation may be needed to verify that all three of these procedures are needed (or sufficient) to create capital adequacy. For example, time may be needed not only to create an appropriate model in the quantification tool, but also to test them with real data and plausible scenarios and external loss data.

In the following, the mathematics as described above are introduced.

4.1. Updating the Tail Parameter of the Severity Distribution

A Bayesian updating mechanism seems most adequate for updating the tail parameter ξ, which will determine the new form of the severity distribution after taking the scenario or external losses into account.

Bayesian statistics revolves around Bayes' rule:

$$P(X \mid Y) = \frac{P(Y \mid X)P(X)}{P(Y)}.$$

This relation shows how the probability distribution of the random variable X can be revised using additional information as expressed in the variable Y. It can be shown that the result will have favorable statistical properties.

This mechanism can also be followed for statistical models, where the estimation of model parameters needs to be revised. The problem in this case is to determine the probability of the parameters given additional (loss or scenario) data.

Bayes' rule reads now:

$$P(\text{Parameters} \mid \text{Data}) = \frac{P(\text{Data} \mid \text{Parameters})P(\text{Parameters})}{P(\text{Data})}.$$

Noting that P(Data) is just a scaling factor, the rule reformulates to $$P(\text{Parameters}|\text{Data}) \propto P(\text{Data}|\text{Parameters})P(\text{Parameters}).$$

A corresponding result holds for the density functions of continuous random variables.

Applying the Bayesian updating process to the case of updating the tail parameter ξ requires the calculation of 1. a prior density for the parameter ξ (P(Parameters)) and 2. the so-called Likelihood Function P(Data|Parameters).

1. Calculation of the prior density for the parameter ξ (P(Parameters))

The information used to calculate the density function f(ξ) is the internal loss data.

A recap of how the tail of the severity is calculated using the Generalized Pareto Distribution (EVT) follows.

One has a threshold u, which separates the body from the tail of the distribution. In this case, one may opt for letting the threshold remain the same as when one calculates the tail on the basis of internal loss data only.

Let the internal loss amounts $X_1, \ldots, X_n$ be independent and identically distributed (iid). On may assume that there are k observations larger than u. For the order statistics $X_{k,n} \leq X_{k-1,n} \leq \ldots \leq X_{1,n}$ one may define the estimate for the tail parameter ξ as $$\hat{\xi} = \frac{1}{k}\sum_{i=1}^{k}(\ln X_{i,n} - \ln X_{k,n}) =: H_{k,n},$$

the average of differences of the k observations in the tail.

This defines the following distribution function for the tail of the severity $$\hat{F}(t) = 1 - \frac{k}{n}\left(1 + \frac{\hat{\xi}(t-u)}{X_{k,n}}\right)^{-\frac{1}{\hat{\xi}}}, \text{ for } t > u.$$

One can now see how to determine the prior distribution function $f(\xi)$ for the parameter $\xi$:

One assumes that the tail parameter $\xi$ be $\Gamma$-distributed. That assumption seems valid from a certain analysis of the Hill Plot and the fact that the Gamma distribution is fat-tailed itself The general density for the $\Gamma$-distribution is $$f(\xi) = \frac{\left(\frac{\xi-\lambda}{\beta}\right)^{\gamma-1}\exp\left(-\frac{\xi-\lambda}{\beta}\right)}{\beta \cdot \Gamma(\gamma)}, \text{ where } \xi \geq \lambda \text{ and } \beta, \gamma > 0.$$

In this case one has $\lambda=0$, and thus $$f(\xi) = \frac{(\xi/\beta)^{\gamma-1}\exp(-(\xi/\beta))}{\beta \cdot \Gamma(\gamma)}.$$

Note that the parameter $\beta$ is a scaling factor.

The parameter to be estimated initially is $\gamma$, which can be done using the method of moments estimator $$\left(\frac{\hat{\xi}}{\sigma}\right)^2;$$

the corresponding scaling parameter is $$\beta = \frac{\sigma^2}{\hat{\xi}},$$

where $\hat{\xi}$ is the tail parameter estimated on the basis of the internal loss data, and $\sigma=\sqrt{\text{var}\{H_{k,n}:1\leq k\leq n-1\}}$ the standard deviation of the tail parameters.

This leaves a solution for the prior density for the parameter $\xi$: (P(Parameters)).

2. Calculation of the Likelihood Function P(Data|Parameters)

The Likelihood Function is to be calculated using the scenario information, as this is additional information on the same subject of $\xi$. Using the threshold as above, one may use the scenario losses to come up with a new estimate of the tail in the form of a Generalized Pareto Distribution (GPD).

Another estimate $\tilde{\xi}$ of the tail parameter determines the GPD, which defines the density function for the tail parameter distribution. $\tilde{\xi}$ is estimated by using the scenario losses.

The function $g(\xi)$, which will be used as the likelihood function in the Bayesian updating process, is obtained through a simple transformation (exchanging variables . . . ). As a result, the tail parameter is regarded to be the independent variable.

Recall that the result of the Bayesian updating process is the posterior distribution:

P(Parameters|Data)∝P(Data|Parameters)P(Parameters).

Inserting the results, one obtains:

h($\xi$|scenario.losses)∝$f(\xi) \cdot g(\xi)$.

The mean E(h) of the distribution h is used as the updated tail parameter $\xi$.

4.2. Maintaining the Probability Weight in the Severity Distribution

Let $\phi$ be the density function for the severity's tail as calculated on the basis of the internal loss data only and $\tilde{\phi}$ be the density function for the severity's tail as it results from the Bayesian update on the tail parameter as described in 4.1.

The tail will then be normalized to the same probability weight as it had been on the basis of internal loss data only:

$$\tilde{\phi}(x) \cdot \frac{\int_{t \geq u} \phi(t) dt}{\int_{t \geq u} \tilde{\phi}(t)}, \text{ for } x \geq u.$$

This normalization process has to be solved numerically.

4.3. Updating the Overall Loss Distribution

In order to create the link between the high loss amount of the scenario of external loss and the appropriate small event probability, the final updating will be done directly in the (convoluted) loss distribution L(t).

This way a three-step model for calculating the overall loss distribution is created:

Model Frequency and Severity independently (for the severity either on the basis of internal losses only or using the updated tail parameter $\xi$ from step 1);

Run the Monte Carlo convolution;

Update the data point on the y-axis of the loss distribution, where the scenario loss is located with the new probability weight as calculated as event probability for the scenario—thus updating the y-axis of the loss distribution (the same for external losses, of course).

Let L be a scenario loss amount with event probability p. The inclusion procedure is as follows:

1. Rescale the y-axis of the loss distribution by the factor (1−p). FIG. 7 shows a graph of rescaling of the loss distribution.

2. Attach to the scenario loss amount the appropriate event probability p. FIG. 8 shows a graph of adding of a scenario loss event.

This way again a loss distribution is obtained including the scenario loss information. The corresponding operational capital charge for a defined confidence level (in general 99.9%) can then be read off.

When Monte Carlo simulation is used—as is the case for the described quantification tool—this updating mechanism is very easy to do.

Demonstration of the Capital Calculation Prototype

Capital calculation functionalities are an important part of Operational Risk Management and must be based on a sound risk indicator and loss management. The capital calculation prototype serves to test some basic and enhanced capital modeling techniques. FIG. 9 shows an illustration of requirements and methodology.

Basic Capital Calculations are based on historic losses mainly. IMA and LDA type calculations are used by the prototype. FIG. 10 shows an illustration of basic capital calculations.

Figure 11:
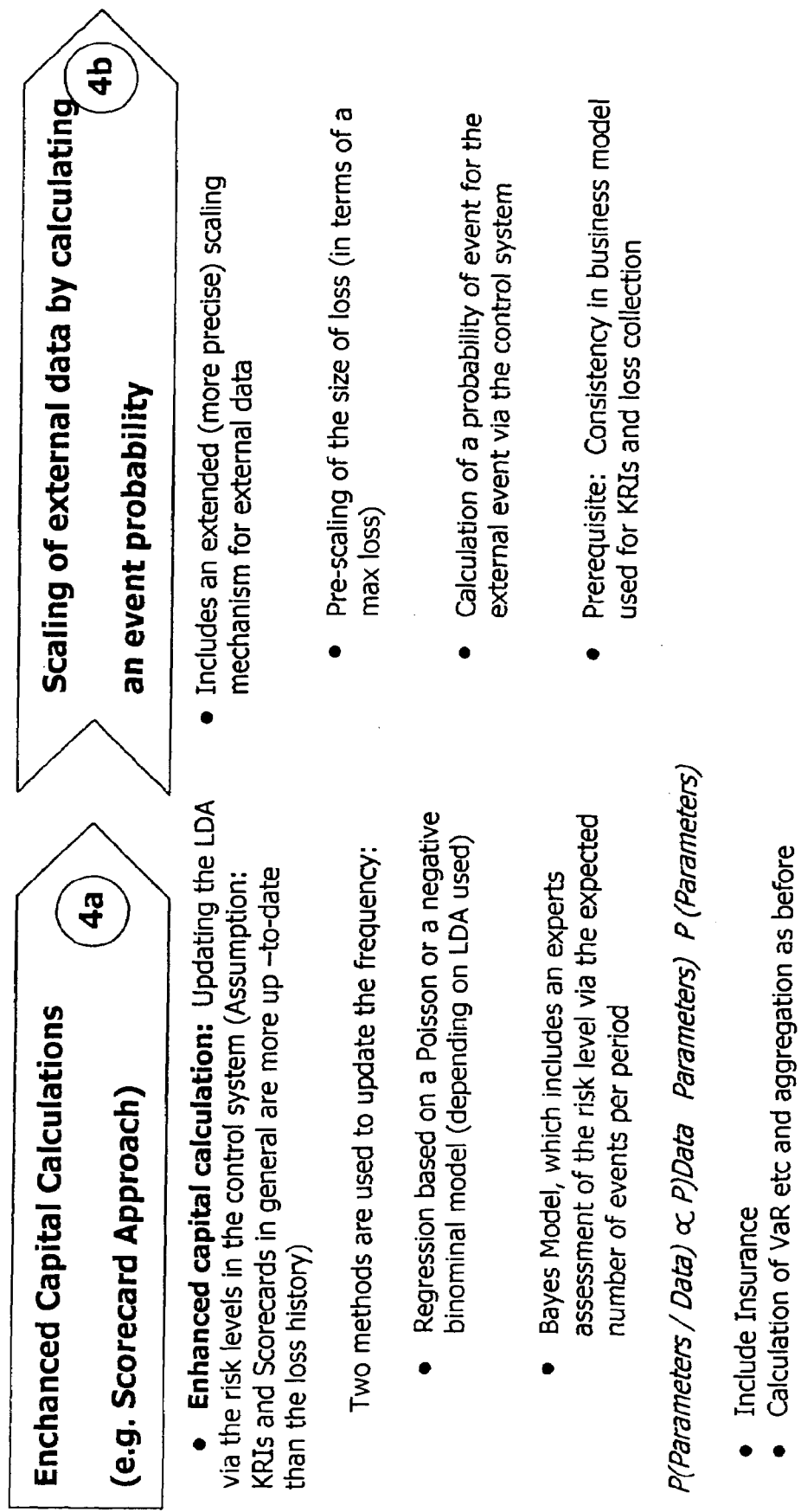
FIG. 11 is an illustration of enhanced capital calculations and scaling of external data by calculating an event probability.

Enhanced capital calculations incorporate qualitative assessments (KRIs, ratings etc.) to update the calculated capital and scale external events. FIG. 11 shows an illustration of enhanced capital calculations and scaling of external data by calculating an event probability.

Models for operational risk capital are by far less mature than for other risk types. Thus, creativity and scepticism should be applied to even the most 'natural' modeling components:
  Uncertainties around the capital calculation functionality:
  Correlations:
    Regularly calculated for 'normal' portfolio models, there is little evidence for their importance from a functional perspective (if a consistent underlying business model is used).
    Data collections are small. Could correlation parameters be estimated with any statistical significance?
    Necessary or misguided precision?
  Scenarios:
    Which parameters describe a good scenario?
    Simple and useful sensitivity analysis on certain easy to interpret model parameters. Will that suffice?
    Qualitative scenarios ('could this happen in our bank?') are very useful. Do they require a tool-wise representation?
  Back-Testing:
    Most importantly, actual losses must be backtested against a number of models (in the initial phases).
    A longer data and modeling history is a MUST for a successful backtesting.
    The actual backtesting mathematics is then simple.
  Different convolution and aggregation mechanisms (e.g.
    Monte Carlo versus Numeric models):
    Necessary or misguided precision?
  Outlier Problem
    Data Cleansing should not be done, as the definition of an outlier is unknown! Outliers at this stage may just as well indicate model errors.
    At this stage, all data anomalies must be taken seriously and be examined closely!

Using the Quantification-Tool for Operational Risks

1. Introduction
**Start Page ('Main Form') of the Tool FIG. 12** shows the first screen display of one version of the quantification tool.

This section describes how the quantification tool for operational risk can be used for risk assessments of a typical and specific analysis requirement of a user of the tool.

The Quantification Tool covers all Advanced Measurement Approaches (AMA):
  1. The Internal Measurement Approach (IMA)
  2. The Loss Distribution Approach (LDA)
  3. The Scorecard Approaches
    Scorecard Approach on LDA-basis using internal rating regression
    Scorecard Approach on LDA-basis using Bayes-update.
  2. Data Structure and Definition of Analysis Units The details of blocks 70 and 76 of FIG. 2 and blocks 90, 92 and 94 of FIG. 3 are described here in the following text along with additional descriptions in other parts of the text.
  **Click on 'Setup Analysis Units'**

The loss data is organized along four dimensions: business lines, event types, organizational units and processes, i.e., every loss event has these four attributes and aggregation logic can move across those four dimensions. The first two correspond to the preliminary Basel II data structure. The 'Organizational unit' and 'Processes' attribute are used to describe the allocation of the loss to an internal part of the bank's business model. There might be more necessary attributes. However, for data scarcity reasons, a certain abstraction discipline within this tool is enforced, as it cannot be expected that there will be enough data to populate more than the resulting analysis nodes for these four dimensions.

In the present example, there are 896 elementary nodes, depicting the Basel II nodes plus a very basic structure of organizational units and internal 'processes'.

An analysis unit summarizes loss data and forms the most elementary analysis level. Although the user is free in the definition of analysis units, it is recommended to define analysis units to be completely contained within one Basel II-node to ensure data consistency for a valid statistical analysis.

For the sake of simplicity, the Basel II-nodes are already pre-defined as possible analysis units.

For the example 'external fraud assessment', one may consider only the dimensions Basel Business Lines and Event Types. Thus, one aggregates the 896 elementary nodes into analysis units, which form 'Basel-nodes'. This gives eight Basel-analysis units: external fraud across all eight business lines. See FIG. 13.
  **Go back to the Main Page (click at the door)**
  3. Evaluating an Analysis Unit
  **Click on 'Evaluate Analysis Units'**
  **Select 'Bassel-16-RB-EF', specify start date as '01.01.98'° and select time horizon to be 'Yearly'**
  **Click 'Run'**

After defining the aggregation structure, the risk assessment for the analysis units has to be performed. The Quantification Tool covers all Advanced Measurement Approaches according to the new Basel accord: these are the Internal Measurement Approach (IMA), the Loss Distribution Approach (LDA), and the Scorecard Approaches. As an example, the analysis of the Basel-node Retail Banking/External Fraud is demonstrated here.

3.1. Data Analysis

First, the historical loss data for a specified time frame will be roughly analyzed. This shows the quantiles, the mean and some distributional behavior. The quantile plot with the log normal distribution shows the fit with that distribution, whereas the mean excess plot shows the tail behavior.

Figure 14:
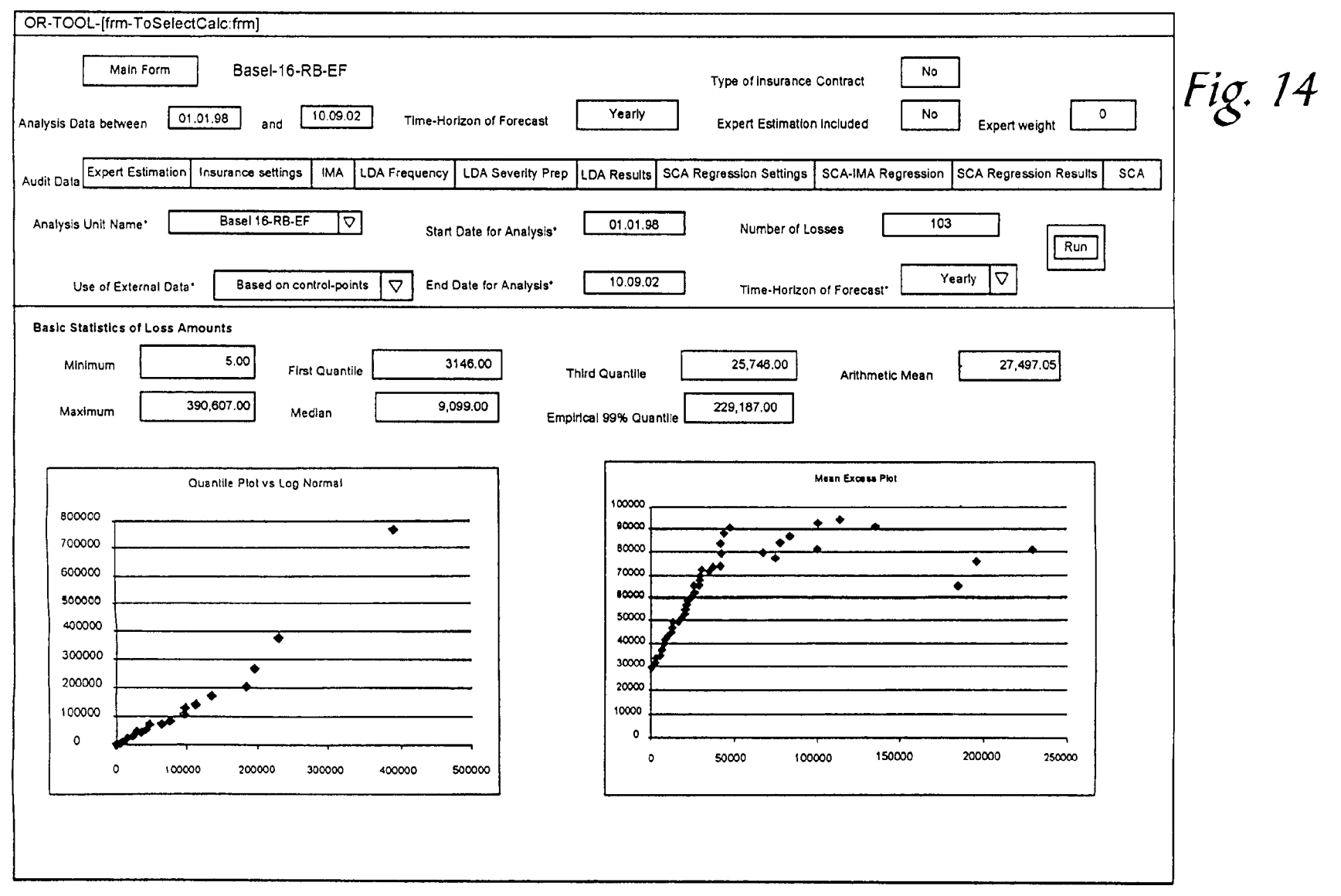

Specifically, for the Basel node 'Retail Banking—External Fraud' one sees that for low loss amounts the log normal fit is quite good, but deviating for high amounts. The tail is slightly smaller than the log normal tail. See FIG. 14.

3.2. The Expert Estimate
  **Go to 'Expert Estimation'**

Figure 15:
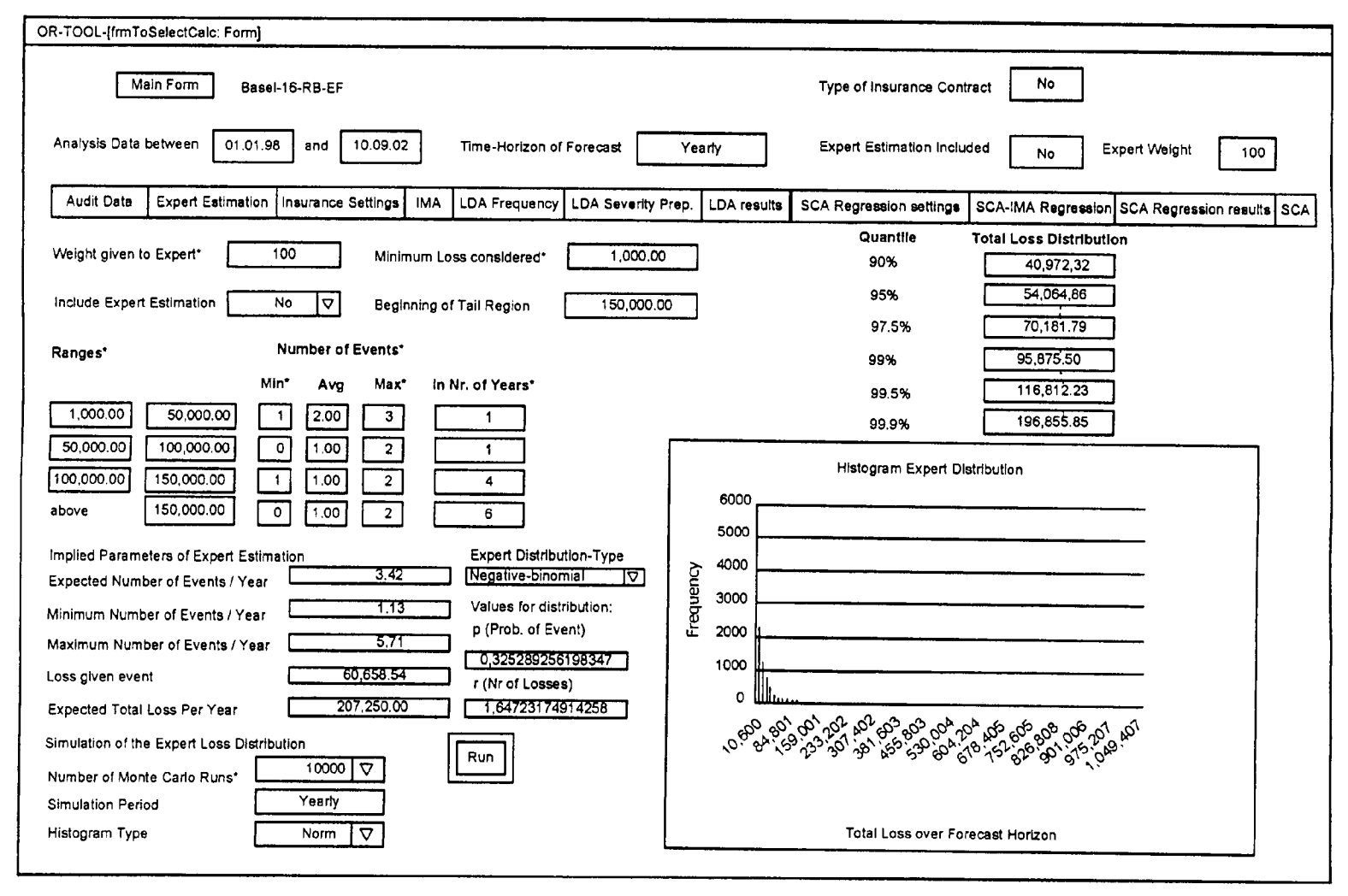

Especially when the historical loss data is scarce, it will be crucial to use the experience of subject matter experts. On the basis of their deep insight, they will estimate the frequency of certain loss events. The screen for entering the expert estimate has the following appearance.
  **Enter Expert Weight, Severity Ranges and Expected Frequencies. Then click 'Run' See FIG. 15**.
  3.3. The Internal Measurement Approach (IMA)
  **Go to 'IMA'**
  **Click 'Run'**

The IMA is the most elementary of the various Advanced Measurement Approaches in the Basel II-accord. The expected loss is computed on the basis of historical loss data. The regulator will stipulate the Gamma-factors which will then be used to compute the corresponding operational risk charge. The IMA-screen looks as follows at FIG. 16.

Using the LDA-results, one can estimate the Gamma-factors.

Under very weak distribution assumptions, one can give rough estimates for the 99.9%-quantiles.

Chebychev's inequality: Assumption is finite variance

Vysochanskii-Petunin-inequality: Assumption is finite variance and unimodality (i.e., only one maximum)

Insurances cannot change the expected loss—they only change the variance of the loss distribution which will eventually impact the Gamma-factors. In such cases, the bank needs to demonstrate that its particular portfolio is significantly different from industry standards and thus adaptations of the Gamma-factors are justified.

3.4. Insurances

The details of block 98 of FIG. 3 are described here in the following text along with additional descriptions in other parts of the text.

**Go to 'Insurance Settings'**

**Insert the example insurance of type 1 (individual insurance cover as external fraud is a seldom event) See FIG. 17**.

For the mitigation of negative impacts of operational loss events, insurances are widely used. Depending on the type of insurance, one will observe different behaviors of the corresponding loss distributions. The two main insurance types under consideration are the individual insurance covering every loss event separately, and the collective insurance covering the collective loss of certain event types. The first type can be typically found for low frequency/high severity loss events such as catastrophic events, whereas the latter one applies to frequent loss events with low severities.

In the Quantification Tool, the user can specify the type of insurance and the range of insurance cover.

At this point, an example is given for the different insurance types. The policy could, for example, cover external fraud in retail banking up to an amount of 1 Mio EUR. Thus, every time such an event occurs, the insurance applies and reduces the loss amount by 1 Mio EUR.

An example for the second type of insurance would be an insurance for the event of server down time. These events are certainly not catastrophic by themselves but can cause considerable damage when they occur too frequently. Here a policy could cover aggregated losses due to down time up to a total amount of 1 Mio EUR a year. Thus, only exceeding losses would not be covered by that insurance.

3.5. The Loss Distribution Approach (LDA)

Significantly more sophisticated than the IMA is the LDA. It is a genuine statistical analysis of historical loss data leading to a loss distribution. This distribution contains valuable information and can be used in manifold ways to obtain a good understanding of the specific operational risk exposure.

This part of the risk assessment consists of three screens: one for determining the frequency distribution, one for determining the severity distribution and one where the loss distribution is computed.

**Go to 'LDA Frequency'**

**Click 'Run'**

Possible parametric distributions for the frequency are Poisson and negative binomial.

The program performs an overdispersion test and suggests the use of a negative binomial distribution (2 parameters) for modeling the frequency.

**Choose 'Negative Binomial' as the Preferred Frequency Distribution See FIG. 18**.

**Go to 'LDA Severity Prep.'**

**Click the left 'Run'-button**

Looking at the Hill plot, one can see that the stable region for the tail parameters ends at 3/4.

**Choose '4' as the parameter k; click the right 'Run'-button**

Figure 19:
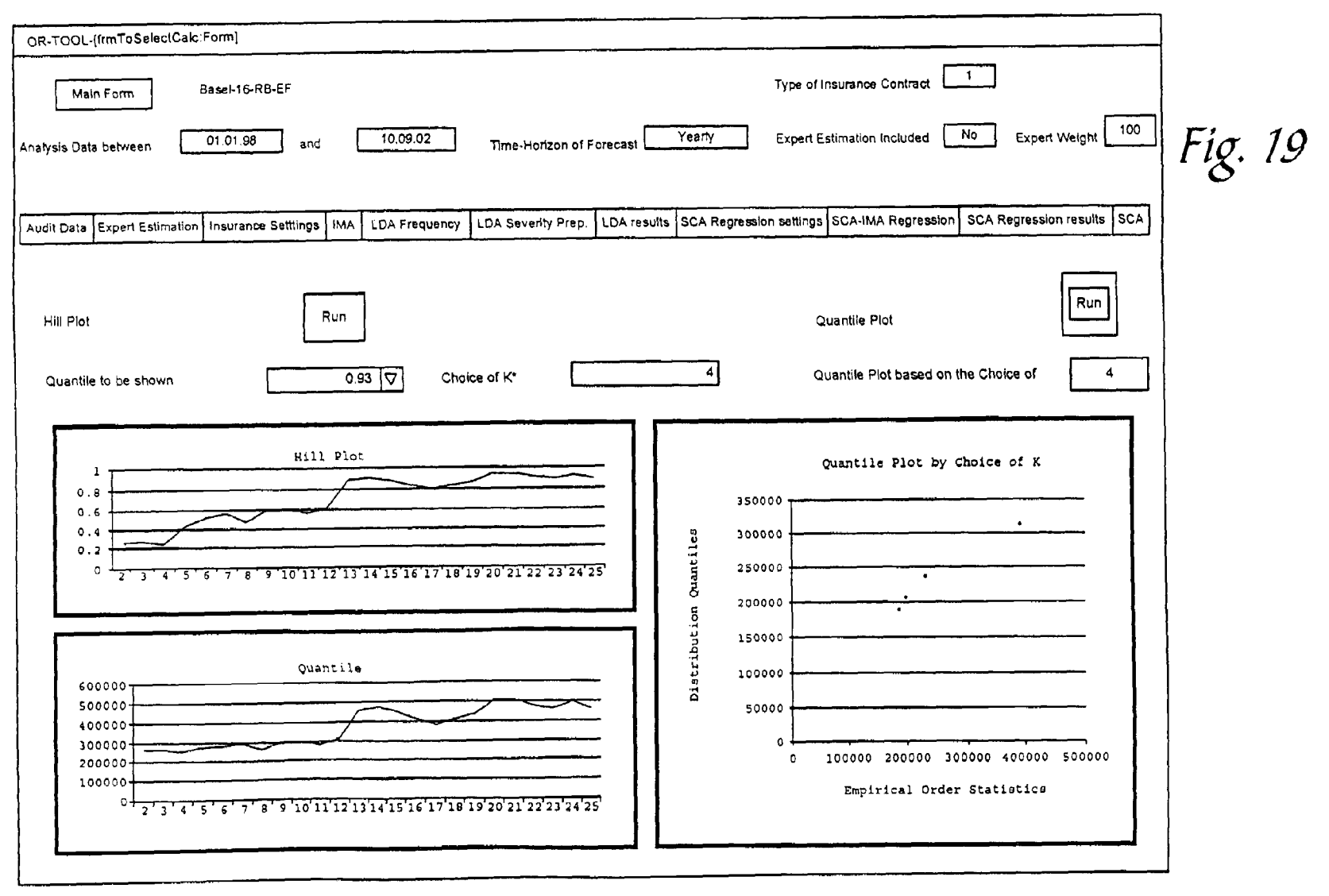

Note that the Hill plot of the tail shows a good fit. See FIG. 19.

**Go to 'LDA Results' and click the 'Run'-button**

Figure 20:
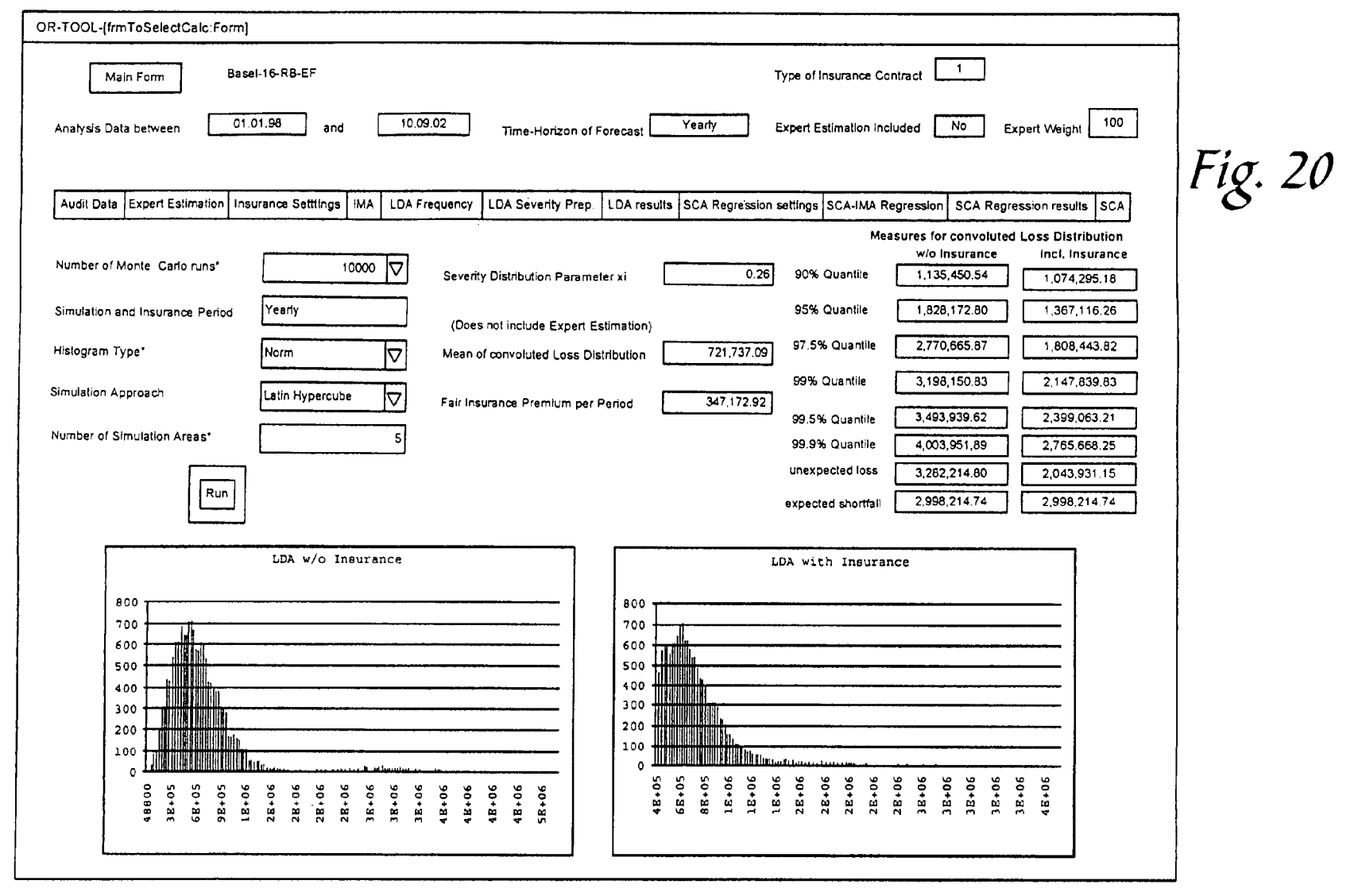

The screen with the results is shown at FIG. 20.

One clearly sees the difference between the loss distribution functions depending on whether or not insurance cover has been considered. For a better understanding of the tail behavior, various quantiles are reported.

3.6. The Scorecards Approaches

The Scorecard approach marries the historical information obtained from loss data and forecast, respectively, expert information coming from internal risk assessment systems such as internal ratings.

In the present version of the Quantification Tool, two different scorecard approaches on the basis of loss distributions are implemented: one uses regression with internal rating information, the other incorporates the additional information via a Bayes transformation process. Common to all scorecard approaches is the challenge to merge information from completely different sources and with different data structure such as loss data on the one side and expert insight on the other side. The difficulty here is to ensure a consistent data structure in order to perform a high-quality risk assessment. The remarkable advantage of these approaches is the fact that quantitative as well as qualitative data is taken into consideration to form an overall risk assessment of an analysis unit.

3.6.1. The Scorecard Approach with Regression

**Go to 'SCA Regression Settings'**

**Insert Rating Information**

Figure 21:
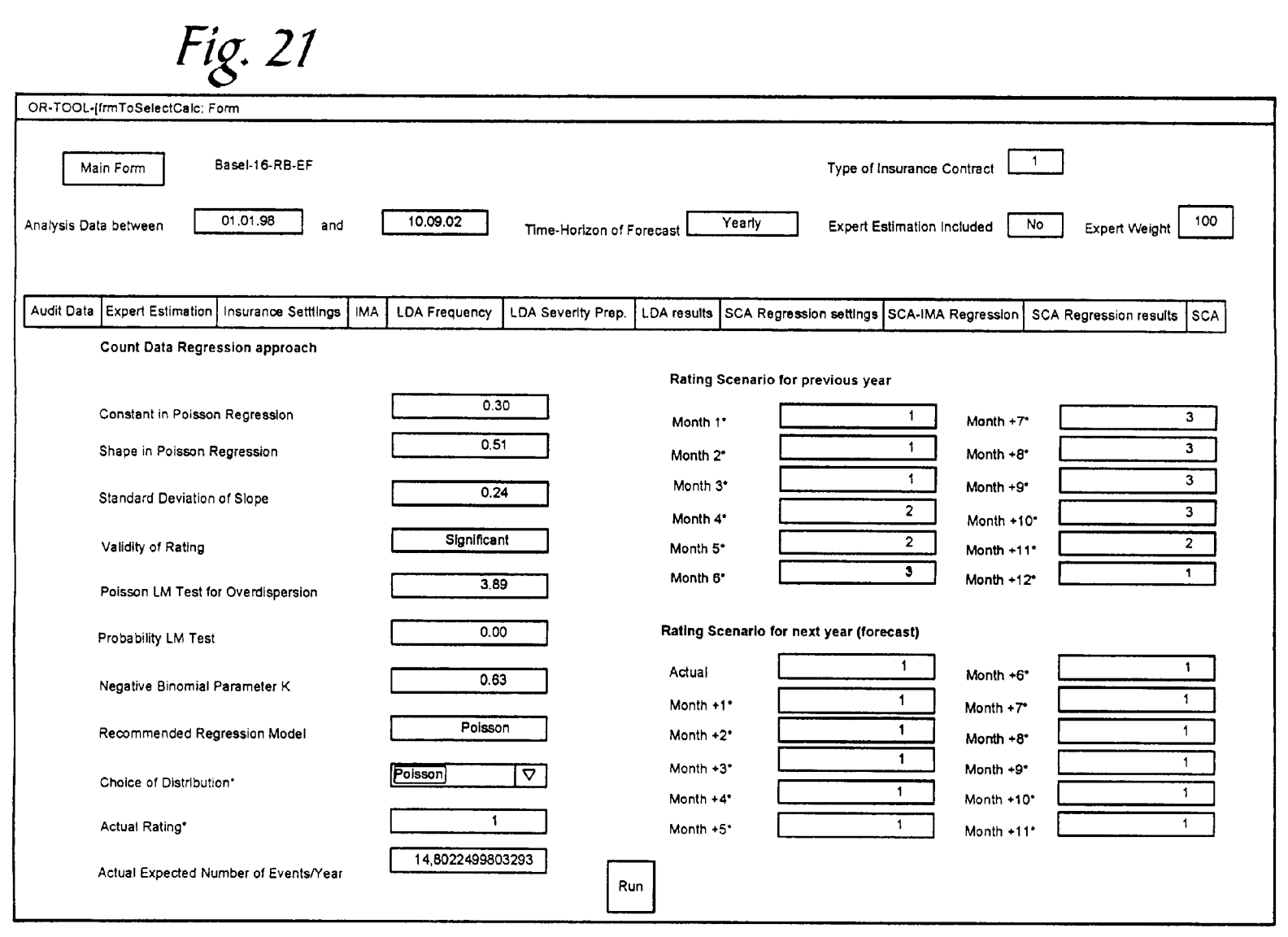

**Click 'Run' See FIG. 21**.

**Go to 'SCA Regression Results'**

**Click 'Run'**

Accordingly, one has the following screen of results as shown at FIG. 22.

3.6.2. The Scorecard Approach with Bayes Transformation

**Go to 'SCA Bayes Settings'**

**Click 'Run'**

**Enter Updating mean to be '1.9'; then choose 'Negative Binomial Distribution' See FIG. 23**.

**Go to 'SCA Bayes results'**

Figure 24:
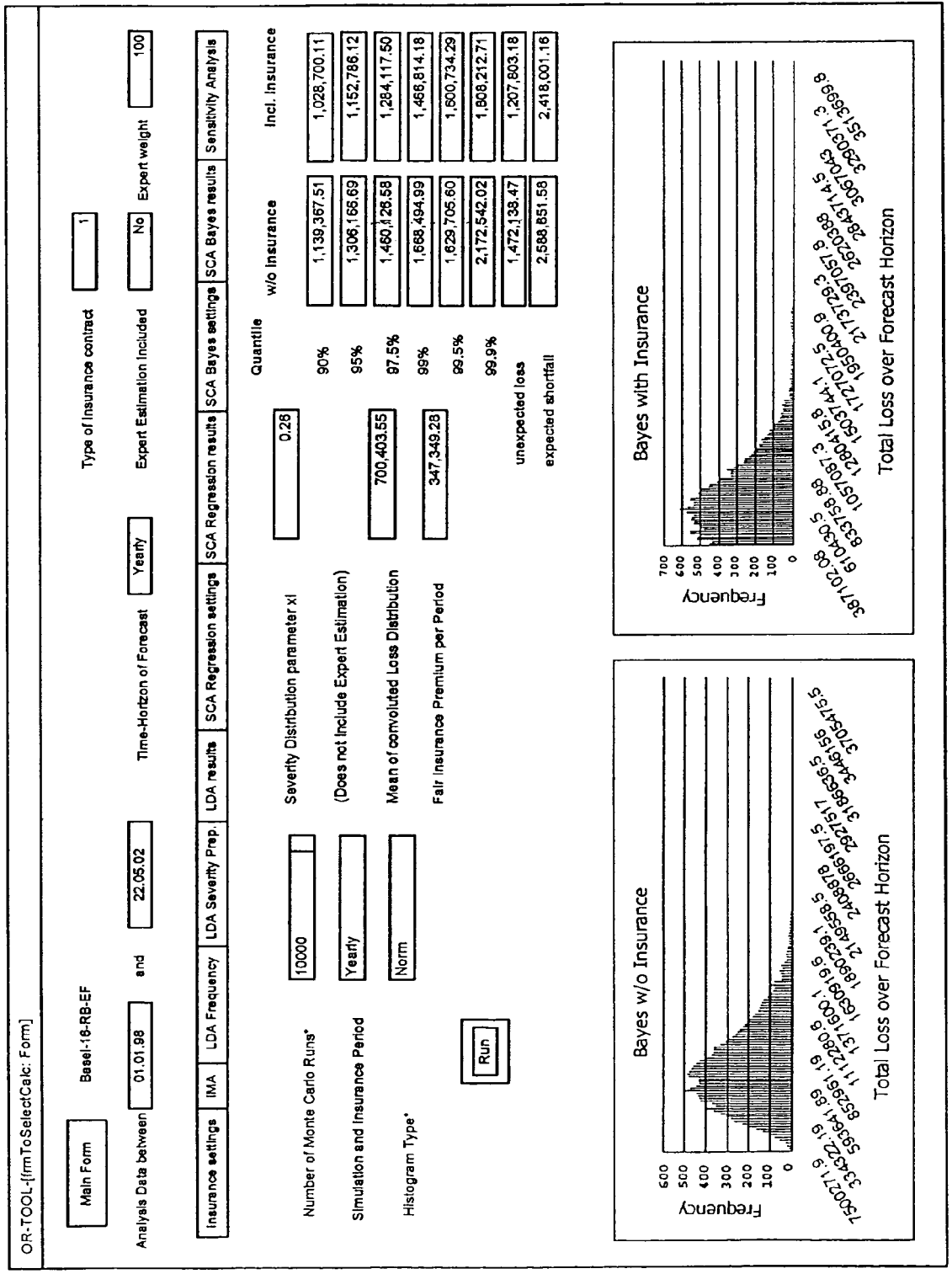
FIG. 24 is a screen display of the quantification tool.

**Click 'Run' See FIG. 24**.

3.7. Sensitivity Analysis

The details of block 82 of FIG. 2 are described here in the following text along with additional descriptions in other parts of the text.

**Go to 'Sensitivity Analysis'**

**Enter ranges for the mean and for the tail parameter; then click 'Run'**

In order to obtain a proper understanding of the sensitivities of the operational risk situations, certain analyses are performed accordingly. These are, in particular, the sensitivities for the frequency mean and for the tail parameter of the severity. See FIG. 25.

After the complete analysis of the unit, the user needs to decide for one loss distribution, which will be used for that unit in the further assessment process.

3.8. Selection of Results

The details of block 72, 78 of FIG. 2 are described here in the following text along with additional descriptions in other parts of the text.

**Go to 'Select Distribution'**

After the complete analysis of the unit, the user needs to decide for one loss distribution which will be used for that unit in the further assessment process. See FIG. 26. See also block 310 of FIG. 42.

\*\*\*\*Go back to 'Main Form'\*\*\*\*
\*\*\*\*Click on 'Calculation Progress' to show which Analysis units are evaluated\*\*\*\*
\*\*\*\*Go back to 'Main Form'\*\*\*\*

4. Definition of Aggregation Tree and Reporting

The details of block 84 of FIG. 2 are described here in the following text along with additional descriptions in other parts of the text.

\*\*\*\*Click on 'Setup Aggregation Tree'\*\*\*\*

After the analysis of all analysis units, an aggregation tree has to be specified. This structure contains all relevant aggregation results for a comprehensive risk assessment. In the example, one is firstly interested in aggregating to the units Investment Banking—External Fraud, Banking—External Fraud and Others—External Fraud. In the second aggregation step, one obtains an overview of the overall losses due to external fraud.

\*\*\*\*Click on 'External Fraud—Investment Banking', then on 'External Fraud—Banking', and Finally on 'External Fraud—Others' to show the content of the first aggregation level\*\*\*\* See FIG. 27.

Figure 28:
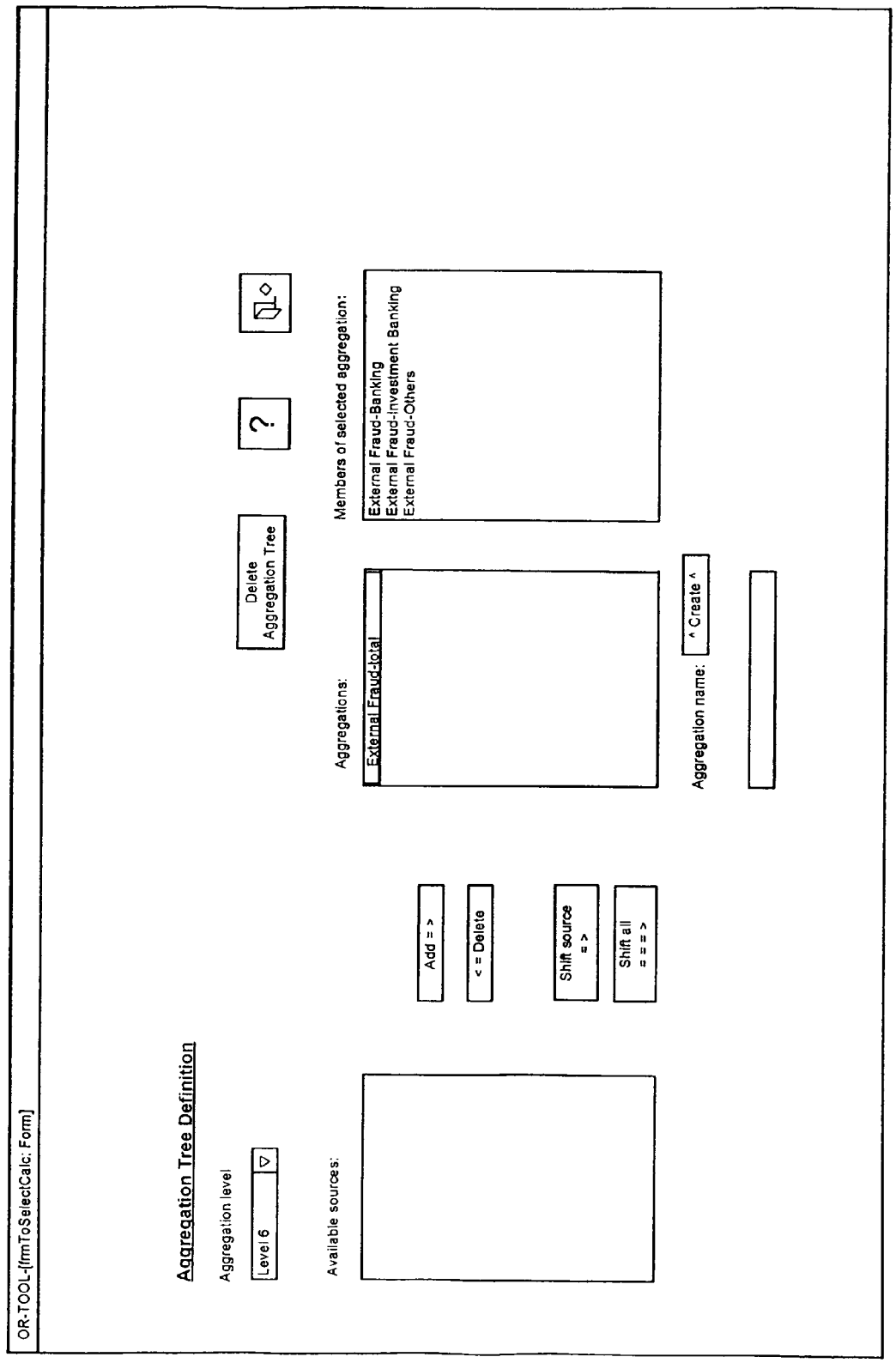
FIG. 28 is a screen display of the quantification tool.

\*\*\*\*Change Aggregation level from 'Level 7' to 'Level 6', and click on 'External Fraud—total'\*\*\*\* See FIG. 28.

Figure 29:
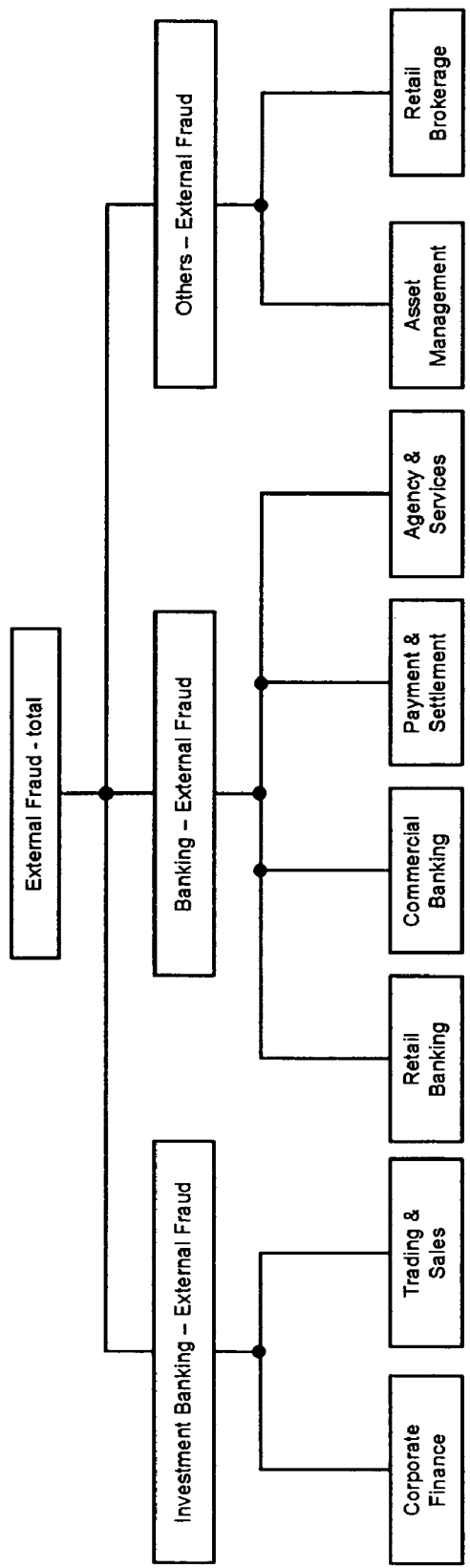
FIG. 29 is a diagram of an aggregation tree for the quantification tool.
Figure 31:
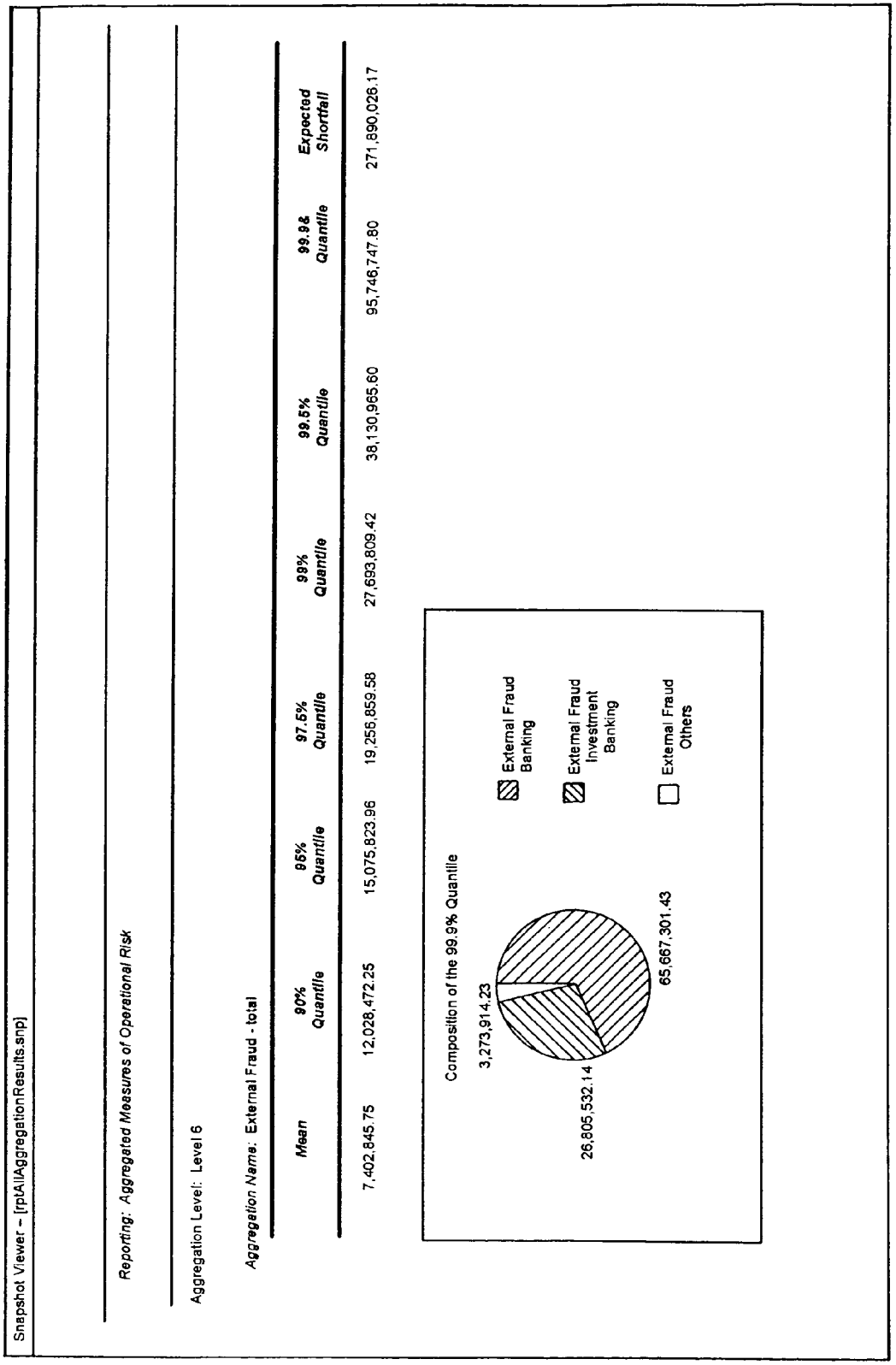
FIG. 31 is a screen display of the quantification tool.
Figure 32:
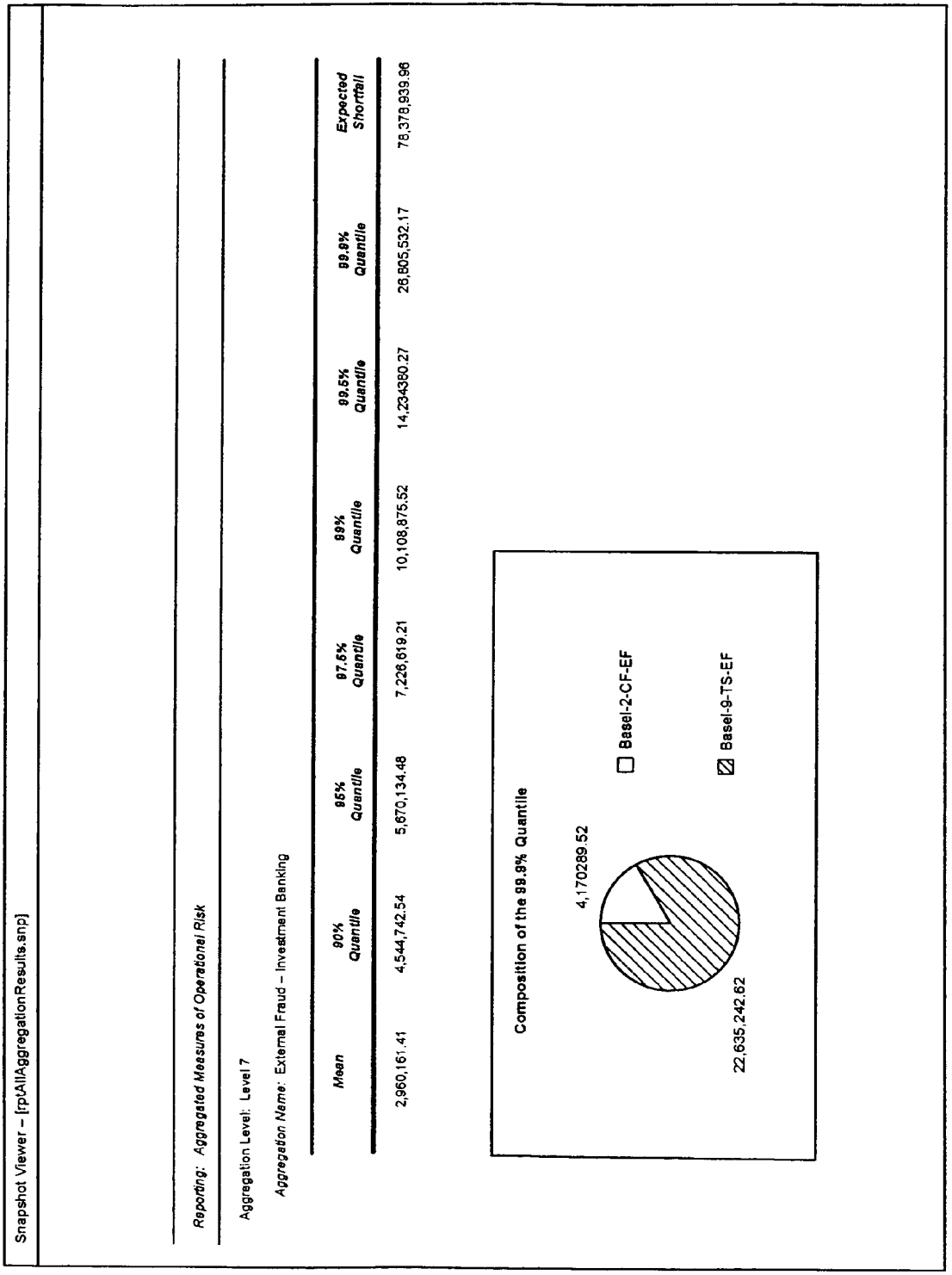
FIG. 32 is a screen display of the quantification tool.
Figure 33:
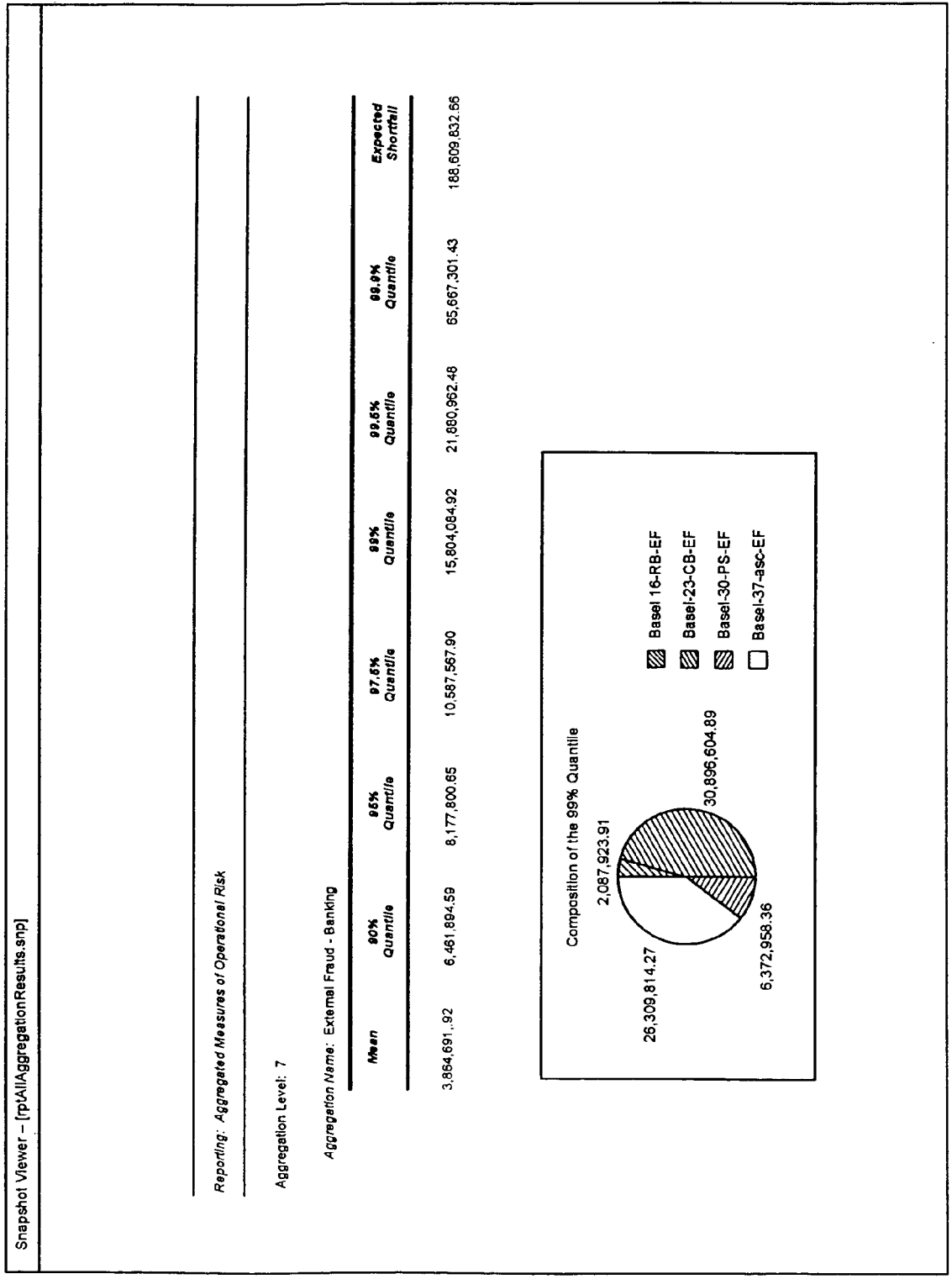
FIG. 33 is a screen display of the quantification tool.
Figure 34:
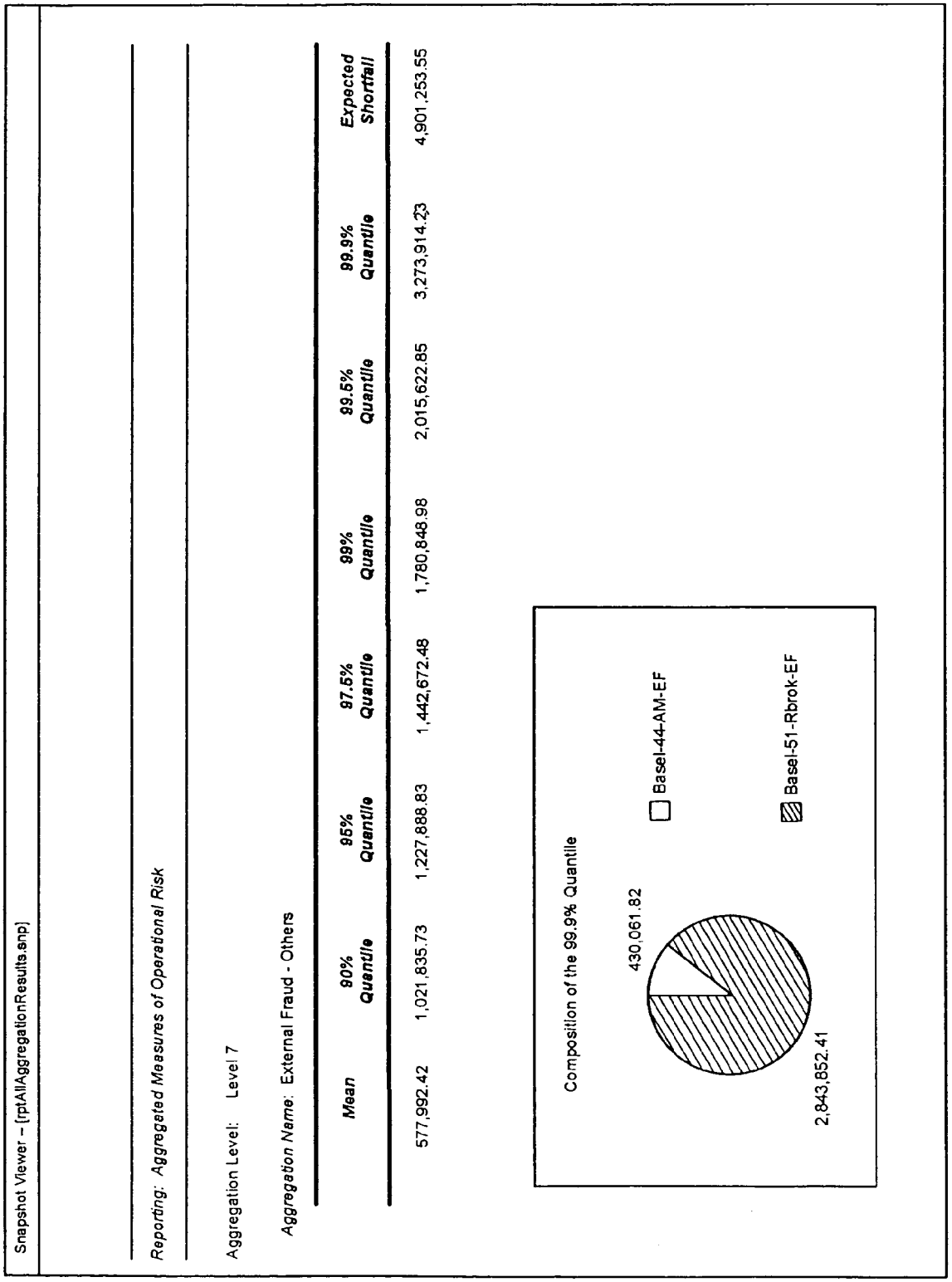
FIG. 34 is a screen display of the quantification tool.

The aggregation tree for this specific situation would be as follows at FIG. 29.

\*\*\*\*Go back to 'Main Form'\*\*\*\*

The reporting of the analysis results is done according to the previously defined aggregation tree. Thus, one obtains operational risk assessments for all analysis units and additional aggregations.

The details of block 86 and 88 of FIG. 2 and block 100 of FIG. 3 are described here in the following text along with additional descriptions in other parts of the text.

\*\*\*\*Click on 'Save Report of all \*\*\*\*evaluated AUs', and specify name and path\*\*\*\*

\*\*\*\*Click on 'Save the Report of all Aggregations', and specify name and path\*\*\*\*

In the present version of the Quantification Tool, total positive dependence between different analysis units is assumed. This allows adding the respective quantiles of the loss distribution to obtain the corresponding quantile of the aggregation. In practice, this will generally overestimate the actual risk exposure, and thus lead to a higher operational risk charge. The best overview about the aggregation procedure gives the following screens.

\*\*\*\*Open the saved reports\*\*\*\*
The Analysis Units. See FIG. 30.
The Aggregations. See FIGS. 31-34.
\*\*\*\*Close reports\*\*\*\*

Using the Quantification-Tool for Operational Risks

1. Introduction

Figure 12:
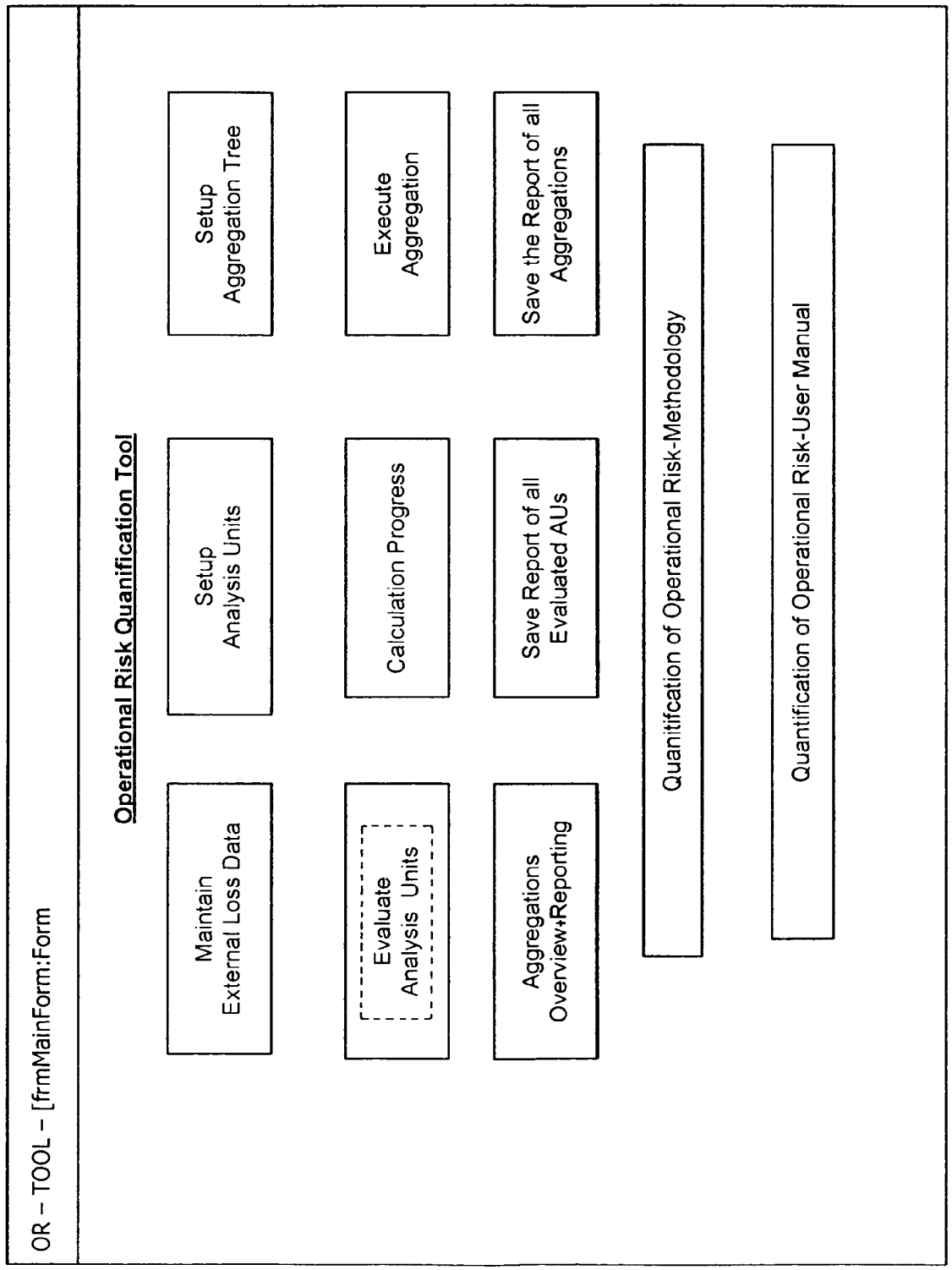
FIG. 12 is a screen display of the quantification tool.

This section describes how the quantification tool for operational risk can be used for risk assessments of a typical and specific analysis requirement of a user of the tool. FIG. 12 shows the first screen display of another version of the quantification tool. Many of the screen displays of the following version are the same or similar to the screen displays from the previously described version; therefore, the same screen displays are referred to where the screens are similar in order to avoid needless duplication.

The Quantification Tool covers all Advanced Measurement Approaches (AMA):
1. The Internal Measurement Approach (IMA)
2. The Loss Distribution Approach (LDA)
3. The Scorecard Approaches Scorecard Approach on LDA-basis using internal rating regression
Scorecard Approach on LDA-basis using Bayes-update.

2. Inclusion of External Loss Data

The details of blocks 70 and 76 of FIG. 2 and blocks 90, 92 and 94 of FIG. 3 are described here in the following text along with additional descriptions in other parts of the text.

A central issue in the assessment of operational risks is the inclusion of external loss data—especially for rare events with high impacts.

2.1. The Conventional Method

Figure 35:
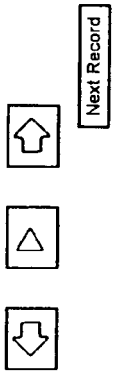
FIG. 35 is a screen display of the quantification tool.

The quantification tool supports the integration of external loss data as it is conventionally done: i.e. the loss frequency regarded as internal, while the loss amount is adjusted to reflect the particular circumstances of the individual bank. See FIG. 35.

2.2. Integration on the Basis of Check Points

The quantification tool also supports an alternative way of including external loss data for the augmentation of the statistical basis for the risk assessment. The loss amounts are not changed in general—there is only a cut-off function reflecting roughly the size of the business. The inclusion procedure works on the basis of so called check points. These are internal control mechanisms which could prevent a particular loss event from occurring internally. The reliability of the check points is assessed and used for adjusting the event frequency to internal conditions. See FIG. 36.

3. Data Structure and Definition of Analysis Units

The details of block 72 of FIG. 2 and blocks 96 and 98 of FIG. 3 are described here in the following text along with additional descriptions in other parts of the text.

The loss data is organized along four dimensions: business lines, event types, organizational units and processes, i.e. every loss event has these four attributes and aggregation logic can move across those four dimensions. The first two correspond to the preliminary Basel II data structure. The 'Organizational unit' and 'Processes' attribute are used to describe the allocation of the loss to an internal part of the bank's business model. There might be more necessary attributes. However, for data scarcity reasons, a certain abstraction discipline is enforced within this tool, as it cannot be expected that there will be enough data to populate more than the resulting analysis nodes for these four dimensions.

In the present example there are 896 elementary nodes, depicting the Basel II nodes plus a very basic structure of organizational units and internal 'processes'.

An analysis unit summarizes loss data and forms the most elementary analysis level. Although the user is free in the definition of analysis units, it is recommended to define analysis units to be completely contained within one Basel II-node to ensure data consistency for a valid statistical analysis.

For the sake of simplicity, the Basel II-nodes are already pre-defined as possible analysis units. See FIG. 37.

For the example 'external fraud assessment', one may consider only the dimensions Basel Business Lines and Event Types. Thus, one may aggregate the 896 elementary nodes into analysis units, which form 'Basel-nodes'. This gives eight Basel-analysis units: external fraud across all eight business lines.

4. Evaluating an Analysis Unit

After defining the aggregation-structure, the risk assessment for the analysis units has to be performed. The Quantification Tool covers all Advanced Measurement Approaches according to the new Basel-accord: these are the Internal Measurement Approach (IMA), the Loss Distribution Approach (LDA), and the Scorecard Approaches.

As an example, the analysis of the Basel-node Retail Banking/External Fraud is demonstrated here.

4.1. Data Analysis

First, the historical loss data for a specified period will be roughly analyzed. This shows the quantiles, the mean and some distributional behavior. The quantile plot with the log normal distribution shows the fit with that distribution, whereas the mean excess plot shows the tail behavior.

Specifically, for the Basel node 'Retail Banking—External Fraud' one sees that for low loss amounts the log normal fit is quite good, but deviating for high amounts. The tail is slightly smaller than the log normal tail. See FIG. 14.

4.2. The Expert Estimate

Especially when the historical loss data is scarce, it will be crucial to use the experience of subject matter experts. Because of their deep insight, they will estimate the frequency of certain loss events. The screen for entering the expert estimate has the following appearance. See FIG. 15.

4.3. The Internal Measurement Approach (IMA)

The IMA is the most elementary of the various Advanced Measurement Approaches in the Base II-accord. The expected loss is computed based on historical loss data. The regulator will stipulate the Gamma-factors, which will then be used to compute the corresponding operational risk charge. The IMA-screen looks as follows at FIG. 16.

Using the LDA-results, one can estimate the Gamma-factors.

Under very weak distribution assumptions, one can give rough estimates for the 99.9%-quantiles.

Chebychev's inequality: Assumption is finite variance

Vysochanskii-Petunin-inequality: Assumption is finite variance and unimodality (i.e. only one maximum)

Insurances cannot change the expected loss—they only change the variance of the loss distribution, which will eventually influence the Gamma-factors. In such cases, the bank needs to demonstrate that its particular portfolio is significantly different from industry standards and thus adaptations of the Gamma-factors are justified.

4.4. Insurances

The details of block 98 of FIG. 3 are described here in the following text along with additional descriptions in other parts of the text.

For the mitigation of negative impacts of operational loss events, insurances are widely used. Depending on the type of insurance, one will observe different behaviors of the corresponding loss distributions. The two main insurance types under consideration are the individual insurance covering every loss event separately, and the collective insurance covering the collective loss of certain event types. The first type can be typically found for low frequency/high severity loss events such as catastrophic events, whereas the latter one applies to frequent loss events with low severities.

In the Quantification Tool, the user can specify the type of insurance and the range of insurance cover. See FIG. 17.

At this point, examples are given for the different insurance types. The policy could for example cover external fraud in retail banking up to an amount of 1 Mio EUR. Thus, every time such an event occurs the insurance applies and reduces the loss amount by 1 Mio EUR.

An example for the second type of insurance would be an insurance for the event of server down time. These events are certainly not catastrophic by themselves but can cause considerable damage when they occur too frequently. Here a policy could cover aggregated losses due to down time up to a total amount of 1 Mio EUR a year. Thus, only exceeding losses would not be covered by that insurance.

4.5. The Loss Distribution Approach (LDA)

Significantly more sophisticated than the IMA is the LDA. It is a genuine statistical analysis of historical loss data leading to a loss distribution. This distribution contains valuable information and can be used in manifold ways to obtain a good understanding of the specific operational risk exposure.

This part of the risk assessment consists of three screens: one for determining the frequency distribution, one for the determining the severity distribution and one where the loss distribution is computed.

Possible parametric distributions for the frequency are Poisson and negative binomial.

The program performs an overdispersion test and suggests the use of a negative binomial distribution (2 parameters) for modeling the frequency. See FIG. 18.

Looking at the Hill plot, one sees that the stable region for the tail parameters ends at 3/4. (Note that the Hill plot of the tail shows a good fit.) See FIG. 19.

The screen with the results is shown at FIG. 20.

One clearly sees the difference between the loss distribution functions depending on whether or not insurance cover has been considered. For a better understanding of the tail behavior, various quantiles are reported.

4.6. The Scorecards Approaches

The Scorecard approach marries the historical information obtained from loss data and forecast respectively expert information coming from internal risk assessment systems such as internal ratings.

In the present version of the Quantification Tool two different scorecard approaches on the basis of loss distributions are implemented: one uses regression with internal rating information, the other incorporates the additional information via a Bayes transformation process. Common to all scorecard approaches is the challenge to merge information from completely different sources and with different data structure such as loss data on the one side and expert insight on the other side. The difficulty here is to ensure a consistent data structure in order to perform a high-quality risk assessment. The remarkable advantage of these approaches is that both, quantitative as well as qualitative data is taken into consideration to form an overall risk assessment of an analysis unit.

4.6.1. The Scorecard Approach with Regression

On the basis of these internal ratings one can deduce updates for the IMA or the LDA. See FIG. 21. Thus one has the following screens of results for the scorecard approach with regression.

Scorecard approach with regression on IMA basis. See FIG. 38.

Figure 39:
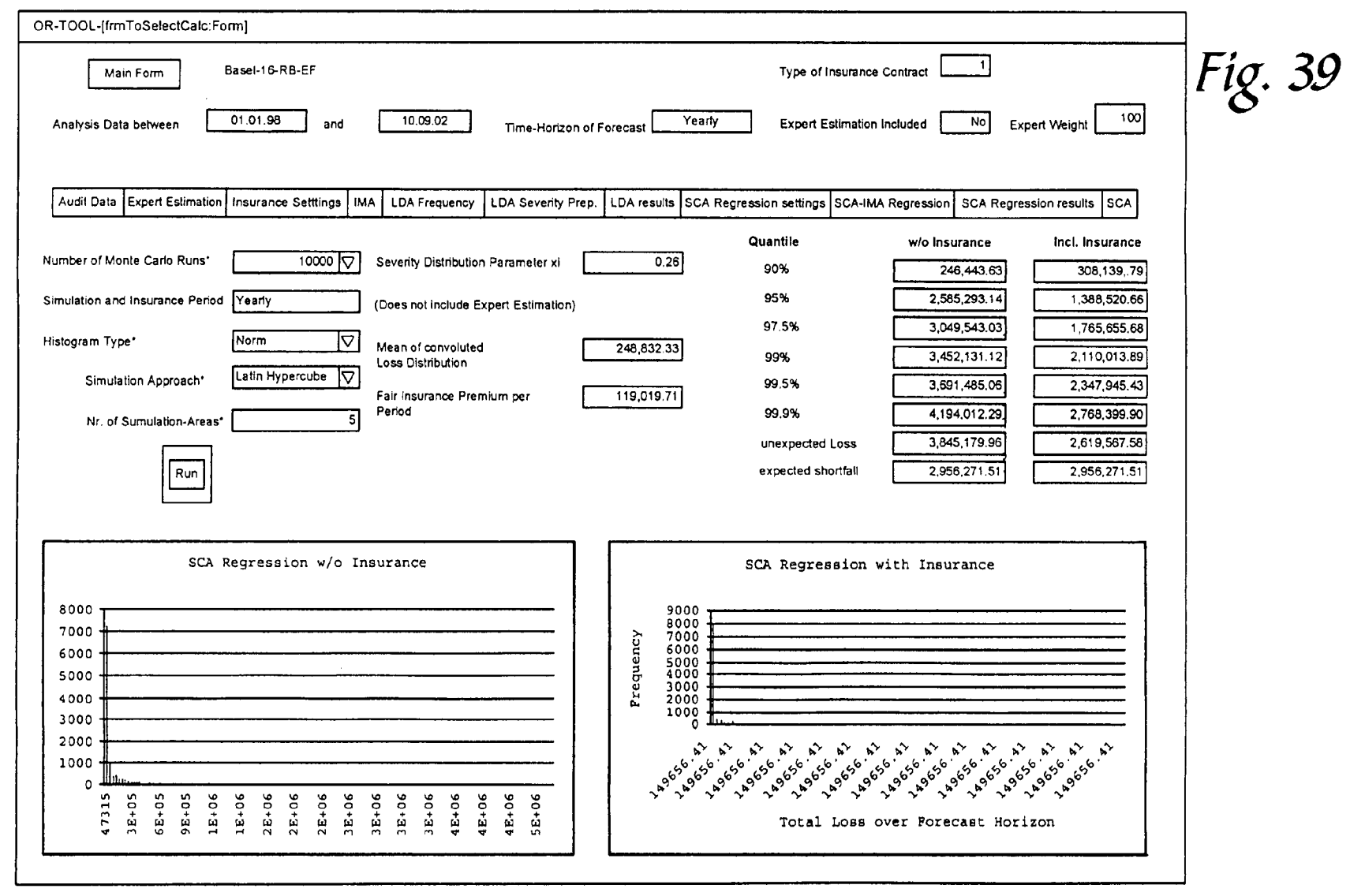

Scorecard approach with regression on LDA basis. See FIG. 39.

4.6.2. The Scorecard Approach with Bayes Transformation

Within the screen shown at FIG. 23, one may enter an update to the mean information (e.g. to be '1,9') and choose a distribution (e.g. 'Negative Binomial Distribution').

Figure 40:
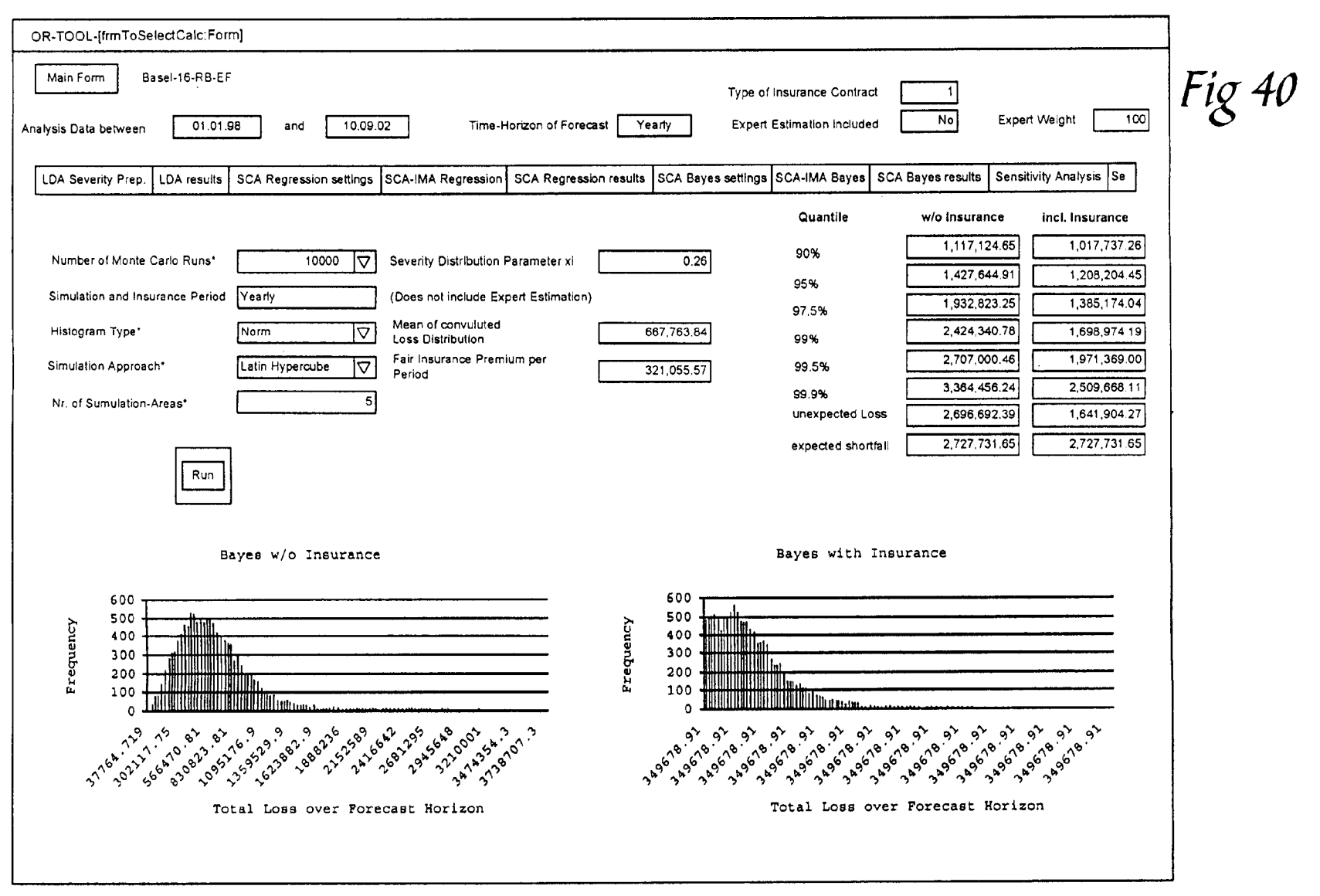

The above selection turns into the following results on the 'SCA Bayes results' tab as shown at FIG. 40.

4.7. Sensitivity Analysis

The details of block 82 of FIG. 2 are described here in the following text along with additional descriptions in other parts of the text.

In order to obtain a proper understanding of the sensitivities of the operational risk situations, certain analyses are performed accordingly. These are in particular the sensitivities for the frequency mean and for the tail parameter of the severity. See FIG. 25.

After the complete analysis of the unit, the user needs to decide for one loss distribution, which will be used for that unit in the further assessment process.

4.8. Selection of Results

The details of blocks 72 and 78 of FIG. 2 are described here in the following text along with additional descriptions in other parts of the text.

After the complete analysis of the unit, the user needs to decide for one loss distribution, which will be used for that unit in the further assessment process. See FIG. 26. See also block 310 of FIG. 42.

5. Definition of Aggregation Tree and Reporting

The details of block 84 of FIG. 2 are described here in the following text along with additional descriptions in other parts of the text.

After the analysis of all analysis units, an aggregation tree has to be specified. This structure contains all relevant aggregation results for a comprehensive risk assessment. In this example, one is firstly interested in aggregating to the units Investment Banking—External Fraud, Banking—External Fraud and Others—External Fraud. In the second aggregation step, one obtains an overview of the overall losses due to external fraud. See FIGS. 27-28.

The aggregation tree for this specific situation would be as follows at FIG. 29.

The reporting of the analysis results is done according to the previously defined aggregation tree. Thus, one obtains operational risk assessments for all analysis units and additional aggregations.

The details of blocks 86 and 88 of FIG. 2 and block 100 of FIG. 3 are described here in the following text along with additional descriptions in other parts of the text.

In the present version of the Quantification Tool, total positive dependence between different analysis units is assumed. This allows adding the respective quantiles of the loss distribution to obtain the corresponding quantile of the aggregation. In practice, this will generally overestimate the actual risk exposure, and thus lead to a higher operational risk charge. The following screens provide the best overview about the aggregation procedure.

Figure 41:
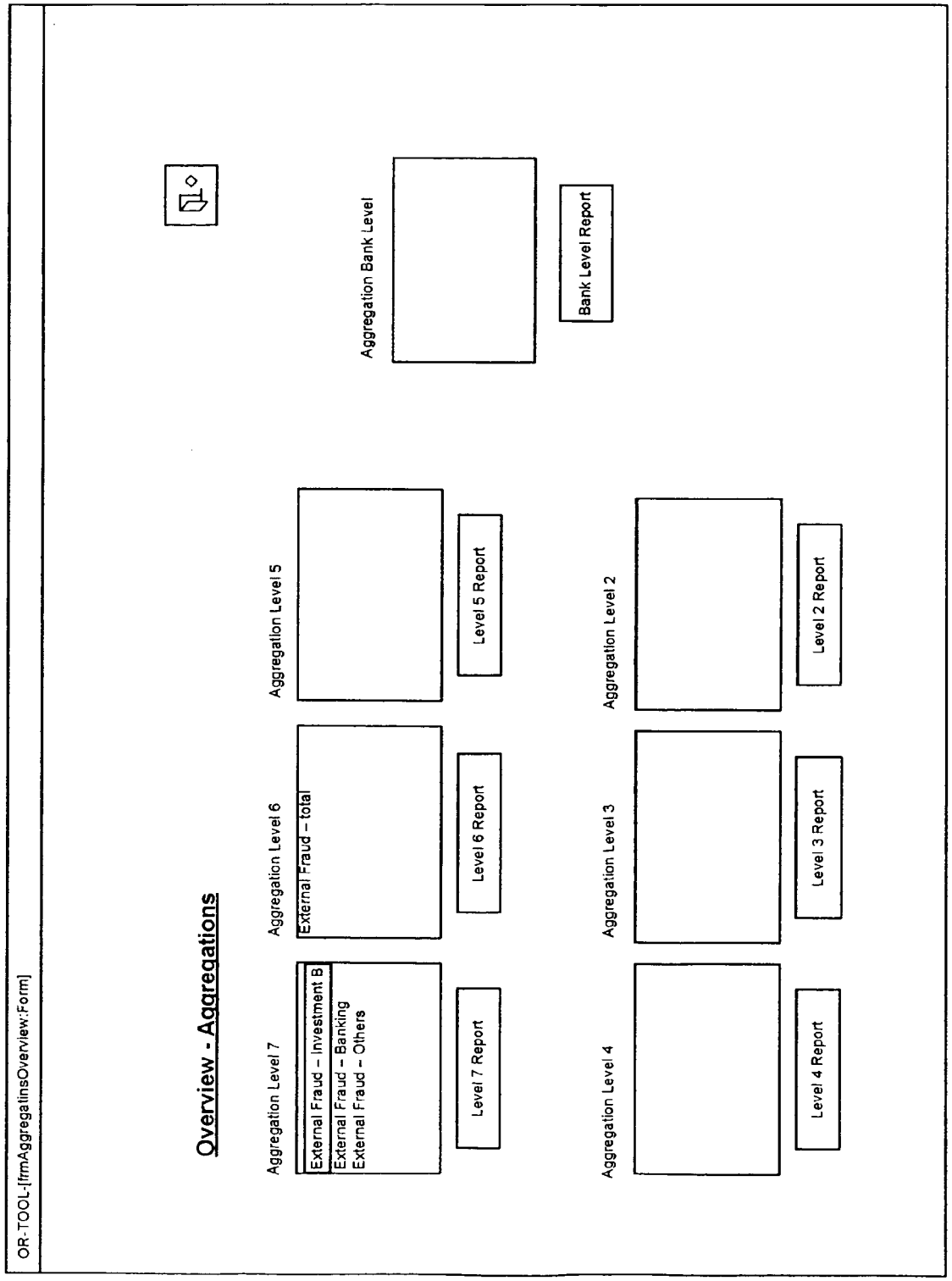
FIG. 41 is a screen display of the quantification tool.

Overview on the Aggregation Units. See FIG. 41.
The Analysis Units. See FIG. 30.
The Aggregations. See FIGS. 31-34.

While a preferred embodiment of the invention has been described, it should be understood that the invention is not so limited, and modifications may be made without departing from the invention. The scope of the invention is defined by the appended claims, and all embodiments that come within the meaning of the claims, either literally or by equivalence, are intended to be embraced therein.

We claim:

1. A computer-readable medium storing a program, said program directing a computer to measure an operational risk of an institution by executing the steps comprising of:
   inputting multi-dimensional loss data, a plurality of analysis nodes thereby being formed by said multi-dimensional loss data, wherein a plurality of node inputs are provided corresponding to said analysis nodes;
   performing a data analysis for each of said analysis nodes using at least one of a Q-Q plot or a mean excess function for each of a frequency distribution and a severity distribution;
   including expert loss data for at least one of said analysis nodes in response to said data analysis, a weight being assigned to said expert loss data;
   selecting one of a plurality of advanced measurement approaches to model said loss data at said analysis nodes, said advanced measurement approaches comprising at least a loss distribution approach and a scorecard approach, wherein different of said advanced measurement approaches are selectable for different of said analysis nodes;
   calculating said plurality of advanced measurement approaches, wherein multiple models of said loss data are calculable for each of said analysis nodes, wherein calculating said loss distribution approach comprises at least modeling a frequency distribution with a Poisson distribution or a negative binomial distribution, separating low severity events and high severity events in a severity distribution with a Hill estimator, modeling said low severity events with a log normal distribution and modeling said high severity events with a generalized Pareto distribution, and determining an user bound for losses using Chebychev's inequality, and wherein calculating said scorecard approach comprises at least using Bayes transformations to incorporate new loss data into an existing loss estimation;
   calculating the effect of insurance coverage for each of said analysis nodes;
   performing a sensitivity analysis for each of said analysis nodes by changing a mean of the frequency distribution and a parameter of the severity distribution by at least 10%;
   defining aggregations, said aggregations being defined by structures aggregating said analysis nodes;
   calculating a value at risk of said aggregations, said calculated value at risk being calculated in response to said advanced measurement approaches selected for said analysis nodes; and
   outputting said calculated value at risk.

2. The computer-readable medium according to claim 1, wherein said inputting step loads at least three-dimensional loss data.

3. The computer-readable medium according to claim 2, wherein said three dimensions comprises business lines, event types and organizational units.

4. The computer-readable medium according to claim 1, wherein said inputting step loads at least four-dimensional loss data.

5. The computer-readable medium according to claim 2, wherein said four dimensions comprises business lines, event types, organizational units and processes.

6. The computer-readable medium according to claim 1, further comprising:
   defining analysis units, said analysis nodes thereby being aggregated into said analysis units and said node inputs being provided by analysis unit inputs;
   wherein said selecting step selects one of said plurality of advanced measurement approaches to model said loss data at said analysis units, different of said advanced measurement approaches being selectable for different of said analysis units;
   wherein said multiple models of said step of calculating said plurality of advanced measurement approaches are calculable for each of said analysis units;
   wherein said aggregations of said aggregating step are defined by structures aggregating said analysis units; and
   wherein said step of calculating said value at risk is calculated in response to said advanced measurement approaches selected for said analysis units.

7. The computer-readable medium according to claim 1, wherein said inputting step loads at least internal and external loss data.

8. The computer-readable medium according to claim 6, wherein said inputting step further loads expert prior loss data.

9. The computer-readable medium according to claim 1, wherein said inputting step loads at least three-dimensional loss data, said three dimensions comprising business lines, event types and organizational units.

10. The computer-readable medium according to claim 9, wherein said business lines are structured according to investment banking, banking and others.

11. The computer-readable medium according to claim 10, wherein said business lines comprise corporate finance, trading and sales, retail banking, commercial banking, payment and settlement, agency services and custody, asset management and retail brokerage.

12. The computer-readable medium according to claim 9, wherein said event types comprise internal fraud, external fraud, employment practices and workplace safety, clients products and business practices, damage to physical assets, business disruption and system failures, and execution delivery and process management.

13. The computer-readable medium according to claim 1, wherein said inputting step loads at least four-dimensional loss data, said four dimensions comprising business lines, event types, organizational units and processes.

14. The computer-readable medium according to claim 1, wherein said scorecard approach comprises a scorecard approach on the basis of an internal measurement approach and a scorecard approach on the basis of a loss distribution approach.

15. The computer-readable medium according to claim 1, wherein said plurality of advanced measurement approaches further comprises an internal measurement approach.

16. The computer-readable medium according to claim 1, further comprising the step of model back-testing with at least two model back-testing procedures.

17. The computer-readable medium according to claim 1, wherein said plurality of advanced measurement approaches further comprises a Bayesian updating mechanism comprising updating the tail parameter of the severity distribution in response to one of a scenario and external losses.

18. The computer-readable medium according to claim 1, wherein said inputting step loads at least internal and external loss data; and wherein said inputting step loads at least three-dimensional loss data, said three dimensions comprising business lines, event types and organizational units.

19. The computer-readable medium according to claim 18, wherein said inputting step further loads expert prior loss data; wherein said business lines are structured according to investment banking, banking and others; wherein said business lines comprise corporate finance, trading and sales, retail banking, commercial banking, payment and settlement, agency services and custody, asset management and retail brokerage; wherein said event types comprise internal fraud, external fraud, employment practices and workplace safety, clients products and business practices, damage to physical assets, business disruption and system failures, and execution delivery and process management; and wherein said inputting step loads at least four-dimensional loss data, said four dimensions comprising business lines, event types, organizational units and processes.

20. The computer-readable medium according to claim 1, wherein said inputting step loads at least internal and external loss data; wherein said inputting step further loads expert prior loss data; wherein said inputting step loads at least four-dimensional loss data, said four dimensions comprising business lines, event types, organizational units and processes; wherein said business lines are structured according to investment banking, banking and others; wherein said business lines comprise corporate finance, trading and sales, retail banking, commercial banking, payment and settlement, agency services and custody, asset management and retail brokerage; wherein said event types comprise internal fraud, external fraud, employment practices and workplace safety, clients products and business practices, damage to physical assets, business disruption and system failures, and execution delivery and process management; further comprising the step of model back-testing using at least two model back-testing procedures; and wherein said plurality of advanced measurement approaches further comprises a Bayesian updating mechanism comprising updating the tail parameter of the severity distribution in response to one of a scenario and external losses.

21. A computer system for measuring an operational risk of an institution, comprising:

a first means for loading multi-dimensional loss data, a plurality of analysis nodes being formed by said multi-dimensional loss data, wherein a plurality of node inputs are provided corresponding to said analysis nodes;

a second means for performing a data analysis for each of said analysis nodes using at least one of a Q-Q plot or a mean excess function for each of a frequency distribution and a severity distribution;

a third means for including expert loss data for at least one of said analysis nodes in response to said data analysis, a weight being assigned to said expert loss data;

a fourth means for calculating a plurality of advanced measurement approaches comprising at least a loss distribution approach and a scorecard approach, said plurality of advanced measurement approaches thereby calculating multiple models of said loss data, wherein calculating said loss distribution approach comprises at least modeling a frequency distribution with a Poisson distribution or a negative binomial distribution, separating low severity events and high severity events in a severity distribution with a Hill estimator, modeling said low severity events with a log normal distribution and modeling said high severity events with a generalized Pareto distribution, and determining an upper bound for losses using Chebychev's inequality, and wherein calculating said scorecard approach comprises at least using Bayes transformations to incorporate new loss data into an existing loss estimation;

a fifth means for selecting one of said plurality of advanced measurement approaches to model said loss data at said analysis nodes, wherein different of said advanced measurement approaches are selectable for different of said analysis nodes;

a sixth means for calculating the effect of insurance coverage for each of said analysis nodes;

a seventh means for performing a sensitivity analysis for each of said analysis nodes by changing a mean of the frequency distribution and a parameter of the severity distribution by at least 10%:

an eighth means for defining aggregations, said aggregations being defined by structures aggregating said analysis nodes;

a ninth means for calculating a value at risk of said aggregations, said calculated value at risk being calculated in response to said advanced measurement approaches selected for said analysis nodes;

a tenth means for defining analysis units, said analysis nodes thereby being aggregated into said analysis units and said node inputs being provided by analysis unit inputs;

wherein said fifth means selects one of said plurality of advanced measurement approaches to model said loss data at said analysis units, different of said advanced measurement approaches being selectable for different of said analysis units;

wherein said aggregations of said eighth means are defined by structures aggregating said analysis units; and wherein said calculated value at risk of said ninth means is calculated in response to said advanced measurement approaches selected for said analysis units.

* * * * *